US012803666B2

(12) United States Patent
Dinjian et al.

(10) Patent No.: US 12,803,666 B2
(45) Date of Patent: Nov. 17, 2026

(54) SYSTEM AND METHOD FOR MAPPING MULTI-STRAND FIBER OPTIC CABLES

(71) Applicant: Multi-Fiber Solutions LLC, Fort Mill, SC (US)

(72) Inventors: Mark A. Dinjian, Reading, MA (US); William S. Heinstrom, Longs, SC (US); Brian A. LeBlanc, Fort Mill, SC (US)

(73) Assignee: MULTI-FIBER SOLUTIONS, LLC., Fort Mill, SC (US)

( * ) Notice: Subject to any disclaimer, the term of this patent is extended or adjusted under 35 U.S.C. 154(b) by 177 days.

(21) Appl. No.: 18/917,784

(22) Filed: Oct. 16, 2024

(65) Prior Publication Data

US 2025/0125873 A1 Apr. 17, 2025

Related U.S. Application Data

(60) Provisional application No. 63/544,367, filed on Oct. 16, 2023.

(51) Int. Cl.
*H04B 10/079* (2013.01)
*H04B 10/50* (2013.01)

(52) U.S. Cl.
CPC ..... *H04B 10/07955* (2013.01); *H04B 10/502* (2013.01)

(58) Field of Classification Search
None
See application file for complete search history.

(56) References Cited

U.S. PATENT DOCUMENTS 5,093,568 A 3/1992 Maycock
5,493,406 A 2/1996 Sawaki et al.
(Continued)

FOREIGN PATENT DOCUMENTS

CA 2957578 A1 8/2018
EP 2718688 B1 1/2016
(Continued)

OTHER PUBLICATIONS https://www.amazon.com/EVERSECU-wavelength-Tester-Camera-Optical/dp/B092S9B8Q8.
(Continued)

*Primary Examiner* — David W Lambert
(74) *Attorney, Agent, or Firm* — Jeffrey C. Watson, Esq.; Grell & Watson Patent Attorneys LLC

(57) ABSTRACT

A system and method for qualification, testing or mapping multi-strand fiber optic cables is for identification, mapping and troubleshooting of multi-fiber cables. The system and method may include a first end transmit device and a second end receive device. The first end transmit device includes at least one fiber port configured to engage a connector for an individual optical fiber, and optical light sources configured to emit an optical light in each of the fiber ports. A controller is configured to control the optical light sources to emit coded light patterns through each of the fiber ports. The first end transmit device emits coded light patterns into each of the fiber ports corresponding to a unique port signature of each fiber port. The second end receive device includes a camera configured to view and decode the coded light patterns to identify the unique port signature from each of the fiber ports.

17 Claims, 35 Drawing Sheets

(56) References Cited

U.S. PATENT DOCUMENTS

| | | | | |
|---|---|---|---|---|
| 8,823,925 | B2 * | 9/2014 | Dinjian | G01M 11/30 356/73.1 |
| 9,634,759 | B2 | 4/2017 | Kim et al. | |
| 10,090,914 | B2 | 10/2018 | Schell et al. | |
| 10,184,858 | B2 | 1/2019 | Klein et al. | |
| 10,254,487 | B2 | 4/2019 | Huang et al. | |
| 10,481,041 | B2 | 11/2019 | Schell et al. | |
| 10,684,422 | B2 * | 6/2020 | Cummings | G01M 11/088 |
| 10,779,368 | B2 * | 9/2020 | Foster | H04L 12/2836 |
| 10,962,443 | B1 * | 3/2021 | Levin | G01M 11/335 |
| 11,047,766 | B2 | 6/2021 | Eddy et al. | |
| 11,340,137 | B2 * | 5/2022 | Leclerc | G02B 6/385 |
| 2015/0130849 | A1 | 5/2015 | Thompson et al. | |
| 2018/0149556 | A1 | 5/2018 | Adam et al. | |
| 2022/0128434 | A1 | 4/2022 | Perron et al. | |
| 2022/0170815 | A1 | 6/2022 | Caron et al. | |

FOREIGN PATENT DOCUMENTS

| | | | |
|---|---|---|---|
| EP | 3364562 | A1 | 8/2018 |
| JP | 2016191895 | A | 11/2016 |
| WO | 2016052270 | A1 | 4/2016 |
| WO | 2021080742 | A1 | 4/2021 |
| WO | 2023009253 | A1 | 2/2023 |

OTHER PUBLICATIONS https://www.fiberscope.net/fiber-optic-borescope-camera/.

https://sci-hub.se/https://doi.org/10.1007/978-1-4613-3706-5_94.

International Search Authority, "International Search Report" and "Written Opinion", PCT/US2024/051648, mailed Nov. 27, 2024.

* cited by examiner

SYSTEM AND METHOD FOR MAPPING MULTI-STRAND FIBER OPTIC CABLES

CROSS-REFERENCE TO RELATED APPLICATIONS

This application claims benefit to U.S. Provisional Patent Application No. 63/544,367, filed on Oct. 16, 2023, which is incorporated by reference in its entirety.

FIELD OF THE DISCLOSURE

The present disclosure is related to fiber-optic cables, namely, multi-strand fiber-optic cables. More specifically, the present disclosure is related to a system and method for qualification, testing and/or mapping multi-strand fiber-optic cables.

BACKGROUND

Generally speaking, a fiber-optic cable, also known as an optical-fiber cable, is an assembly similar to an electrical cable but containing one or more optical fibers. The optical fibers are designed and used to carry light through the fiber-optic cable. The optical fiber elements are typically individually coated with plastic layers and contained in a protective sheathing, jacket, or tube suitable for the environment where the cable is used. Fiber-optic cables come in many different forms and can be used for many different applications, including, but not limited to, fiber-optic communication like long-distance telecommunication, or providing a high-speed data connection between different parts of a building.

For multi-fiber cables, the individual fibers of such multi-fiber cables are often distinguished from one another by color-coded jackets or buffers on each fiber. The identification scheme used is typically based on EIA/TIA-598, Optical Fiber Cable Color Coding, which defines identification schemes for fibers, buffered fibers, fiber units, and groups of fiber units within outside plant and premises optical fiber cables. This standard allows for fiber units to be identified by means of a printed legend. This method can be used for identification of fiber ribbons and fiber subunits. The legend will contain a corresponding printed numerical position number or color for use in identification.

The infrared light used in telecommunications cannot be seen, so there is a potential laser safety hazard to technicians. The eye's natural defense against sudden exposure to bright light is the blink reflex, which is not triggered by infrared sources. In some cases the power levels are high enough to damage eyes, particularly when lenses or microscopes are used to inspect fibers that are emitting invisible infrared light. Inspection microscopes with optical safety filters are available to guard against this. More recently indirect viewing aids are used, which can comprise a camera mounted within a handheld device, which has an opening for the connectorized fiber and a USB output for connection to a display device such as a laptop. This makes the activity of looking for damage or dirt on the connector face much safer.

In many communication systems, bundles of optical fibers extend significant distances between two points. In many buildings, these bundles of fibers terminate in a wiring closet. In a typical wiring closet, there may be hundreds of optical fibers. Upon leaving the wiring closet, these fibers diverge along different paths, extending through ceilings and walls to various other termination points in different parts of the building. In some cases, fibers that begin in a wiring closet extend to neighboring buildings. In many cases, the fibers appear identical to each other. Accordingly, it is often difficult for installation and/or maintenance personnel to determine which of the many in a closet is the one that extends to a particular location. To address this difficulty, one typically shines a light through individual fibers and visually inspects the other ends of the fibers. Occasionally, a few optical fibers will break, or otherwise lose continuity. Proper maintenance of such communication systems typically includes identifying broken fibers. One way to identify broken fibers is to shine a light at a first end and look at a second end to see if a light exits out the other end. However, this procedure is carried out one fiber at a time and is therefore time consuming. However, as noted above, the infrared light typically shined through optical fibers can be damaging to the eyes. As such, mapping each of the strands of these multi-strand optical fibers becomes very problematic.

U.S. Pat. Nos. 8,823,925 and 8,467,041 (both incorporated herein by reference in their entirety) disclose the transmission of a combination of visible colors and unique port signatures and the inspection of light, condition of said optical fibers, identifying a discontinuity, and mapping each of said second ends to a corresponding first end. U.S. Pat. Nos. 8,823,925 and 8,467,041 still require the use of visual fault locators, or VFLs.

VFL's are still the most common method to trace, identify, map, troubleshoot and document fiber optic infrastructure. While these VFL's are supposed to comply with laser safety standards, many of them are not very well regulated and often exceed max safety standards. As an example, it is common practice to look into the far end of the fiber with the naked eye to see which strand has the 650 nm red VFL on it. However, as mentioned above, this is also a time-consuming process often requiring more than one person and multiple VFLs: one on continuous red and the other on flashing red. If you get the wrong buffer tube or a faulty fiber you can spend a lot of personnel time, and potentially costly downtime trying to identify the correct strands between point A and point B. This could be between data centers, racks, utility poles, manholes, dark and cluttered MDF & IDF closets, etc.

Installation practices, procedures and methods have changed drastically as more and more fiber optic cables are installed and the cost has gone down drastically over the past decades. Many end-users are installing extra capacity due to the high cost of adding new cables and conduits in the future or leasing additional conduit infrastructure. It is common practice to pull 144 or 288 strands and leave many of them dark for future use. It is also common practice to fusion splice multiple strands in campus-type environments from one building to another or through multiple MDF and IDF closets for critical services, e.g., fire, security, A/V, police, etc. Fusion splices also eliminate most of the signal loss that you would get from using standard connectors and couplings. Accordingly, there is a lot of guess work associated with pulling X number of strands from cable Y in building Z and splicing or patching through multiple locations.

Fiber documentation is critical to a stable and secure network, and it is often the most challenging part of a cable plant to map out and maintain accurate records. The process of repeatedly plugging and unplugging a test fiber into the fiber optic ports to track down a fiber can introduce debris at that connection and possibly damage the connectors over time, as required by fiber identifiers. Mapping multi-strand fiber-optic cables provides for strand identification, location, etc. Qualification of multi-strand fiber-optic cables is to provide the minimal testing to verify the cables meet the end-user's requirements for end-to-end continuity, plus power levels and/or OTDR ("Optical Time Domain Reflectometer") testing. Certification must meet industry standards, which may provide more thorough testing requiring testing loss at multiple wavelengths and both directions, plus OTDR trace in both directions.

Therefore, a need clearly exists for a safer and more efficient means and/or method for qualification, testing and/or mapping of multi-strand fiber-optic cables.

The instant disclosure may be designed to address at least certain aspects of the problems or needs discussed above by providing a system and method for qualification, testing and/or mapping multi-strand fiber optic cables.

SUMMARY

The present disclosure may solve the aforementioned limitations of the currently available systems and/or means for qualification, testing and/or mapping multi-strand fiber-optic cables by providing the disclosed system and/or method for qualification, testing and/or mapping multi-strand fiber-optic cables. In general, the disclosed system and/or method for qualification, testing and/or mapping multi-strand fiber-optic cables may include a first end transmit device and a second end receive device. The first end transmit device may include at least one fiber port. Each of the fiber ports may be configured to engage a connector for an individual optical fiber of a multi-strand fiber-optic cable. At least one optical light source may be included with the first end transmit device. Each of the optical light sources may be configured to emit an optical light in one of the fiber ports. A controller may also be included with the first end transmit device. The controller may be configured to control the optical light sources. The controller may be configured to emit coded light patterns through each of the fiber ports via the optical light emitted from each of the optical light sources. Wherein, the first end transmit device may be configured to emit coded light patterns into each of the fiber ports corresponding to a unique port signature of each of the fiber ports. The second end receive device may include a camera. The camera of the second end receive device may be configured to view and decode the coded light patterns from each of the individual optical fibers of the multi-strand fiber-optic cable to identify the unique port signature from each of the fiber ports.

One feature of the disclosed system and/or method for qualification, testing and/or mapping multi-strand fiber-optic cables may be that it can be designed and configured to be used for non-contact identification, mapping and/or troubleshooting of multi-strand fiber-optic cables. The disclosed system and/or method may be designed and/or configured to apply the unique port signature to each of the fiber ports at a first end of the multi-strand fiber-optic cable, and locating a corresponding port signature at a second end of the multi-strand fiber-optic cable, thereby allowing an end-user to certify a new fiber installation, as well as audit and troubleshoot an existing fiber optic cable plant. The disclosed system and/or method may allow the end-user to be able to perform qualification testing of a new fiber installation, as well as mapping and troubleshooting an existing installation. The disclosed system and/or method may allow the end-user to provide certification as well, which may require more in-depth testing with multiple wavelengths and bidirectional testing.

In select embodiments of the disclosed system and/or method for qualification, testing and/or mapping multi-strand fiber-optic cables, the first end transmit device may further include a housing. The housing may have a face with the fiber ports. As such, the fiber ports of the first end transmit device may be face ports disposed on the face. Each of the face ports may be configured to engage the connector for the individual optical fiber or a connector including multiple, individual optical fibers. In select embodiments of the disclosed system and/or method for qualification, testing and/or mapping multi-strand fiber-optic cables, the first end transmit device may include LED lights mounted on the face. These LED lights mounted on the face may be configured to flash according to the corresponding laser port to assure that the first end transmit device is functioning properly as well as providing a means to calibrate the second end receive device.

In select embodiments of the disclosed system and/or method for qualification, testing and/or mapping multi-strand fiber-optic cables, the first end transmit device may further include individual optical tap ports. The individual optical tap ports may correspond to each of the face ports. The individual optical tap ports may be configured for use with external optical components including, but not limited to, an optical power source used together with an optical power meter at a second end. In select embodiments, the optical light sources of the first end transmit device may be coupled to the individual optical tap ports and the face ports. In select embodiments, the first end transmit device may include fiber-optic splitters and/or WDM couplers that will direct the optical light sources to or from each of the face ports and the individual optical tap ports. Wherein, once a fiber has been identified, mapped, or repaired, an infrared power source may be transmitted by the first end transmit device that can be configured to change to steady-on mode and, in conjunction with an optional second end power meter to determine an acceptable pass or fail dB loss of the fiber.

One feature of the disclosed system and/or method for qualification, testing and/or mapping multi-strand fiber-optic cables may be that the optical light sources emitted from the first end transmit device through each of the fiber ports may be configured to emit light in both the visible and infrared light spectrum. In select embodiments, the optical light sources may be LED optical light sources or laser type optical light sources.

Another feature of the disclosed system and/or method for qualification, testing and/or mapping multi-strand fiber-optic cables may be that the first end transmit device may further include an input power port connected to an internal rechargeable battery system. The internal rechargeable battery system may allow the disclosed system and/or method to be used in areas with or without accessible power.

Another feature of the disclosed system and/or method for qualification, testing and/or mapping multi-strand fiber-optic cables may be that the controller of the first end transmit device may include a DMX512 lighting controller and decoder. This DMX512 lighting controller and decoder of the first end transmit device may use the DMX512 protocol. The DMX512 lighting controller and decoder of the first end transmit device may operate in a pre-programmed standalone mode or an active user-controlled input mode. In select embodiments, the controller of the first end transmit device may have built-in electrical contacts configured for wired connectivity and manual control of lighting sequences via push button style switches located on the first end transmit device for standalone control.

Another feature of the disclosed system and/or method for qualification, testing and/or mapping multi-strand fiber-optic cables may be that the controller of the first end transmit device may be programmed with Morse code signaling, or the like. The Morse code signaling used by the first end transmit device may be basic and/or encrypted Morse code. The Morse code signaling used by the first end transmit device may be capable of using alternative characters in order to speed up transmission. Wherein, the coded light patterns emitted from the optical light sources may be coded in Morse code, the like, or a variation thereof. The controller may be configured to substitute a Morse code character with a preset value via a drop-down menu, including, but not limited to, Bld #, Cable #, Buffer tube, strand numbers, the like, etc. In other embodiments, the controller can be configured to convert voice to text. The controller may have, but is not limited to, 3 or 4 buttons that will allow a technician to substitute a predetermined character with another word or phrase. By holding down the voice input button the end-user can speak into the device and record the desired message to be decoded at the far end. In other select embodiments, the controller may substitute a predetermined character with a spoken word or phrase.

Another feature of the disclosed system and/or method for qualification, testing and/or mapping multi-strand fiber-optic cables may be the camera of the second end receive device may be configured to serve as a visual aid for viewing the visible light of the coded light patterns and may detect the unique port signature being sent in the form of Morse code, or other encrypted code, from the first end transmit device. The camera and the second end receive device may be configured to then decode the unique port signature of each of the fiber ports that was sent into as unencrypted, original text and display such unencrypted, original text on the second end receive device. In select embodiments, the second end receive device may be configured to convert the decrypted text message into an audibly announced word or phrase that duplicates the displayed message as sent from the first end transmit device. The second end receive device may include a display configured to visually display the unique port signature of each of the individual optical fibers of the multi-strand fiber-optic cable, and/or a speaker configured to audibly announce the unique port signature of each of the individual optical fibers of the multi-strand fiber-optic cable. In select embodiments, the second end receive device may include a touch-screen tablet or a smartphone with an external USB or WiFi otoscope or endoscope style camera attached as the camera. In select embodiments, the second end receive device may include a modified tablet configured to allow a feed from the external USB or WiFi otoscope or endoscope style camera to be recognized by the second end receive device as a native internal camera, where the display of the tablet may use built-in front or rear cameras. Wherein, the modified tablet of the second end receive device may be configured to allow the external USB or WiFi otoscope or endoscope style camera to display in the same manner as the built-in cameras. In select embodiments, the second end receive device may include a passive fiber connection and an infrared sensor card as a reflective component that can be configured to be viewed in visible or infrared by the camera.

In another aspect, the instant disclosure embraces the system and/or method for qualification, testing and/or mapping multi-strand fiber-optic cables in any of the embodiments and/or combination of embodiments shown and/or described herein.

In another aspect, the instant disclosure embraces a method for qualification, testing and/or mapping multi-strand fiber-optic cables that may generally include the steps of: providing the first end transmit device in any of the various embodiments and/or combination of embodiments shown and/or described herein; and providing the second end receive device in any of the various embodiments and/or combination of embodiments shown and/or described herein. With the provided first end transmit device and the provided second end receive device, in select embodiments, the disclosed method for qualification, testing and/or mapping multi-strand fiber-optic cables may include using the provided first end transmit device in combination with the second end receive device to provide non-contact identification, qualification, testing, mapping and/or troubleshooting of the multi-strand fiber-optic cable via coded light patterns emitted into each of the fiber ports corresponding to a unique port signature of each of the fiber ports.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

Figure 1:
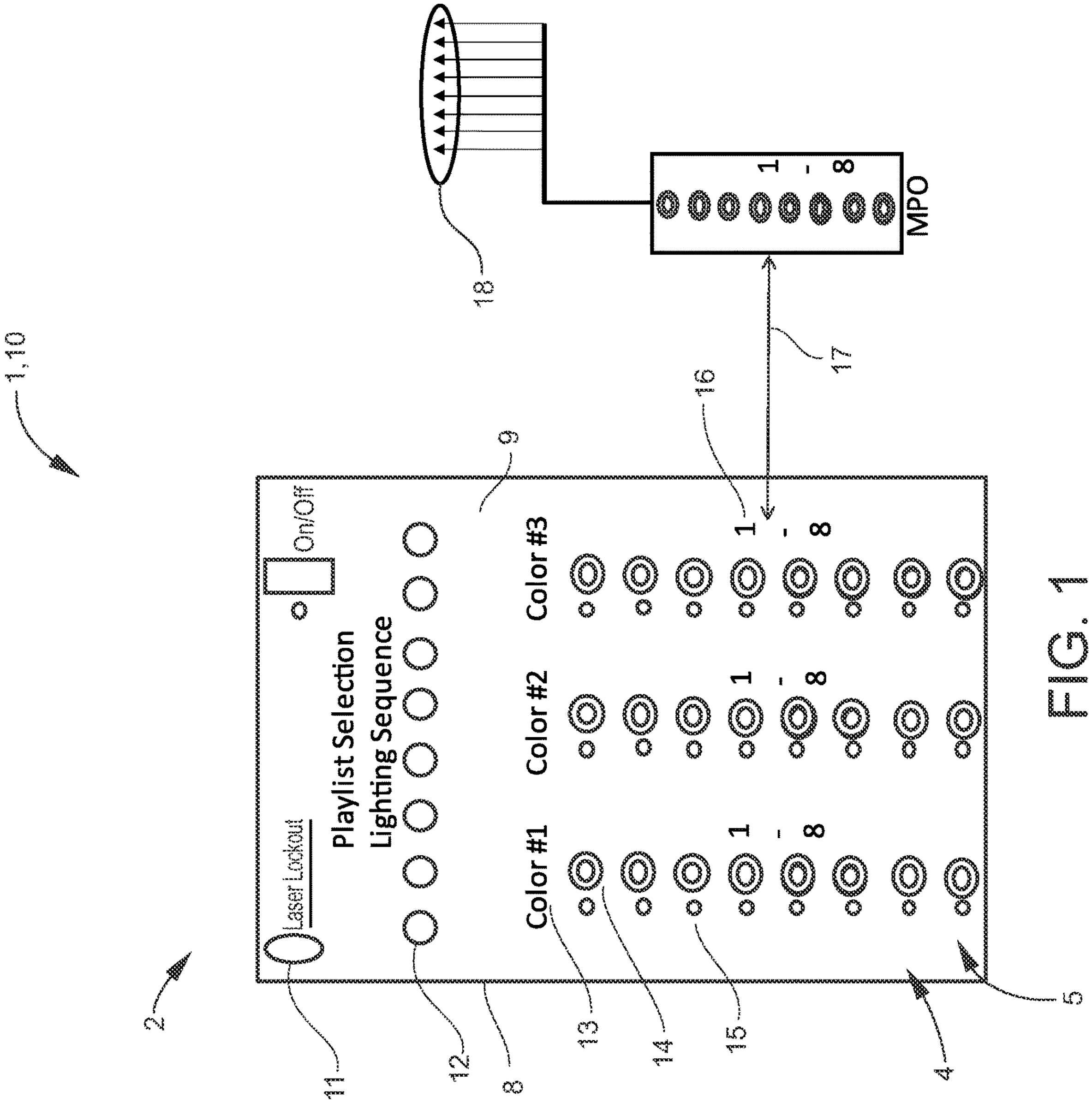
FIG. 1 is a schematic diagram of a face of a 24-port unit first end transmit device according to select embodiments of the instant disclosure.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-35, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

The present disclosure may solve the aforementioned limitations of the currently available systems and/or means for qualification, testing and/or mapping multi-strand fiber-optic cables by providing system 1 and/or method 10 for qualification, testing and/or mapping multi-strand fiber-optic cables. In general, system 1 and/or method 10 for qualification, testing and/or mapping multi-strand fiber-optic cables may include first end transmit device 2 and second end receive device 3. First end transmit device 2 may include at least one fiber port 4. Each of the fiber ports 4 may be configured to engage a connector for an individual optical fiber of a multi-strand fiber-optic cable. At least one optical light source 5 may be included with the first end transmit device 3. Each of the optical light sources 5 may be configured to emit an optical light in one of the fiber ports 4. Controller 6 may also be included with the first end transmit device 2. Controller 6 may be configured to control the optical light sources 5. Controller 6 may be configured to emit coded light patterns through each of the fiber ports 4 via the optical light emitted from each of the optical light sources 5. Wherein, the first end transmit device 2 may be configured to emit coded light patterns into each of the fiber ports 4 corresponding to a unique port signature of each of the fiber ports 4. The second end receive device 3 may include camera 7. Camera 7 of the second end receive device 3 may be configured to view and decode the coded light patterns from each of the individual optical fibers of the multi-strand fiber-optic cable to identify the unique port signature from each of the fiber ports 4.

One feature of system 1 and/or method 10 for qualification, testing and/or mapping multi-strand fiber-optic cables may be that it can be designed and configured to be used for non-contact identification, qualification, testing, mapping and/or troubleshooting of multi-strand fiber-optic cables.

System 1 and/or method 10 may be designed and/or configured to apply the unique port signature to each of the fiber ports 4 at a first end of the multi-strand fiber-optic cable, and locating a corresponding port signature at a second end of the multi-strand fiber-optic cable, thereby allowing an end-user to certify a new fiber installation, as well as audit and troubleshoot an existing fiber optic cable plant. System 1 and/or method 10 may allow the end-user to be able to perform qualification testing of a new fiber installation, as well as mapping and troubleshooting an existing installation. System 1 and/or method 10 may allow the end-user to provide certification as well, which may require more in-depth testing with multiple wavelengths and bidirectional testing.

In select embodiments of system 1 and/or method 10 for qualification, testing and/or mapping multi-strand fiber-optic cables, the first end transmit device 2 may further include housing 8. Housing 8 may have face 9 with the fiber ports 4. As such, the fiber ports 4 of the first end transmit device 2 may be face ports disposed on face 9. Each of the face ports may be configured to engage the connector for the individual optical fiber or a connector including multiple, individual optical fibers. In select embodiments of system 1 and/or method 10 for qualification, testing and/or mapping multi-strand fiber-optic cables, the first end transmit device 2 may include LED lights mounted on face 9. These LED lights mounted on the face may be configured to flash according to the corresponding laser port to assure that the first end transmit device 2 is functioning properly as well as providing a means to calibrate the second end receive device.

In select embodiments of system 1 and/or method 10 for qualification, testing and/or mapping multi-strand fiber-optic cables, the first end transmit device may further include individual optical tap ports 1313. The individual optical tap ports 1313 may correspond to each of the face ports. The individual optical tap ports 1313 may be configured for use with external optical components including, but not limited to, an optical power source used together with an optical power meter at a second end. In select embodiments, the optical light sources of the first end transmit device 2 may be coupled to the individual optical tap ports 1313 and the face ports. In select embodiments, the first end transmit device 2 may include fiber-optic splitters 184 and/or WDM couplers 153, 163 that will direct the optical light sources to or from each of the face ports and the individual optical tap ports 1313. Wherein, once a fiber has been identified, mapped, or repaired, an infrared power source may be transmitted by the first end transmit device 2 that can be configured to change to steady-on mode and, in conjunction with an optional second end power meter to determine an acceptable pass or fail dB loss of the fiber.

One feature of system 1 and/or method 10 for qualification, testing and/or mapping multi-strand fiber-optic cables may be that the optical light sources emitted from the first end transmit device 2 through each of the fiber ports 4 may be configured to emit light in both the visible and infrared light spectrum. In select embodiments, the optical light sources may be LED optical light sources or laser type optical light sources.

Another feature of system 1 and/or method 10 for qualification, testing and/or mapping multi-strand fiber-optic cables may be that the first end transmit device may further include an input power port 314 connected to an internal rechargeable battery system 313. The internal rechargeable battery system 313 may allow the disclosed system and/or method to be used in areas with or without accessible power.

Another feature of system 1 and/or method 10 for qualification, testing and/or mapping multi-strand fiber-optic cables may be that controller 6 of the first end transmit device 2 may include a DMX512 lighting controller 312 and decoder 311. This DMX512 lighting controller 312 and decoder 311 of the first end transmit device 2 may use the DMX512 protocol. The DMX512 lighting controller 312 and decoder 311 of the first end transmit device 2 may operate in a pre-programmed standalone mode or an active user-controlled input mode. In select embodiments, controller 6 of the first end transmit device 2 may have built-in electrical contacts configured for wired connectivity and manual control of lighting sequences via push button style switches located on the first end transmit device 2 for standalone control.

Another feature of system 1 and/or method 10 for qualification, testing and/or mapping multi-strand fiber-optic cables may be that controller 6 of the first end transmit device 2 may be programmed with Morse code signaling, or the like. The Morse code signaling used by the first end transmit device 2 may be basic and/or encrypted Morse code. The Morse code signaling used by the first end transmit device 2 may be capable of using alternative characters in order to speed up transmission. Wherein, the coded light patterns emitted from the optical light sources 5 may be coded in Morse code, the like, or a variation thereof. In select embodiments, controller 6 may be configured to substitute a Morse code character with a preset value via a drop-down menu, including, but not limited to, Bld #, Cable #, Buffer tube, strand numbers, the like, etc. In other embodiments, controller 6 can be configured to convert voice to text. Controller 6 may have, but is not limited to, 3 or 4 buttons that will allow a technician to substitute a predetermined character with another word or phrase. By holding down the voice input button the end-user can speak into the device and record the desired message to be decoded at the far end. In other select embodiments, controller 6 may substitute a predetermined character with a spoken word or phrase.

Another feature of system 1 and/or method 10 for qualification, testing and/or mapping multi-strand fiber-optic cables may be that camera 7 of second end receive device 3 may be configured to serve as a visual aid for viewing the visible light of the coded light patterns and may detect the unique port signature being sent in the form of Morse code, or other encrypted code, from the first end transmit device 2. Camera 7 and second end receive device 3 may be configured to then decode the unique port signature of each of the fiber ports 4 that was sent into as unencrypted, original text and display such unencrypted, original text on second end receive device 3. In select embodiments, second end receive device 3 may be configured to convert the decrypted text message into an audibly announced word or phrase that duplicates the displayed message as sent from the first end transmit device 2. Second end receive device 3 may include display 43 configured to visually display the unique port signature of each of the individual optical fibers of the multi-strand fiber-optic cable, and/or a speaker configured to audibly announce the unique port signature of each of the individual optical fibers of the multi-strand fiber-optic cable. In select embodiments, second end receive device 3 may include a touch-screen tablet or smartphone 42 with an external USB or WiFi otoscope or endoscope style camera attached as camera 7. In select embodiments, second end receive device 3 may include a modified tablet 42 configured to allow a feed from the external USB or WiFi otoscope or endoscope style camera to be recognized by second end receive device 3 as a native internal camera, where the display of the tablet may use built-in front or rear cameras. Wherein, the modified tablet 42 of second end receive device 3 may be configured to allow the external USB or WiFi otoscope or endoscope style camera to display in the same manner as the built-in cameras. In select embodiments, second end receive device 3 may include a passive fiber connection and an infrared sensor card as a reflective component that can be configured to be viewed in visible or infrared by camera 7.

Referring now specifically to FIG. 1, a face of a 24-port unit first end transmit device according to select embodiments of the instant disclosure is shown. Laser lockout indicator 11 is shown if required. Playlist selection lighting sequence 12 can be programmed by the end-user to control lighting sequence according to port numbers. Colors set up in columns 13, like LED or laser lit colors, provide a visible spectrum. In some embodiments a light in the infrared spectrum with the same port signature may be transmitted simultaneously. This will extend the range of the device due to the limitations of the visible wavelengths. This will also allow for power meter testing at that wavelength at the second end. Ports 14 may be set up in rows with unique port signature per U.S. Pat. Nos. 8,823,925 and 8,467,041. The connector type may include FC, LC, SC, ST, MPO, the like, etc. LED indicator lights 15 may show the status of the fiber optic connector port and can be used to confirm operational status and calibrate the far end device prior to use. Port numbering scheme 16 can be, but is not limited to, three columns of #1 though #8 by color or sequentially, e.g., #1 through #24. The quantity may increase or decrease as needed. There may be two or more columns of unique colors in the visible spectrum. MPO-style connector 17 is shown as an example (vs. single connectors of face). These MPO-style connectors 17 may be on face to fanout connectors, LC, SC, ST, the like, etc. Custom made fanout MPO trunk 18 is shown as an example for an individual or duplex fiber connector configuration. These non-MPO connectors may be ST, LC, FC, SC, etc. These custom made fanout MPO trunk 18 may be custom fanout cables from first end transmit device to be mated with end-user's fiber-optic cable plant.

Figure 2:
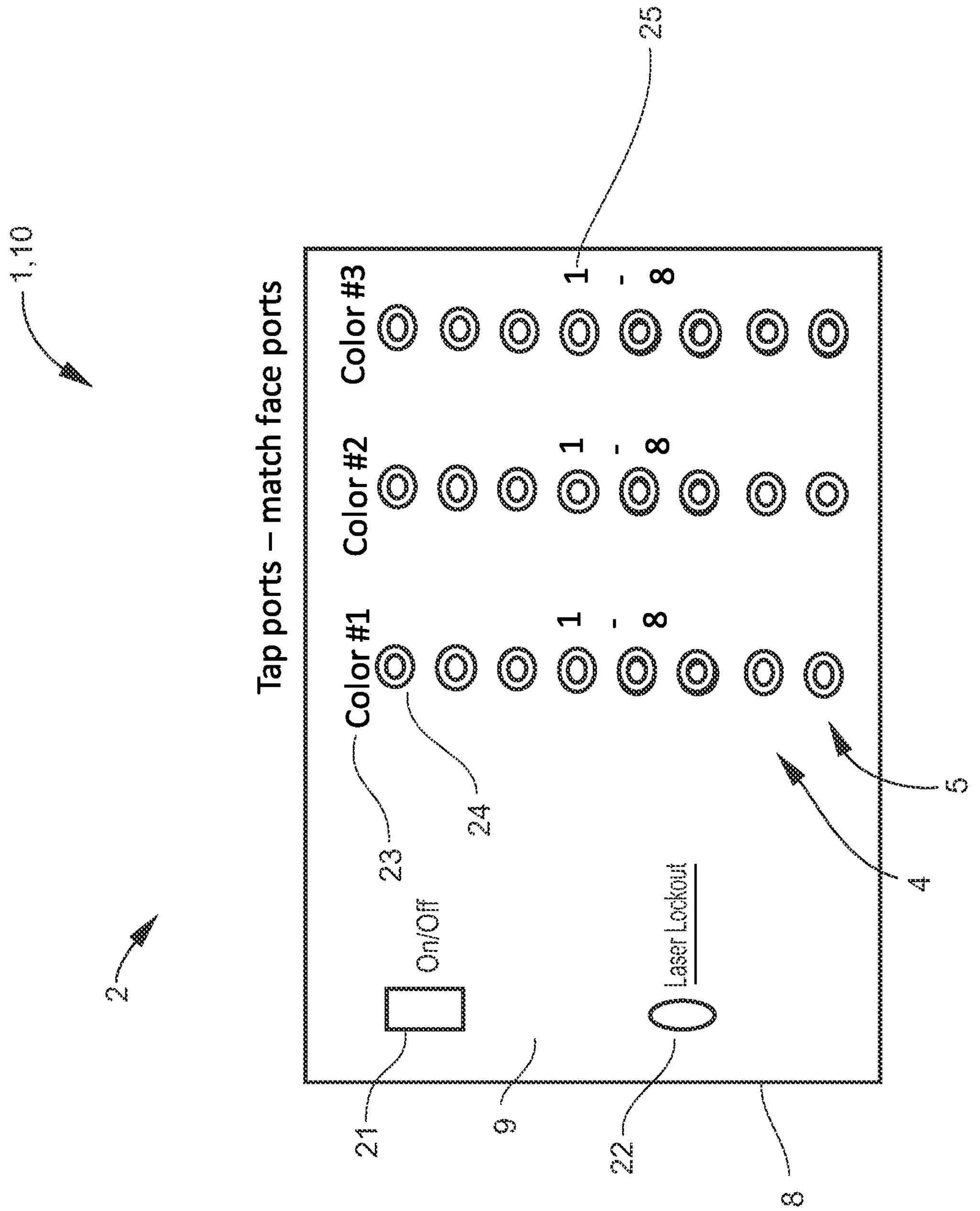
FIG. 2 is a schematic diagram of a side of the 24-port unit first end transmit device of FIG. 1.

Referring now specifically to FIG. 2, a side of a 24-port unit first end transmit device is shown according to select embodiments of the instant disclosure. Power on/off switch 21 is shown for turning on and/or off the device. Laser lockout indicator 22 as/if needed. Tap port 23 is matched up one-for-one with face ports. Tap ports 23 can be configured to be unidirectional or bidirectional. Fiber optic connector ports 24 are set up in rows and can include a unique port signature per two existing patents: see U.S. Pat. Nos. 8,823,925 and 8,467,041. Connector type may include FC, LC, SC, ST, MPO, etc. Corresponds one-to-one with connectors on face of device. Port numbering scheme 25 can be, but is not limited to, three columns of #1 though #8 or sequentially, i.e., #1 through #24. The quantity may increase or decrease as needed. There may be two or more columns of unique colors in the visible.

Figure 3:
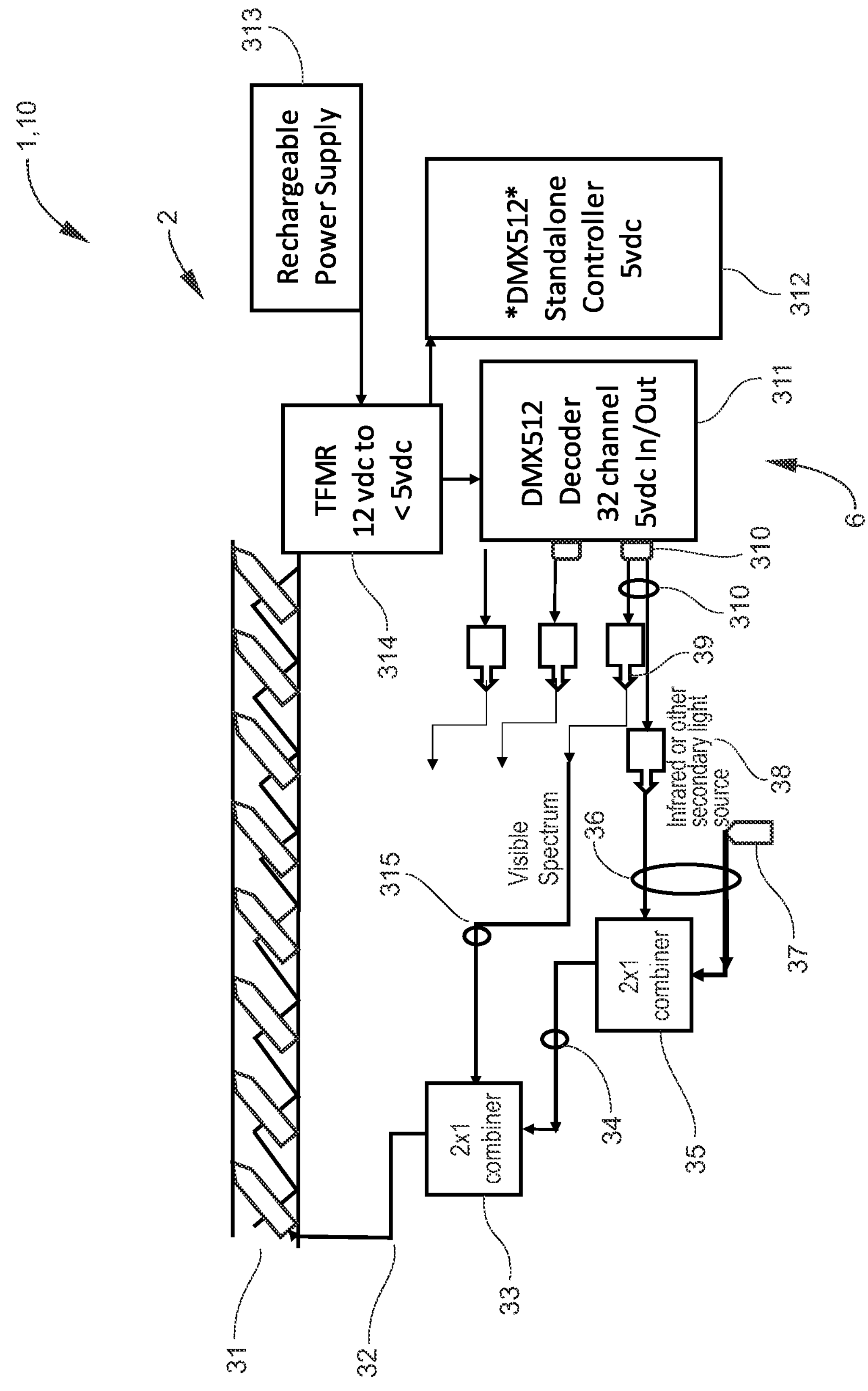
FIG. 3 is a schematic diagram of an internal view of a 24-port unit first end transmit device according to select embodiments of the instant disclosure.

Referring now specifically to FIG. 3, an internal view of a 24-port unit first end transmit device is shown according to select embodiments of the instant disclosure. The shown 24-port unit sending device may have singular fiber couplers, type FC, LC, SC, the like, etc., or grouped in an MPO style connector. In select embodiments, there may be 8 rows by 3 columns, or there may be 4 or more columns and 12 or more rows. Fanout cables may be customized to accommodate the end-user's requirements and may be custom-color coded and numbered FC-SC, etc., or may be end-user provided. Fiber optic ports 31 on the face of the device are in columns of colors and rows of port signatures. The connector type may include FC, LC, SC, ST, MPO, etc. Single mode fiber 32 from combiner to ports on the face of the device. Although single mode fiber may be used throughout the drawings, it should be understood that multimode fiber can be used as well, not only in FIG. 3, but throughout the drawings and description. As an example, multimode fibers can be used/substituted for short range applications. In addition, a single light source can be used without the 2×1 combiner, where the laser is direct to the face of the unit. 12×1 combiner 33 with visible input, infrared input, and combined output. In some embodiments the combiner 33 may include two inputs in the same light spectrum. Single mode fiber 34 between combiners. Multimode fiber may be used instead of singled mode fiber 34, especially for short range applications. Optical bandpass or other inline filter may be added as/if needed. 2×1 combiner 35 with one infrared input and a tap port for use with a power source and far end power meter, or an OTDR or another device, and one combined output. Single mode fibers 36 connecting infrared laser, tap port, and combiner. Optical bandpass or other inline filter may be added as/if needed. Tap port 37 on the side of the device. Infrared laser 38 at 1310 nm. May also use 850 nm, 1490 nm, 1550 nm—IR-A or IR-B. Laser 39 in the visible spectrum. Positive and negative 5 vdc signaling ports 310 are connected in tandem. Multiport DMX512 decoder 311 can be 12, 24, 36, 48, or another configuration. May be modular in groups of 12, 16, 24, 32, the like, etc. DMX controller 312—may be optional ARTnet, RDM, or other Ethernet/DMX compatible controller for 2-way communication. This DMX (a.k.a. DMX512 & DMX512-A) controller may use unidirectional signaling (EIA-485/TIA485) to downstream components. However, in some embodiment, when connected with other DMX512 compatible hardware and software such as ARTnet, RDM, and other Ethernet based protocols, it can be configured for bi-directional communications over Ethernet twisted-pair media or a fiber to twisted-pair media converter. Main power supply 313 with input port at the side of the device, and rechargeable. Step-down transformer 314 as needed for 5 vdc lasers or LEDs, DMX controller and DMX decoder. Single mode fiber 315 between combiner and laser. Optical bandpass or other inline filter added as/if needed.

Figure 4:
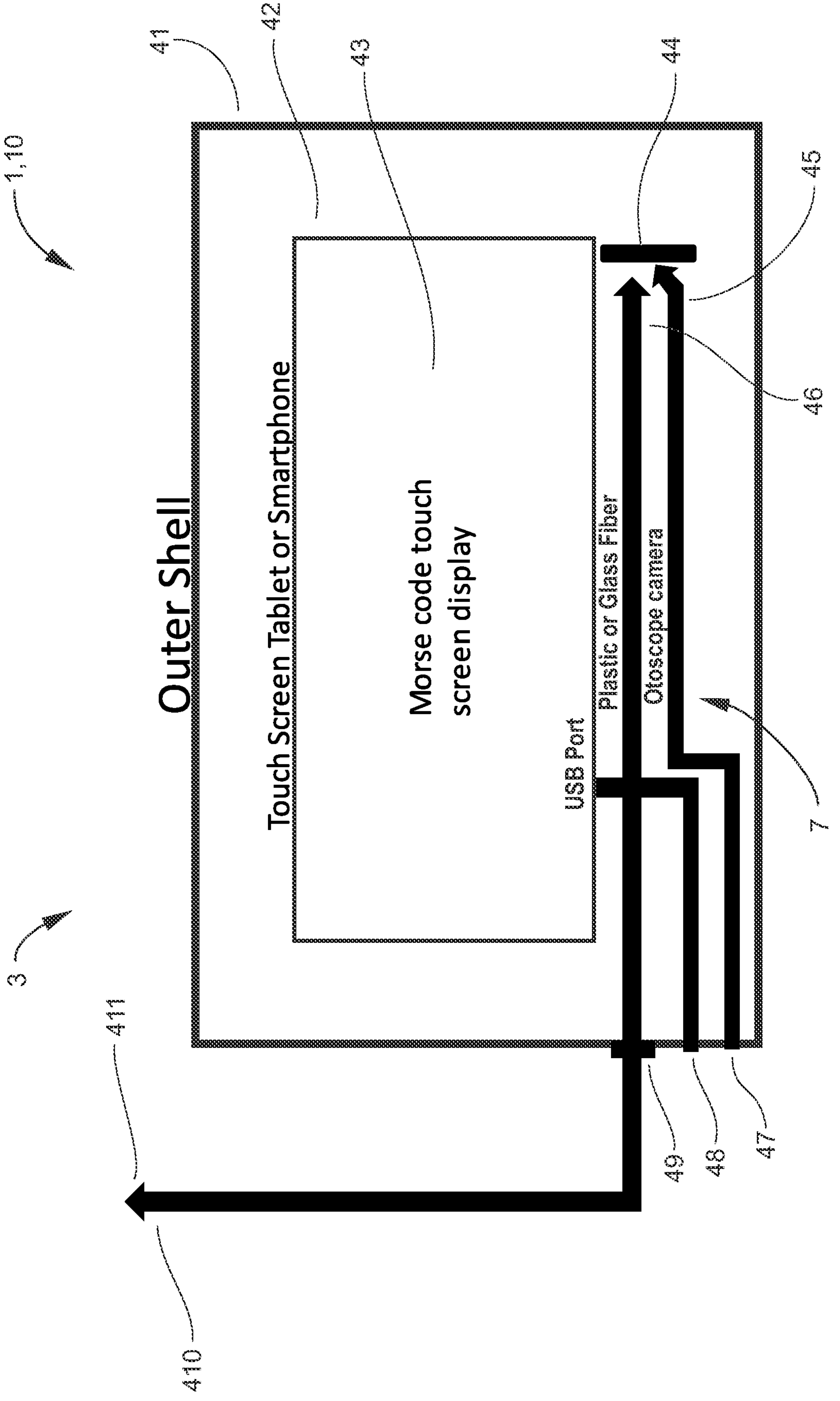
FIG. 4 is a schematic diagram of a second end receive device (type 1) according to select embodiments of the instant disclosure.

Referring now specifically to FIG. 4, a first type second end receive device according to select embodiments of the instant disclosure is shown. In this figure, outer protective shell/enclosure 41 is shown. A 7" touch-screen tablet or smartphone 42 with USB port. In other embodiments a smaller or larger tablet may be used. Tablet may be customized to accept the USB camera as a native internal camera. Display 43 shows decrypted Morse code text and converts the text into audible output of displayed text. Infrared sensor card 44 is to illuminate infrared as well as reflect visible colors—to be detected by USB camera and displayed on 7" tablet screen within the Morse code app. USB otoscope or endoscope type camera 45. Plastic or glass fiber directing light 46 from sending device at sensor card for illumination. USB power output 47 for camera which can jump to other port for normal operation. USB port 48 is on external shell/enclosure 41 to be used to recharge the tablet and may be used for USB camera input. Plastic or glass fiber 49 exits the shell/enclosure 41. Plastic or glass fiber 410 going to end-user's patch panels or cables to test. An optional custom band-pass filter 411 is include which can be added to block visible light and allow only infrared light to pass into the device. Both visible and infrared light sources may flash on each port together or individually, but the port signature will remain the same as the visible light, which will travel much shorter distances. When that distance is exceeded, the filter can be added for decoding, or in some embodiments dual cameras may be used, as well as a USB selector switch.

Figure 5:
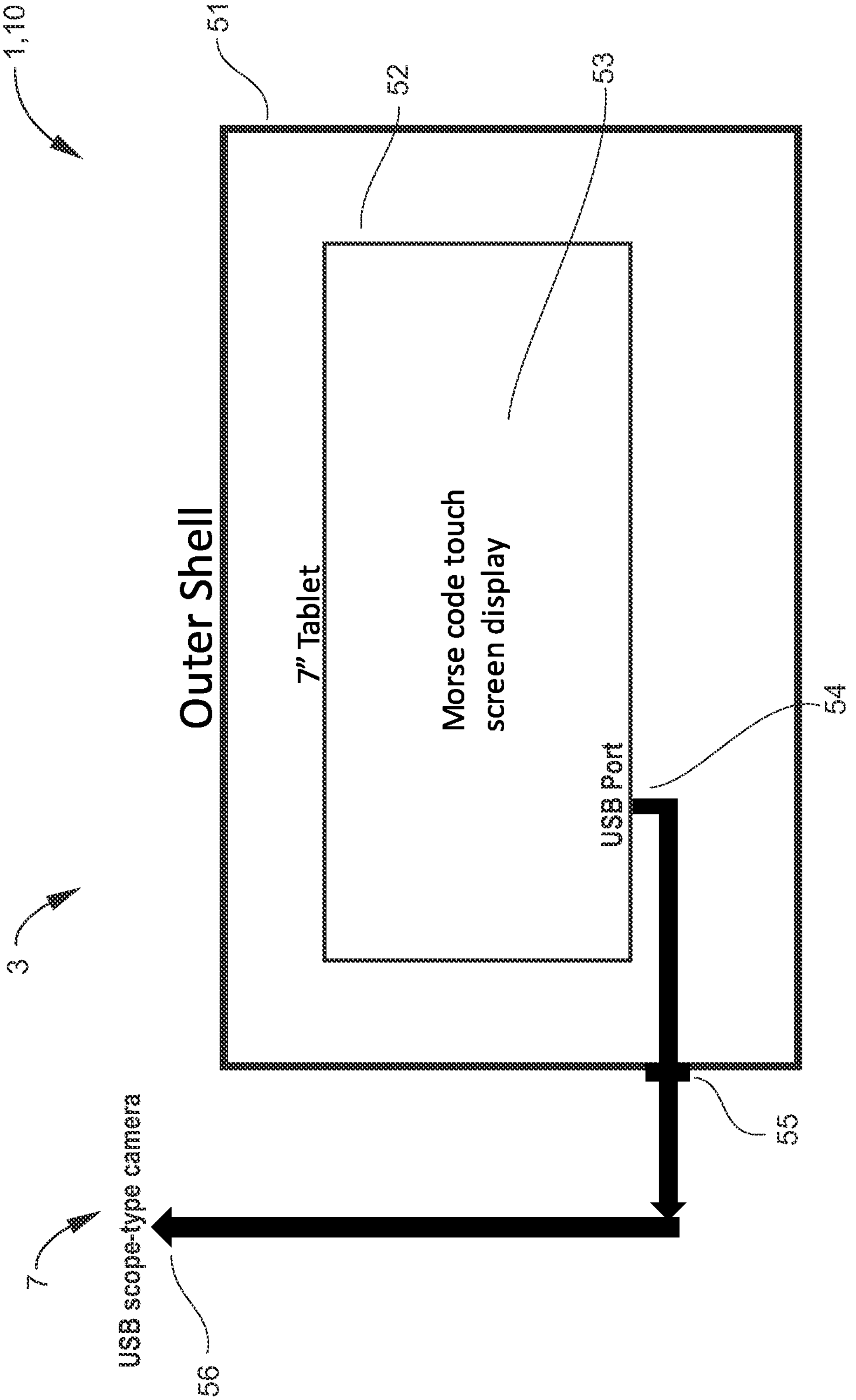
FIG. 5 is a schematic diagram of another second end receive device (type 2) according to select embodiments of the instant disclosure.

Referring now specifically to FIG. 5, a second type second end receive device according to select embodiments of the instant disclosure is shown. In this figure, outer protective shell/enclosure 51 is shown and is optional. 7" touch-screen tablet 52 includes USB port. In other embodiments a smaller or larger tablet may be used. Tablet may be customized to accept the USB camera as a native internal camera. Display 53 shows decrypted Morse code text and converts the text into audible output of displayed text. USB power 54 may be for the camera. Plastic or glass fiber 55 exits the enclosure. External USB camera 56 is going to patch panels to test. An optional custom band-pass filter can be added to block visible light and allow only infrared light to pass into the device. Both visible and infrared light sources may flash on each port together or individually, but the port signature will remain the same as the visible light, which will travel much shorter distances. When that distance is exceeded, the filter can be added for decoding, or in some embodiments dual cameras may be used.

Figure 6:
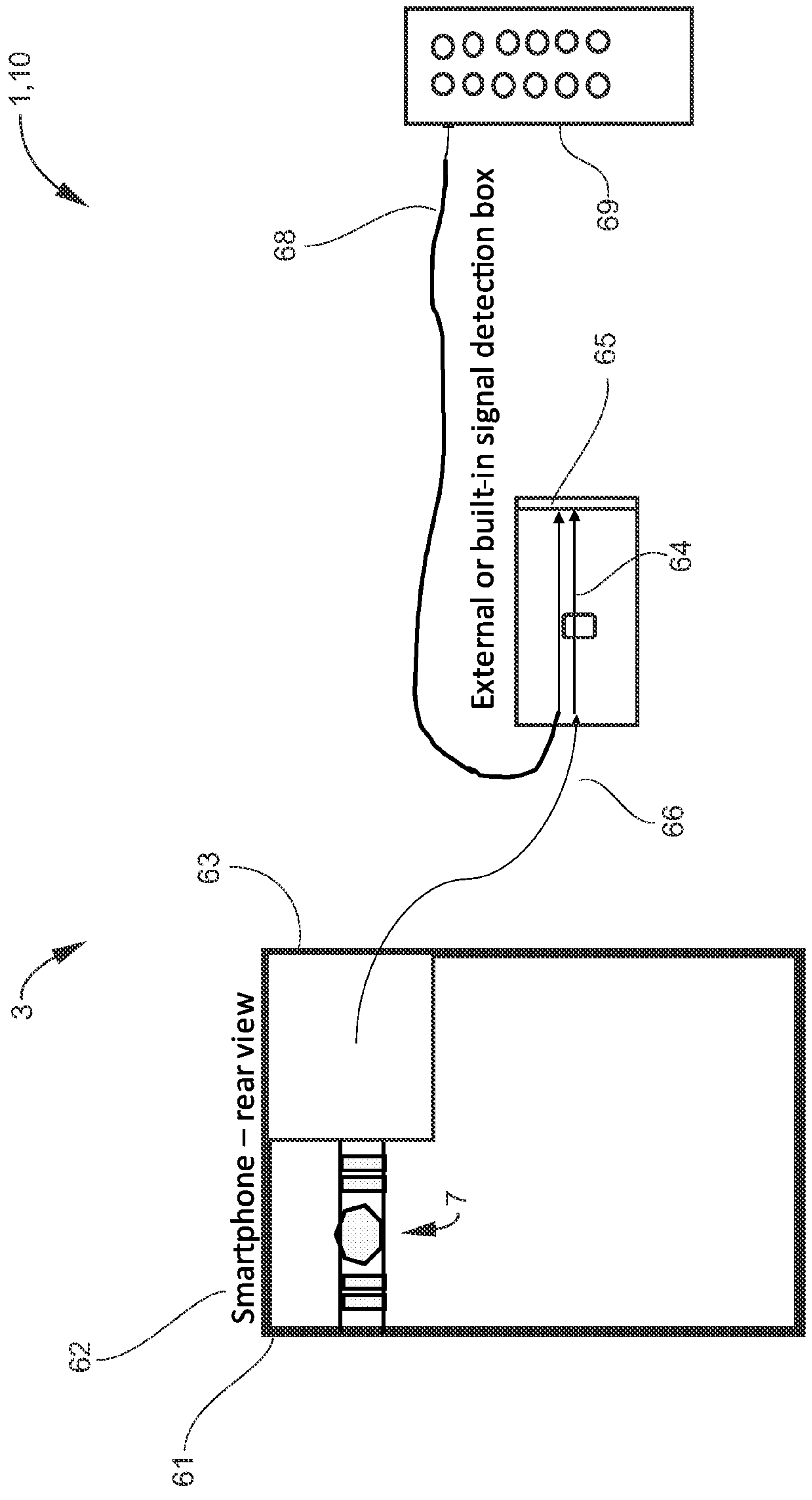
FIG. 6 is a schematic diagram of another second end receive device (type 3) according to select embodiments of the instant disclosure.

Now referring specifically to FIG. 6, a third type second end receive device according to select embodiments of the instant disclosure is shown. In this figure, typical smartphone 61 may be included or may be provided by end-user. Rear side 62 of smart phone may include camera lenses. Custom made clamp-on attachment 63 may be to cover any front or rear camera(s) that is native to the device as front & rear so that it can include the capture light from the plastic or glass fiber and decoded within the Morse code app, or another custom digital encrypted and decrypted protocol with audio conversion capabilities. An optional external enclosure 64 may be an external or built-in signal detection box. This optional external enclosure 64 may contain an infrared sensor card and a slide (or other push button type) switch to toggle between visible spectrum detection mode to infrared spectrum detection mode. In other embodiments, the sensor card may be located within the clamp-on attachment 63. Infrared sensor card 64. Plastic or glass fiber 65 between the clamp-on attachment and the external signal detection box. Plastic or glass fiber 66 exits the external signal detection box and detects light at end-user's fiber patch panel, cable, etc. 2$^{nd}$ end fiber 68, plastic or glass type, is held near the end of the fiber connector (non-physical contact with end-user's fiber connector as defined by the FOA). Provided there is sufficient light exiting the fiber connector, the signal can be decoded through a clear dust cap or with it removed. End-user's patch panel 69 under test, where the second end plastic or glass fiber optic cable may extend to the end-user's fiber-optic connector adapter panel. The decoding can be through a clear dust cap or with it removed.

Figure 7:
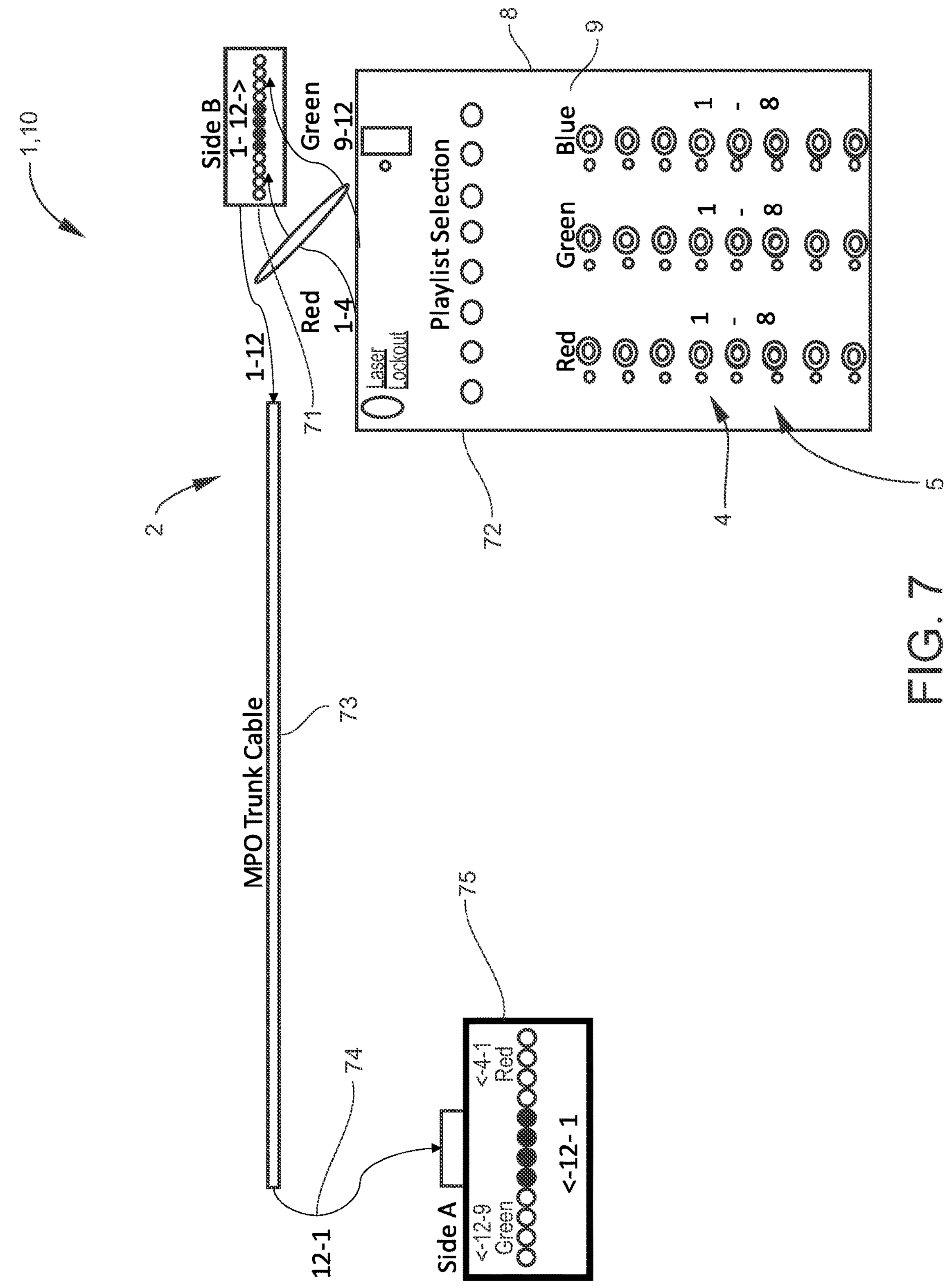
FIG. 7 is a schematic diagram of a Multi-Fiber Push On ("MPO") breakout box for the first end transmit device with VIS and IR capabilities according to select embodiments of the instant disclosure.

Now referring specifically to FIG. 7, an MPO breakout box with VIS and IR capabilities for the first end transmit device of the according to select embodiments of the instant disclosure is shown. In this figure, MPO multi-fiber cable 71 has MPO connectors on each end and may include custom adapters and/or cables. In this configuration it may be used for 40 gbps & 100 gbps short-haul data center or other high-bandwidth applications where strands 5-8 are not used. In other embodiments it may be used for MPO to fanout, end-user's cable plant, or long-haul single mode applications. Transmit device 72 may be similar to the transmit device shown in FIG. 1. Custom-made passive adapter 73 for identifying and mapping MPO trunk cables and fanout assemblies. Light 74 may be extended from the end-user's cable plant via internal fiber to these twelve ports and can be used to map connectivity from far end connector, e.g., another MPO connector or fanout assemblies with SC, ST, LC and other fiber connector. All one color (1$^{st}$ color/column & minimum of two colors and two port signatures) and may be decoded with receive device. Custom MPO cable adapter. It is not a standard mated connector that will make physical contact with the end-user's cable plant. This will be a non-mated, non-physical contact connection with end-user's fiber connector as defined by the FOA. Light 74 may include a custom MP cable adapter and can include a standard mated connector that will make physical contact. Light may extend from the end-user's cable plant via internal fiber to the twelve ports in passive device 75 and can be used to map connectivity from far end connector. e.g., another MPO connector or fanout assemblies with SC, ST, LC and other fiber connector. This can be all one color (2$^{nd}$ color/column) and can be decoded with receive device. This breakout box of passive device 75 may be for mapping and decoding with the receive unit. As an example, a 40 gbps and 100 gbps MPO-8 in 12 strand trunk (strands 5-8 may not be used in this scenario). Test port polarity and continuity test 4 pair. This may be expandable to 16, 24, 36, 48, etc.

Figure 8:
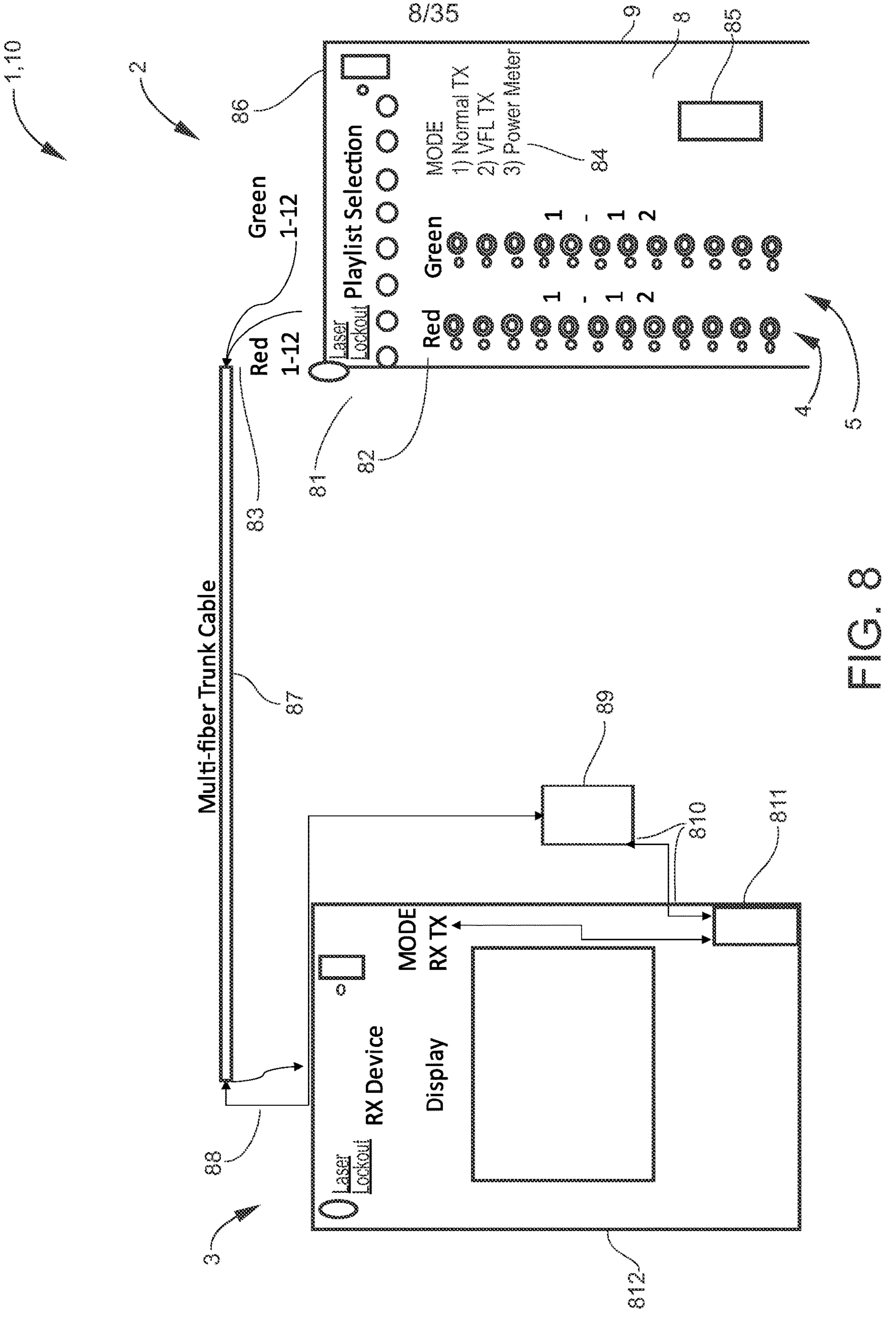
FIG. 8 is a schematic diagram of a 2-way communication with VIS & IR capabilities for the first end transmit device according to select embodiments of the instant disclosure.

Referring now specifically to FIG. 8, a 2-way communication with VIS & IR capabilities for the first end transmit device according to select embodiments of the instant disclosure is shown. DMX512 unidirectional controllers & decoders also work with bi-directional Ethernet devices and protocols such as ART-net and RDM (remote device management) and others. This can be used to control the transmit device, once a single operational fiber strand has been identified. Once the fiber has been identified the end-user can attach a simplex fiber to twisted-pair media converter attached to the DMX512 (RDM) compatible controller. Control between the transmit device and the receive device can now connect at a wavelength not being used for identification purposes. A signal is sent by the receive device to the transmit device that will allow the receive device to take control of the transmit device which will then be able to change settings to a different mode or transmission pattern. The transmit device can be set to operate in Power Meter Mode by simply using the 1310 infrared signal being transmitted and setting to steady-on and all strands exiting the transmit device can be zero referenced and the receive device can be set up with a built-in power meter. This will allow the end-user full 2-way control, which allows a single technician to perform multiple tasks, such as: changing the lighting playlist, set a port to steady VFL mode, send a CW light to the receive device so that the receive device can be plugged into the multi-fiber bundle and loss measurements can be recorded and compared. This will provide pass/fail information to the end-user before moving on to other locations. In this figure, 24-port modular transmit device 81 is shown, but this can be configured as a 12-port modular device also, like 6 red & 6 green. It may have a single DMX/RDM (remote device management—capable) a controller which provides 2-way communication capabilities. This modular design only requires one DMX connection to the second add-on device as they can be daisy-chained for expansion. Ports 82 are setup in two columns of colors and 12 rows of port signatures. 24 fiber strands 83 are shown entering the end-user's cable plant. Select mode 84 that the transmit device will be set in at the start, but can be changed by the receive device. By using the optional DMX/RDM controller 85, the transmit device's mode can be changed remotely by adding the optional RDM/DMX devices. On/off switch 86 is shown for turning the device on and/or off. End-user's cable plant 87 is shown under test. The end-user can plug into that known port and 2-way communication 88 can now begin over a wavelength in the infrared spectrum. A standard simplex fiber to twisted-pair media converter 89 may be used for 2-way communications. RJ45 twisted-pair connection 810 may be installed between the media converter and the receive device. The twisted-pair port 811 on the media converter connects to the RDM/DMX controller for communications and control of transmit device. Receive device 812 may be a modified version of the receive device shown in the other FIGS. 4-6. The remote access cabling and controls can be installed internally within the enclosures at both end device.

Figure 9:
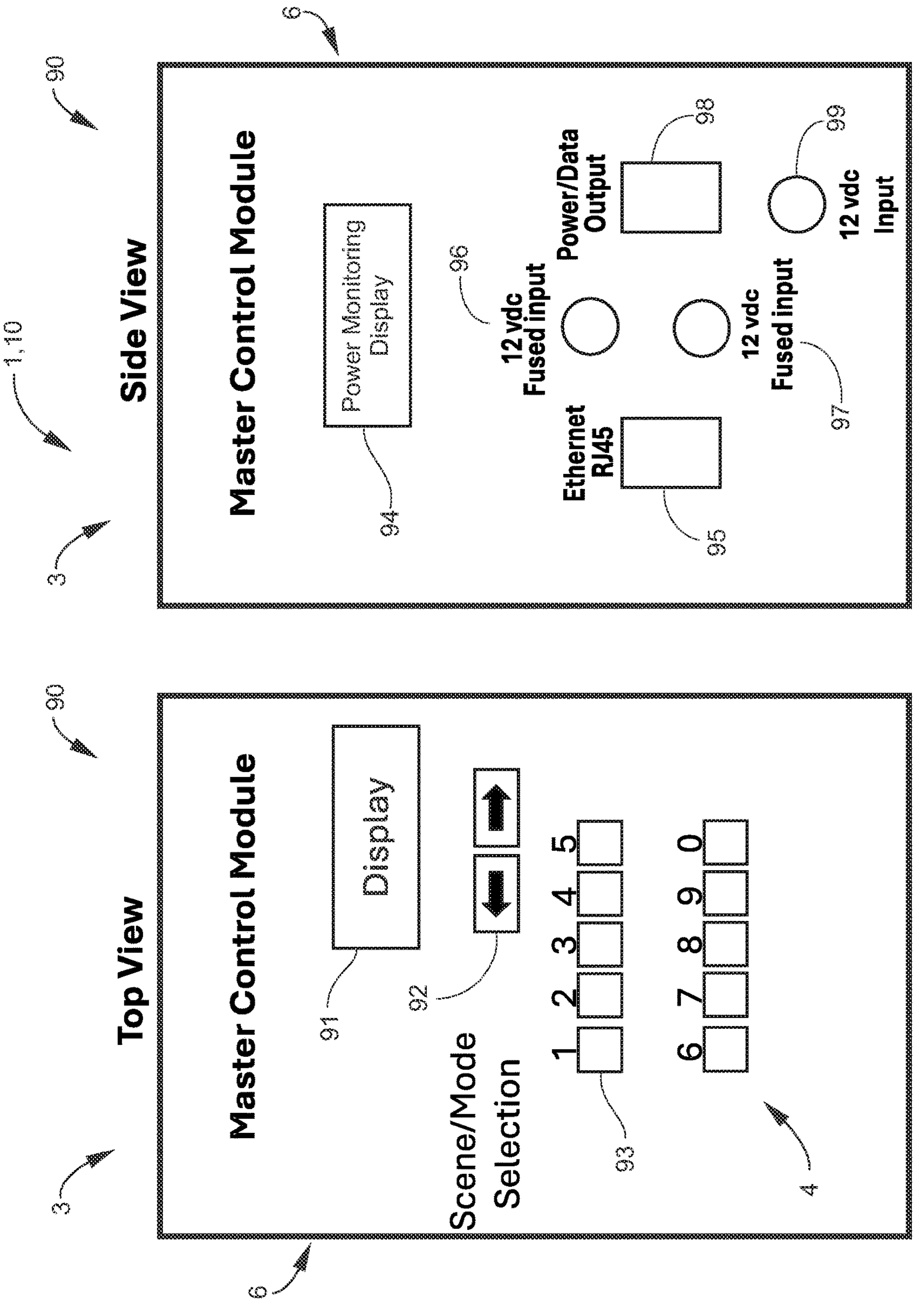
FIG. 9 is a schematic diagram of an external view of a master control module of the first end transmit device according to select embodiments of the instant disclosure.

Referring now specifically to FIG. 9 is a schematic diagram of an external view of a master control module 90 for the first end transmit device according to select embodiments of the instant disclosure is shown. A schematic diagram of a top view of the master control module 90 is shown on the left and a schematic diagram of a side view of the master control module 90 is shown on the right. In the top view, the display 91 is shown with the scene/mode selection 92 and the ports 93. In the side view, the power monitoring display 94 is shown with the ethernet RJ45 95, the 12 vdc fused input 96, the 12 vdc fused input 97, the power/data output 98, and the 12 vdc input 99.

Figure 10:
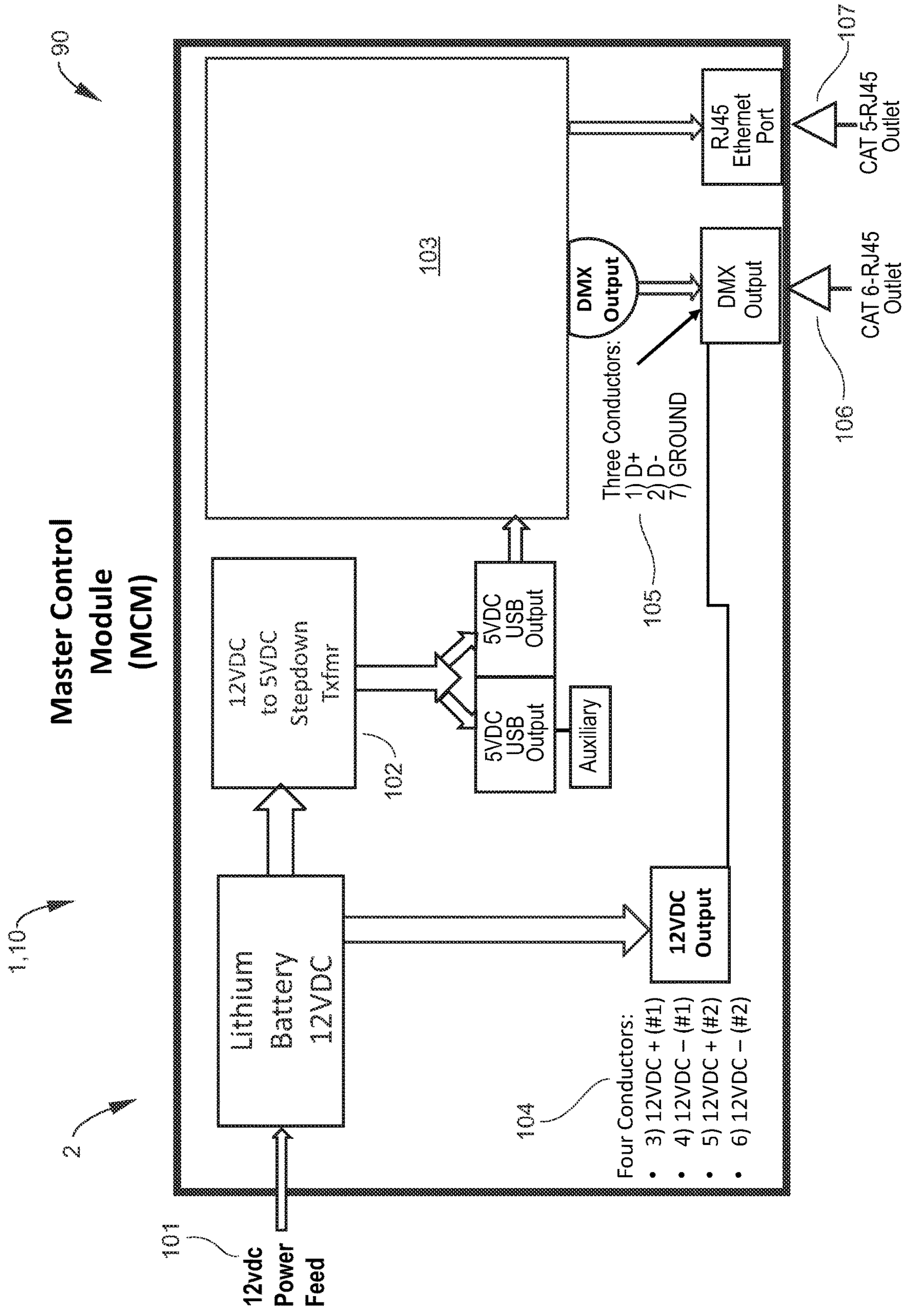
FIG. 10 is a schematic diagram of an internal view of the master control module of the first end transmit device of FIG. 9.

Referring now specifically to FIG. 10 a schematic diagram of an internal view of the master control module 90 for the first end transmit device of FIG. 9 is shown. Power feed 101 is shown for 12 VDC to the lithium battery 12 VDC. This is stepped down with stepdown transformer 102 from 12 VDC to 5 VDC to provide the 5 VDC USB output (auxiliary) and the 5 VDC USB output. The DMX512 scene controller & selector switch 103 is provided and can operate in live mode connected to a PC or other device via ethernet port. It can also operate in stand-alone mode via internal storage and built-in keypad. It can also operate in remote control mode via Ethernet port. Four conductors 104 are provided for 12 VDC output to DMX output 1066. DMX output 105 from DMX512 scene controller and selector switch 103 has three conductors with D+, D− and Ground. DMX output 106 may be provided with a CAT 6-RJ45 outlet. The RJ45 Ethernet Port 107 may be provide with a CAT 5-RJ45 Outlet.

Figure 11:
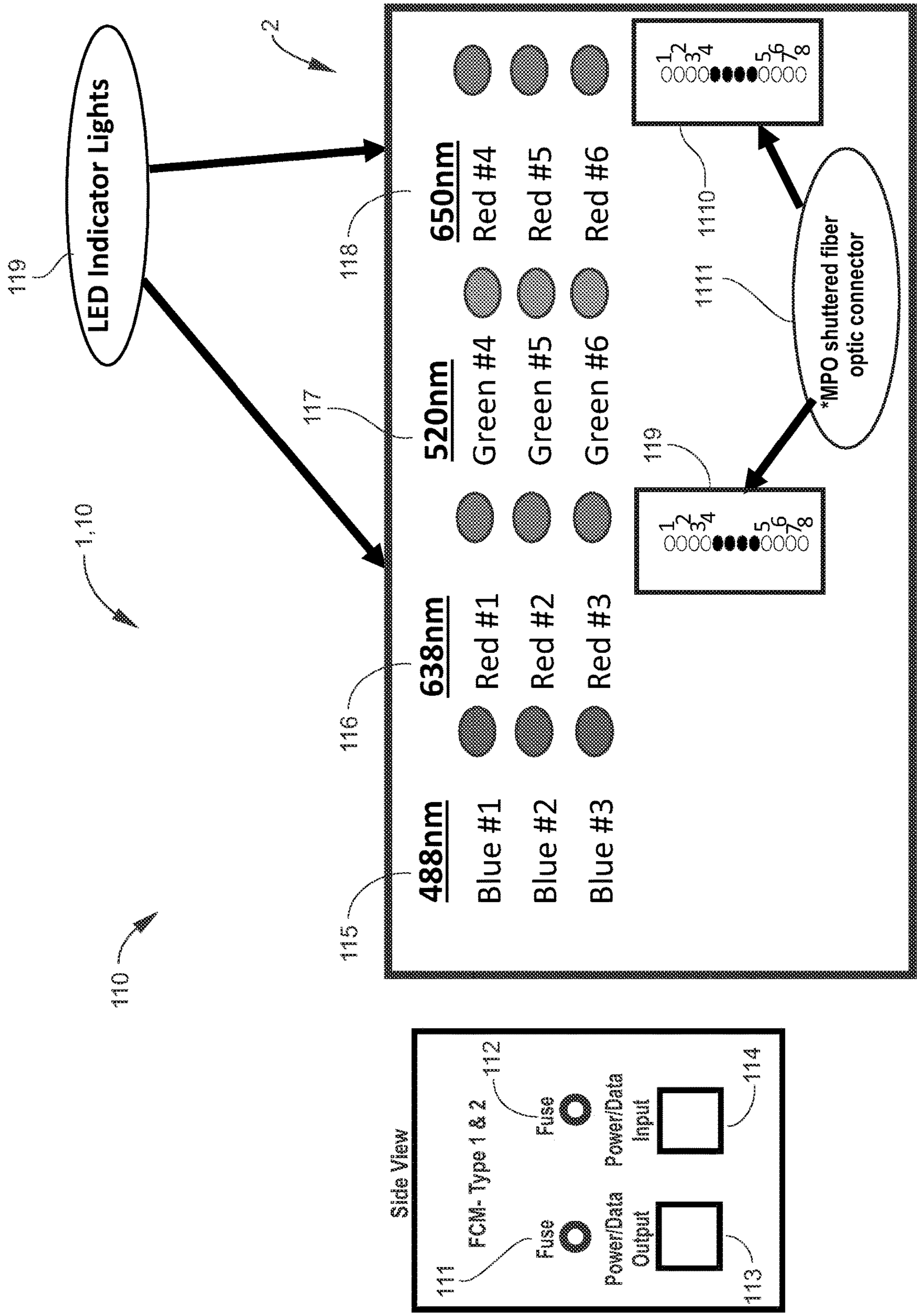
FIG. 11 is a schematic diagram of an external view of a fiber control module (type 1) of the first end transmit device according to select embodiments of the instant disclosure.

Referring now specifically to FIG. 11, a schematic diagram of an external view of a fiber control module 110 (type 1) for first end transmit device 2 according to select embodiments of the instant disclosure is shown. Fuses 111 and 112 may be FCM—Type 1 and 2 fuses connected with power/data output 113 and power/data output 114. 488 nm indicators 115 for blue numbers 1-3, 638 nm indicators 116 for red numbers 1-3, 520 nm indicators 117 for green numbers 4-6, and 650 nm indicators 118 for red numbers 4-6 may include LED indicator lights 119. MPO shuttered fiber-optic connector 1111 may include connectors 119 and 1110, as shown. This basic version of the fiber control module 110 (type 1) for the first end transmit device 2 can be used without the 2×1 combiners. A single light source to the output connecter is the simplest form of this device and may be the most desirable.

Figure 12:
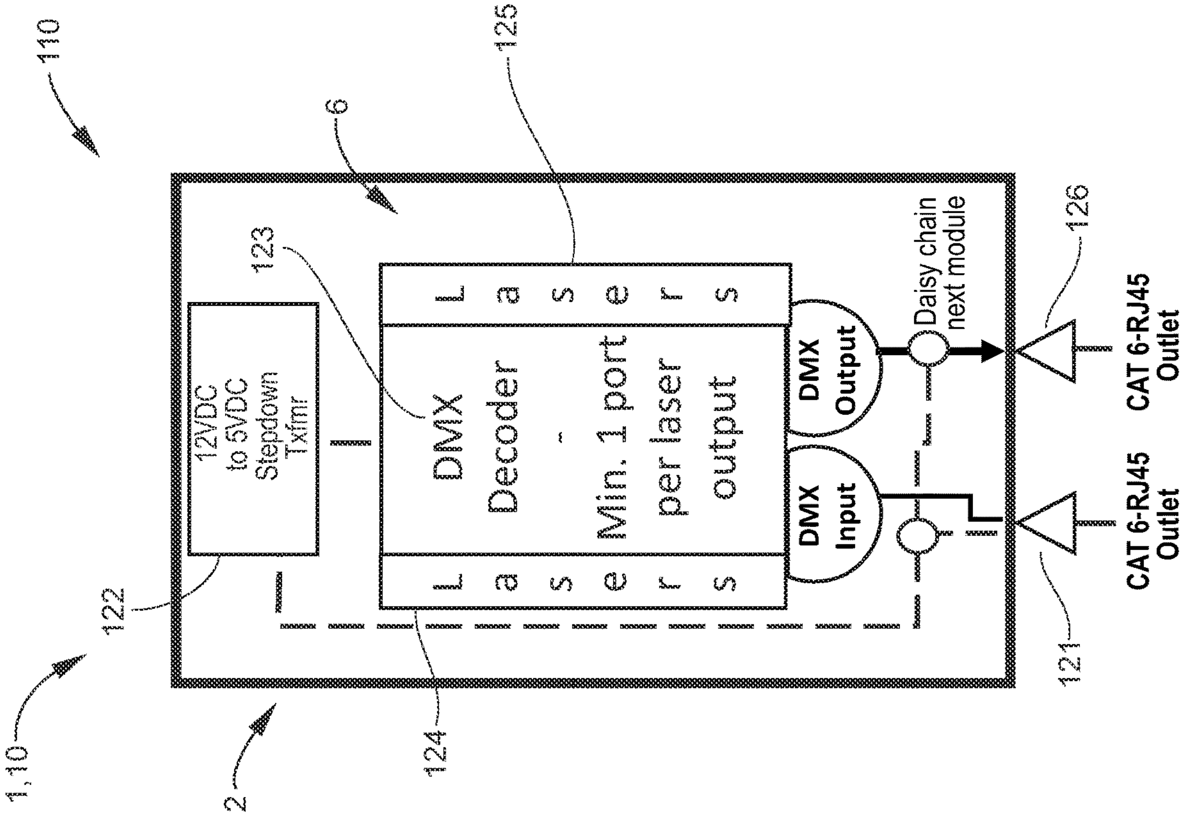
FIG. 12 is a schematic diagram of an internal view of the fiber control module (type 1) of the first end transmit device of FIG. 11.

Referring now specifically to FIG. 12, a schematic diagram of an internal view of the fiber control module 110 (type 1) for the first end transmit device of FIG. 11 is shown. DMX input 121 is provided via CAT6-RJ45 outlet and connects with stepdown transfer 122 for stepping down from 12 VDC to 5 VDC. DMX decoder 123 is included with a minimum of 1 port per laser output and includes lasers 124 with laser heat sink/mounts 125. DMX output 126 is provided with CAT6-RJ45 outputs, and can be daisy chained to next module.

Figure 13:
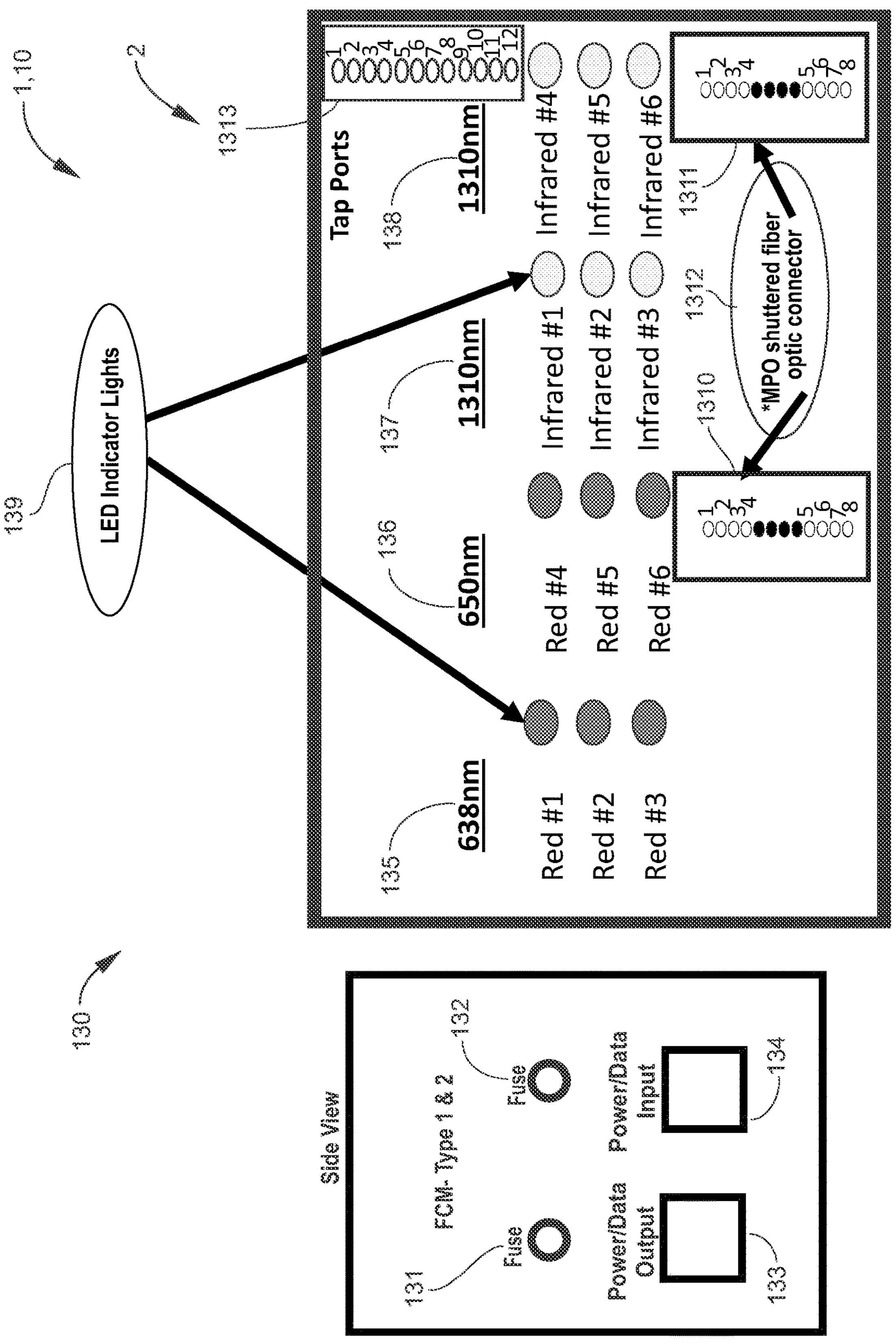
FIG. 13 is a schematic diagram of an external view of a fiber control module (type 2) of the first end transmit device according to select embodiments of the instant disclosure.

Referring now specifically to FIG. 13, a schematic diagram of an external view of a fiber control module 130 (type 2) for the first end transmit device according to select embodiments of the instant disclosure is shown. Fuses 131 and 132 may be FCM—Type 1 and 2 fuses connected with power/data output 133 and power/data output 134. 4638 nm indicators 135 for red numbers 1-3, 650 nm indicators 136 for red numbers 4-6, 1310 nm indicators 137 for infrared numbers 4-6, and 1310 nm indicators 138 for infrared numbers 4-6 may include LED indicator lights 139. MPO shuttered fiber-optic connector 1311 may include connectors 139 and 1310, as shown. Tap ports 1313 may also be provided, as shown.

Figure 14:
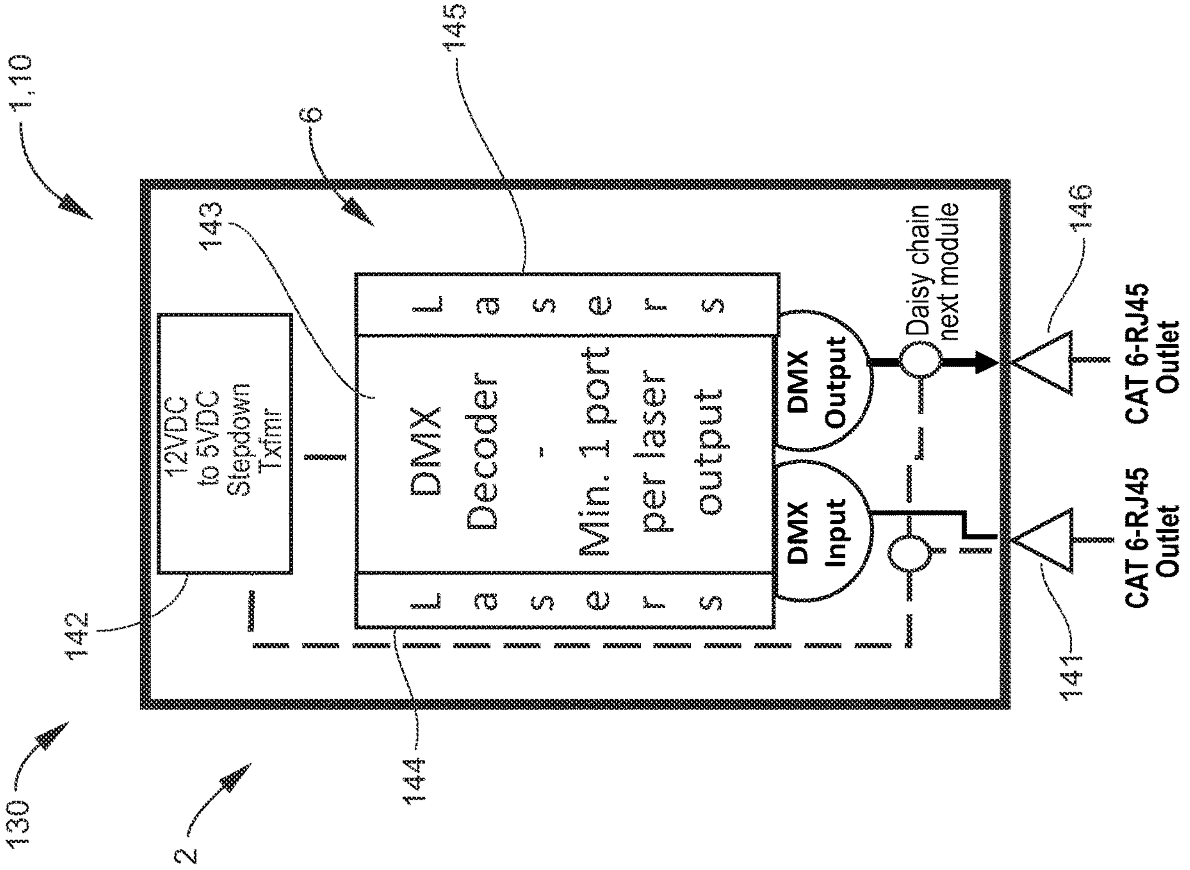
FIG. 14 is a schematic diagram of an internal view of the fiber control module (type 2) of the first end transmit device of FIG. 13.

Referring now specifically to FIG. 14 is a schematic diagram of an internal view of the fiber control module 130 (type 2) for the first end transmit device of FIG. 13. DMX input 141 is provided via CAT6-RJ45 outlet and connects with stepdown transfer 142 for stepping down from 12 VDC to 5 VDC. DMX decoder 143 is included with a minimum of 1 port per laser output and includes lasers 144 with laser heat sink/mounts 145. DMX output 146 is provided with CAT6-RJ45 outputs, and can be daisy chained to the next module.

Figure 15:
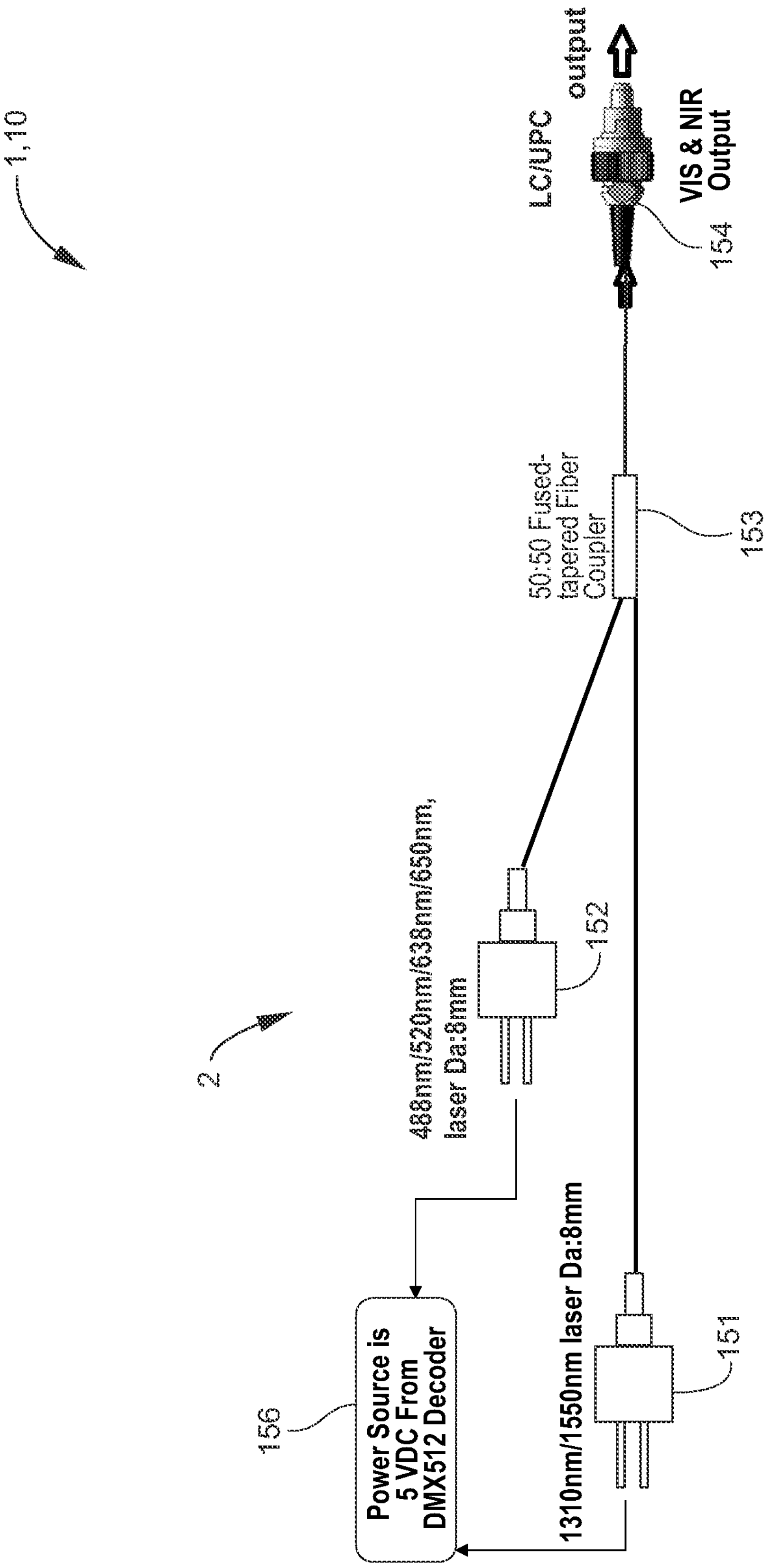
FIG. 15 is a schematic diagram of a fiber control module (type 1) of the first end transmit device according to select embodiments of the instant disclosure with the optional dual wavelength output showing a fused WDM coupler and dual laser configuration (the basic function of the device may be one laser per output)

Referring now specifically to FIG. 15, a schematic diagram of a fiber control module (type 1) for the first end transmit device according to select embodiments of the instant disclosure with the optional dual wavelength output showing a fused WDM coupler and dual laser configuration is shown. Laser connector 151 may include any wavelength in the VIS spectrum, like 400 nm-700 nm, and NIR spectrum, like 700 nm-2000 nm, may be used. As shown, laser connector 151 may include, but is not limited to, a 1310 nm/1550 nm laser Da 8 mm. Laser connector 152 may include a 488 nm/520 nm/638 nm/650 nm laser DA 8 mm. Fused tapered fiber coupler 153 may be a 50:50 fused tapered fiber coupler and may be connected with laser connector 151 and laser connector 152. Output 154 may be a LC/UPC output and/or VIS & NIR output. Power source 156 may be 5 VDC from the DMX512 decoder.

Figure 16:
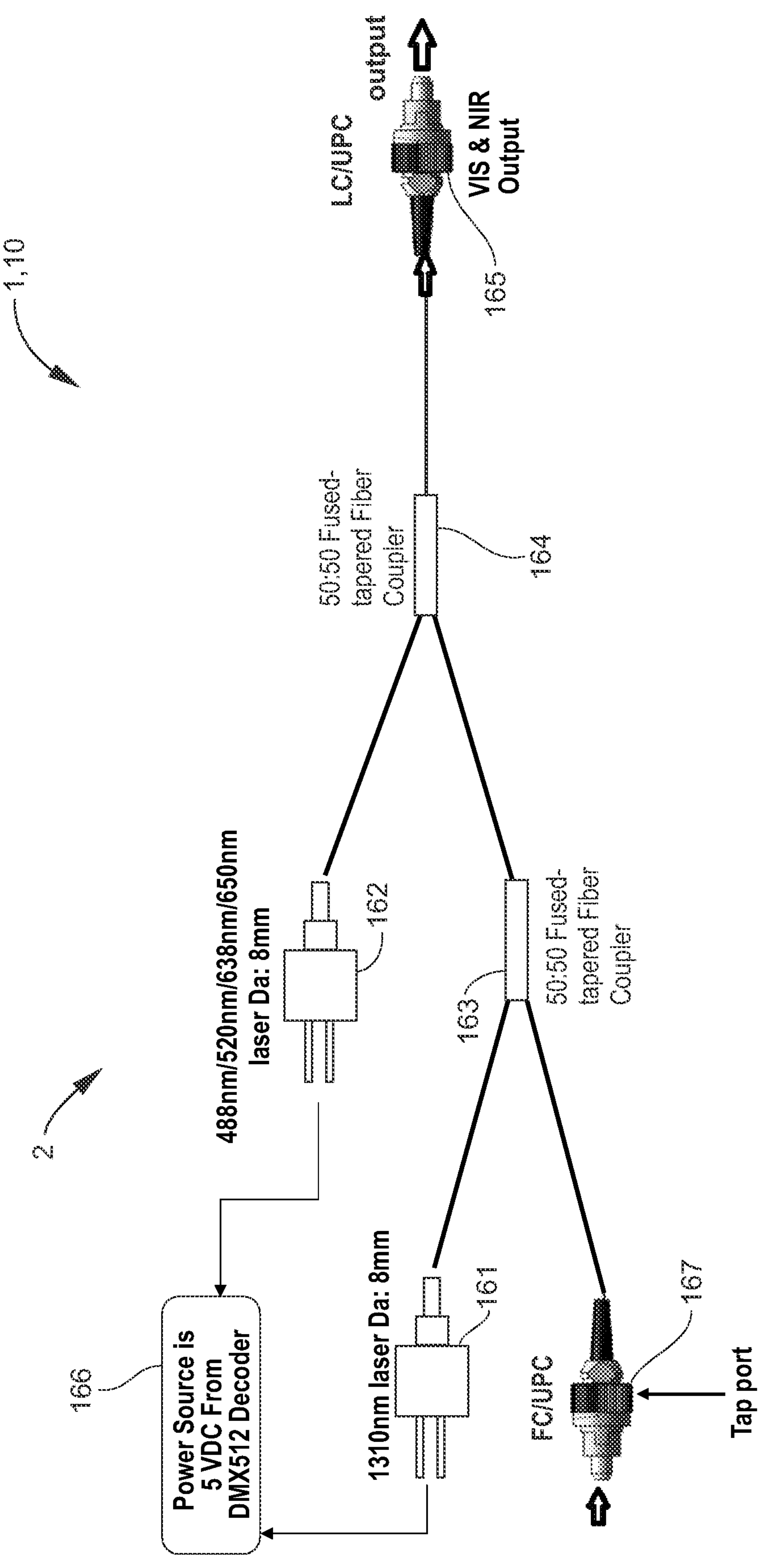
FIG. 16 is a schematic diagram of a fiber control module (type 2) of the first end transmit device according to select embodiments of the instant disclosure with the optional dual wavelength output and tap port showing a fused WDM coupler and dual laser configuration.

Referring now specifically to FIG. 16, a schematic diagram of a fiber control module (type 2) for the first end transmit device according to select embodiments of the instant disclosure with the optional dual wavelength output and tap port showing a fused WDM coupler and dual laser configuration is shown. Laser connector 161 may include a 1310 nm laser Da 8 mm. Laser connector 162 may include a 488 nm/520 nm/638 nm/650 nm laser DA 8 mm. Fused tapered fiber coupler 163 may be a 50:50 fused tapered fiber coupler and may be connected with laser connector 161 and a second fused tapered fiber coupler 164. Fused tapered fiber coupler 164 may also be a 50:50 fused tapered fiber coupler and may be connected with fused tapered fiber coupler 163 and the laser connector 162. Output 165 may be a LC/UPC output and/or VIS & NIR output. Power source 166 may be 5 VDC from the DMX512 decoder. Tap port 167 may also be included with FC/UPC and connected with fused tapered fiber coupler 163. This input through tap port 167 can be configured with individual ST, SC, LC, etc. and other simplex ports, or it can be configured with shuttered MPO connectors. For 2-way communications, tap port 167 can be connected to the communications and control module.

Figure 17:
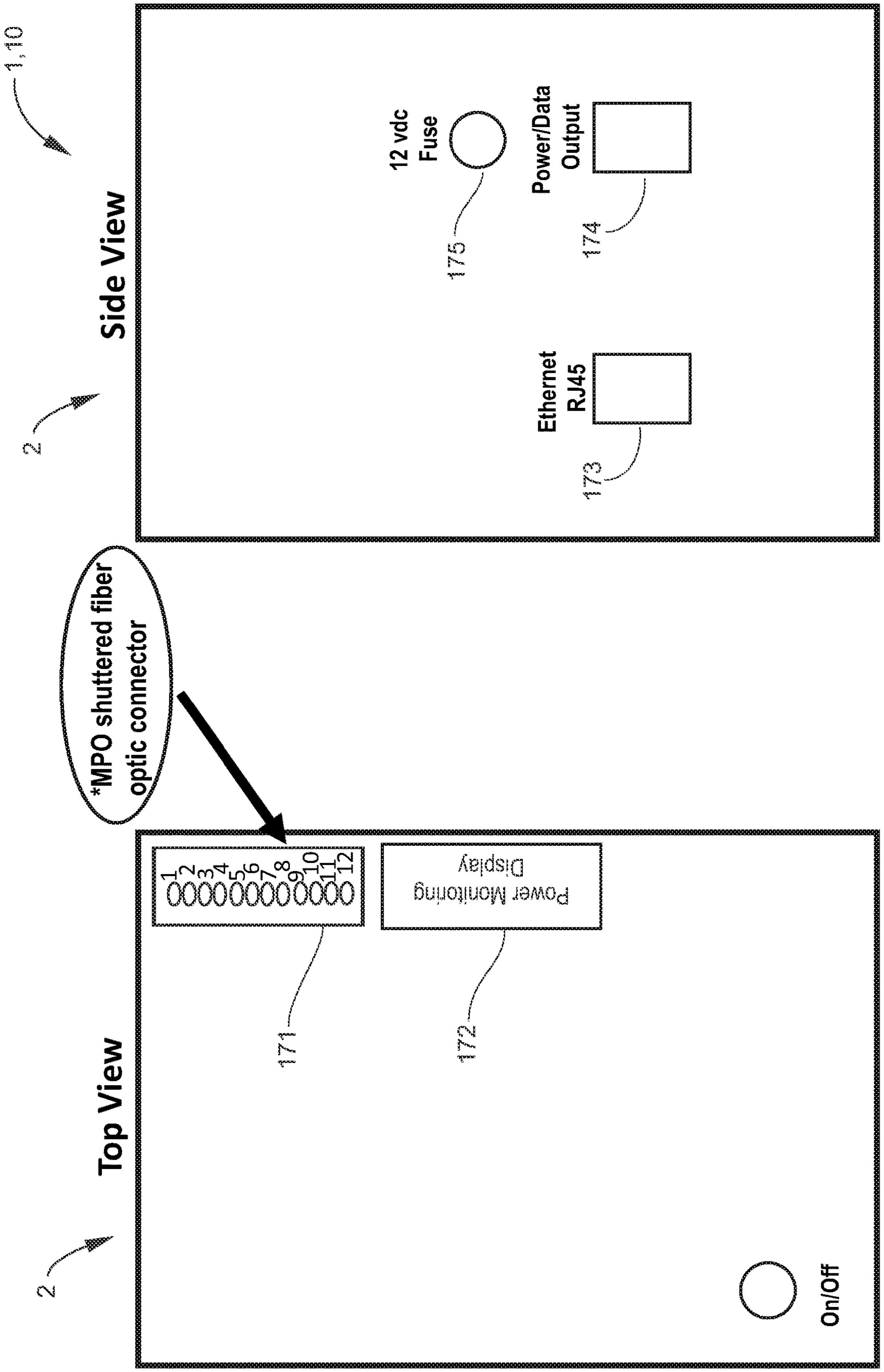
FIG. 17 is a schematic diagram of a communications and control module of the first end transmit device according to select embodiments of the instant disclosure.

Referring now specifically to FIG. 17, a schematic diagram of a communications and control module for the first end transmit device according to select embodiments of the instant disclosure is shown. MPO shuttered fiber optic connector 171 is included in the top view along with power monitoring display 172. In the side view ethernet port 173, power/data output 174 and 12 VDC fuse 175 are shown.

Figure 18:
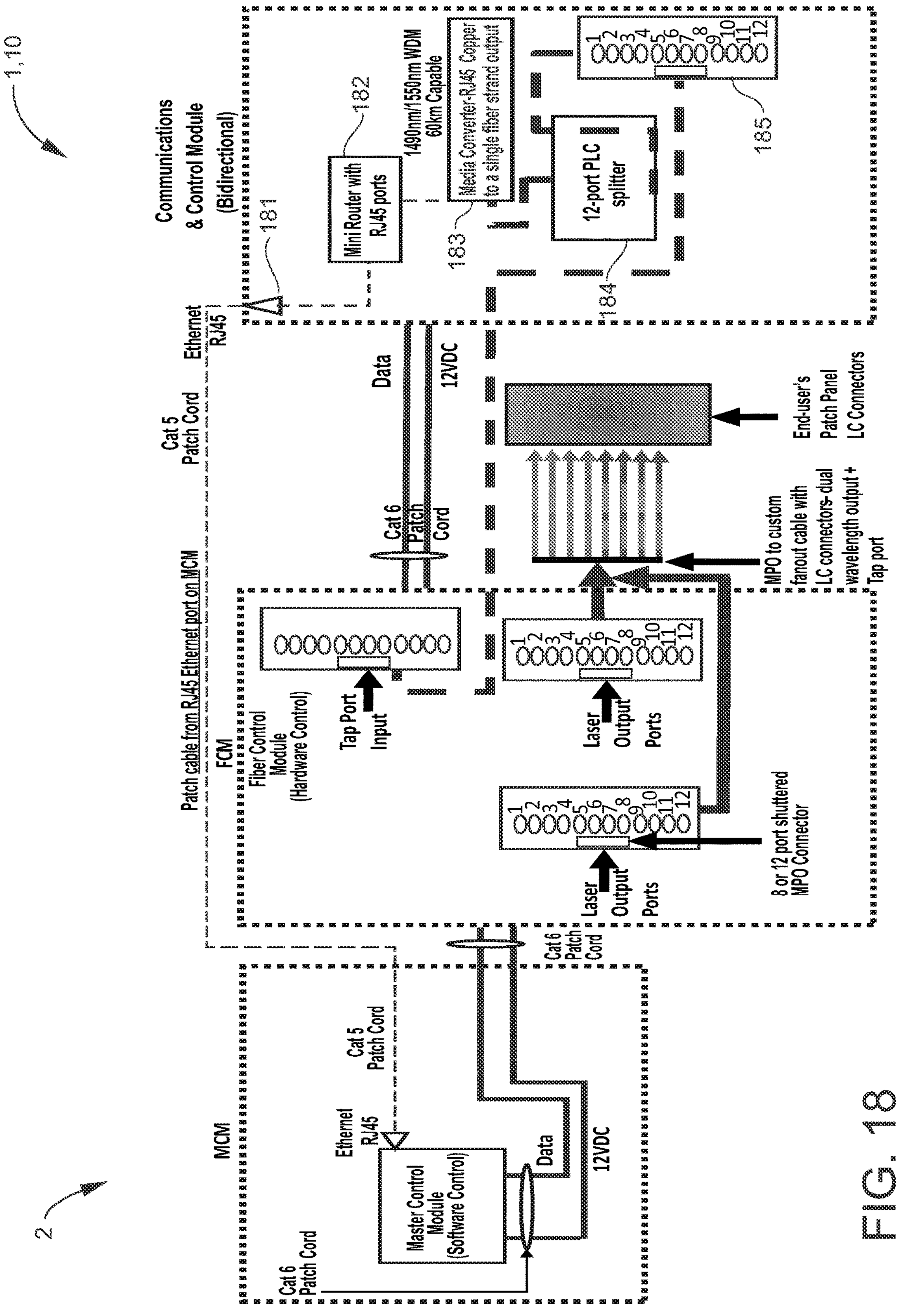
FIG. 18 is another schematic diagram of the communications and control module of the first end transmit device of FIG. 17 showing details of the operations with the master control module and the fiber control module.

Referring now specifically to FIG. 18, another schematic diagram of the communications and control module for the first end transmit device of FIG. 17 showing details of the operations with the master control module and the fiber control module is shown. Ethernet 181 may be RJ45 ethernet. Mini router 182 may include RJ45 ports and may be connected with ethernet 181. Media converter 183 may convert the RJ45 copper to a single fiber strand output. Splitter 184 may be a 12-port PLC splitter. Ports 185 may be numbered 1-12.

Figure 19:
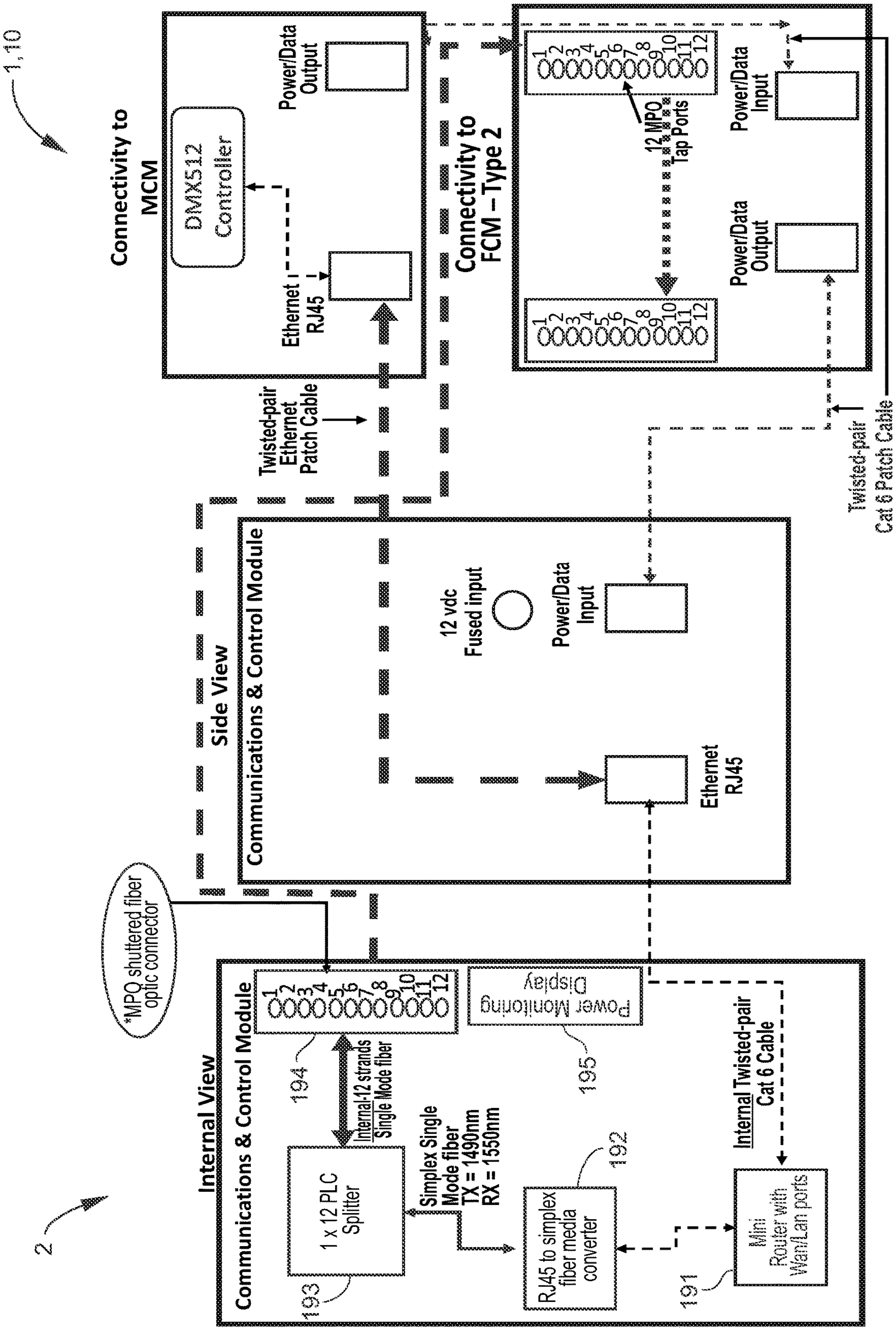
FIG. 19 is another schematic diagram of an internal view and a side view of the communications and control module of the first end transmit device of FIG. 17 showing details of the connectivity to the fiber control module (type 2) and master control module.

Referring now specifically to FIG. 19, another schematic diagram of an internal view and a side view of the communications and control module for the first end transmit device of FIG. 17 showing details of the connectivity to the fiber control module (type 2) and master control module is shown. In the internal view, mini router 191 is shown with WAN/LAN ports. Converter 192 converts RJ45 to simplex fiber media. Splitter 193 may be a 1×12 PLC splitter. Ports 194 may be numbers 1-12. Power monitoring display 195 may also be included.

Figure 20:
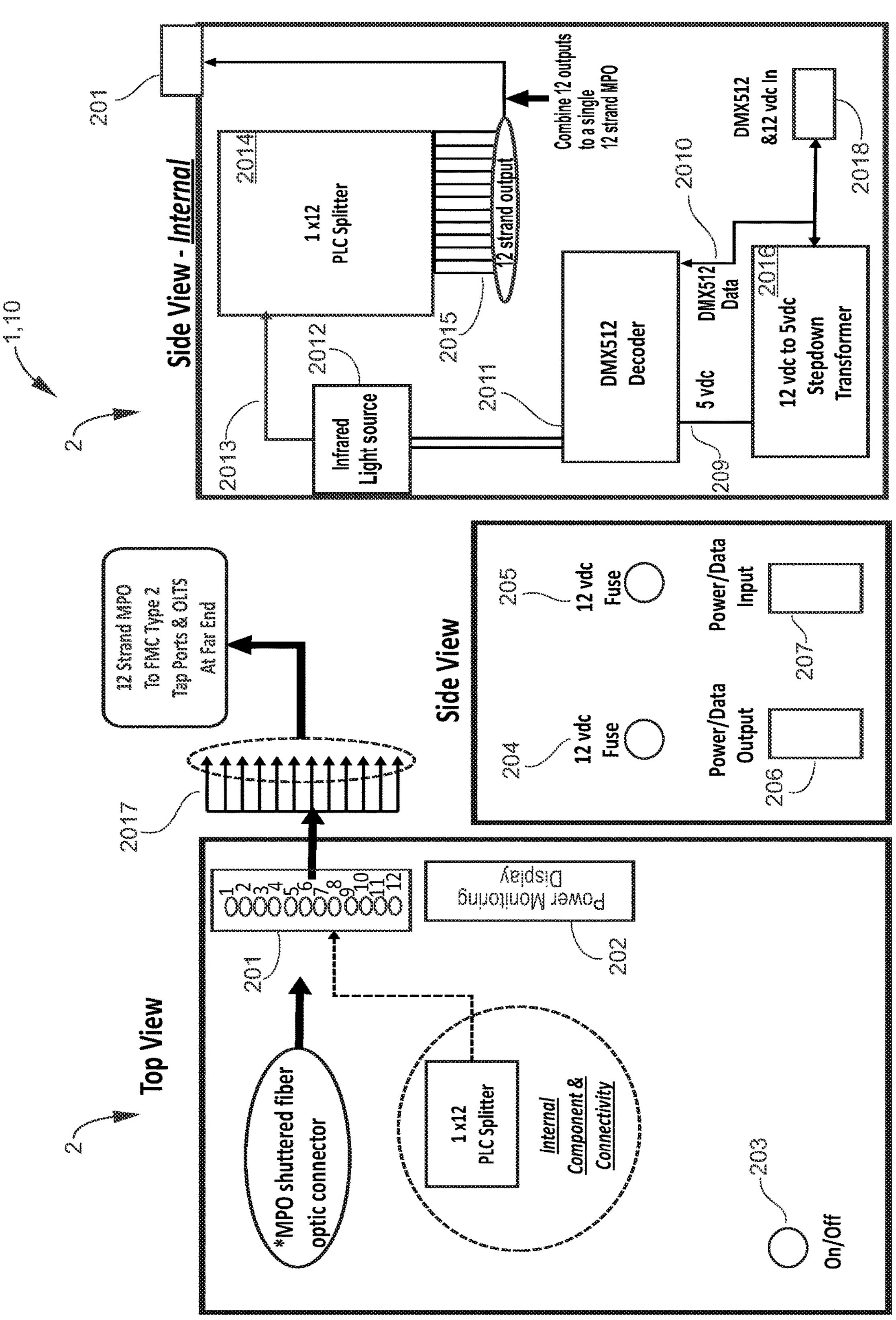
FIG. 20 is a schematic diagram of an optical light source module of the first end transmit device according to select embodiments of the instant disclosure.

Referring now specifically to FIG. 20, a schematic diagram of an optical light source module for the first end transmit device according to select embodiments of the instant disclosure is shown. In the top view, MPO shuttered fiber optic connector 201 is included with power monitoring display 202 and on/off button 203. In the side view, 12 VDC fuse 204, 12 VDC fuse 205, power/data output 206 and power/data input 207 are shown. In the internal side view, input 2018 for DMX512 and 12 VDC is shown with 5 VDC 209, DMX512 Data 2010, DMX512 decoder 2011, infrared light source 2012, connection 2013 to 1×12 PLC splitter 2014, 12 strand output 2015, and stepdown transformer 2016 for 12 VDC to 5 VDC. Tap ports 2017 are included for 12 strand MPO to FMC Type 2 tap ports and OLTS at far end.

Figure 21:
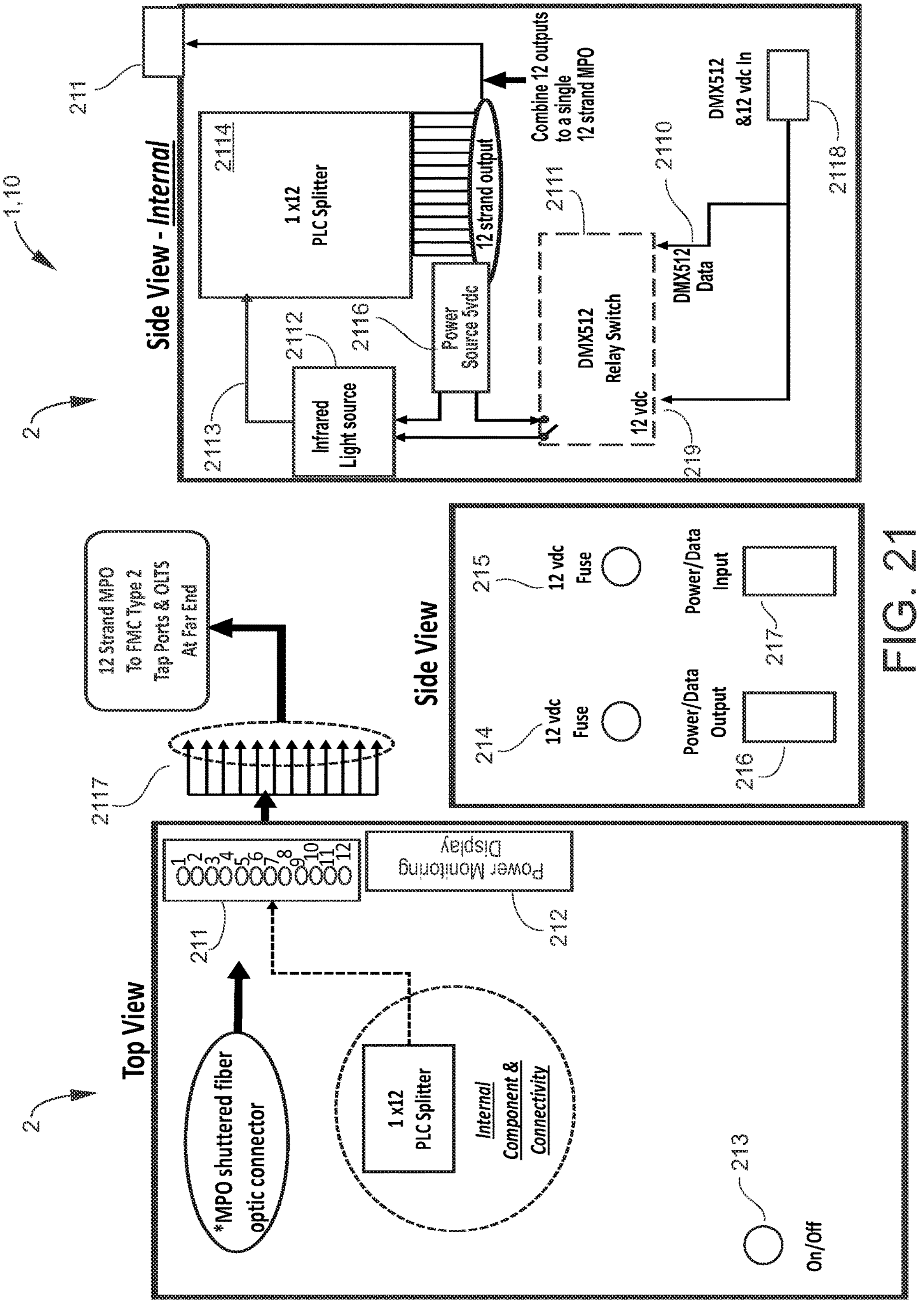
FIG. 21 is a schematic diagram of an optical light source module of the first end transmit device according to select embodiments of the instant disclosure with an optional DMX512 relay module.

Referring now specifically to FIG. 21, a schematic diagram of an optical light source module for the first end transmit device according to select embodiments of the instant disclosure with an optional DMX512 relay module is shown. In the top view, MPO shuttered fiber optic connector 211 is included with power monitoring display 212 and on/off button 213. In the side view, 12 VDC fuse 214, 12 VDC fuse 215, power/data output 216 and power/data input 217 are shown. In the internal side view, input 2118 for DMX512 and 12 VDC is shown with 5 VDC 219, DMX512 Data 2110, DMX512 relay switch 2111, 5 VDC power source 2116, infrared light source 2112, and connection 2113 to 1×12 PLC splitter 2114. Tap ports 2117 are included for 12 strand MPO to FMC Type 2 tap ports and OLTS at far end.

Figure 22:
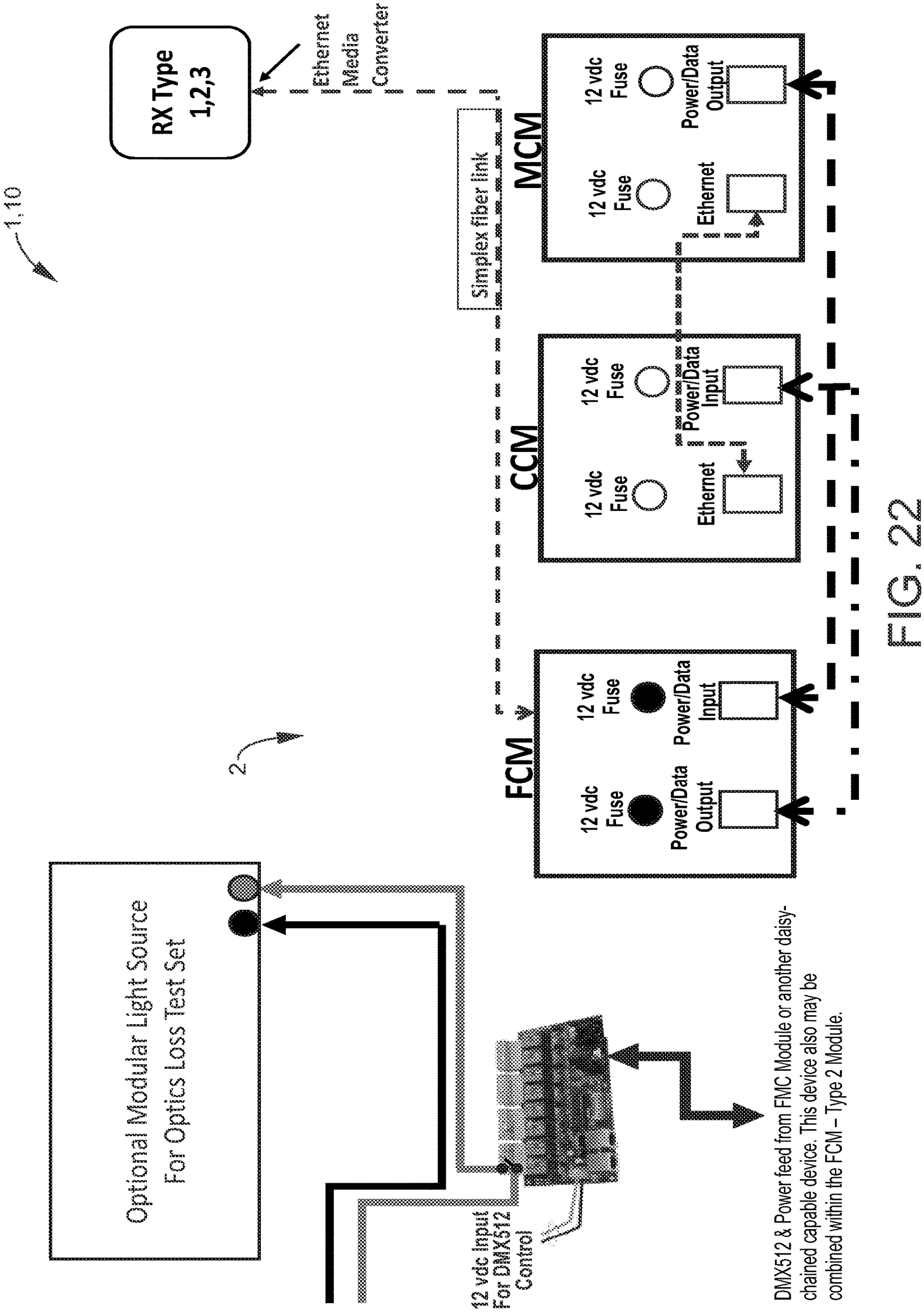
FIG. 22 is another schematic diagram of an optical light source module of the first end transmit device according to select embodiments of the instant disclosure with an optional DMX512 relay module.

Referring now specifically to FIG. 22, another schematic diagram of an optical light source module for the first end transmit device according to select embodiments of the instant disclosure with an optional DMX512 relay module is shown. This diagram shows the capability to control devices remotely using the RX unit at the far end. In this scenario the end-user plugs in the RX-Type X module into a previously identified fiber strand at the far end. Once the strand(s) has been identified, the receive unit can be mated to that strand and an Ethernet link will automatically sync up with the MCM via DHCP and communicate using the RDM protocol. The relay switch allows the MCM to control any device/function by using the built in dry contacts. If the device functions at 5 VDC and low amperage, or has a 5 VDC relay, the DMX512 decoder can perform the same functions without the DMX512 Relay Module. The light source can be turned on & off, and can be used to change wavelengths and other functions that can be controlled by using dry contacts. DMX512 Electro-mechanical and/or solid-state relays may be used.

Figure 23:
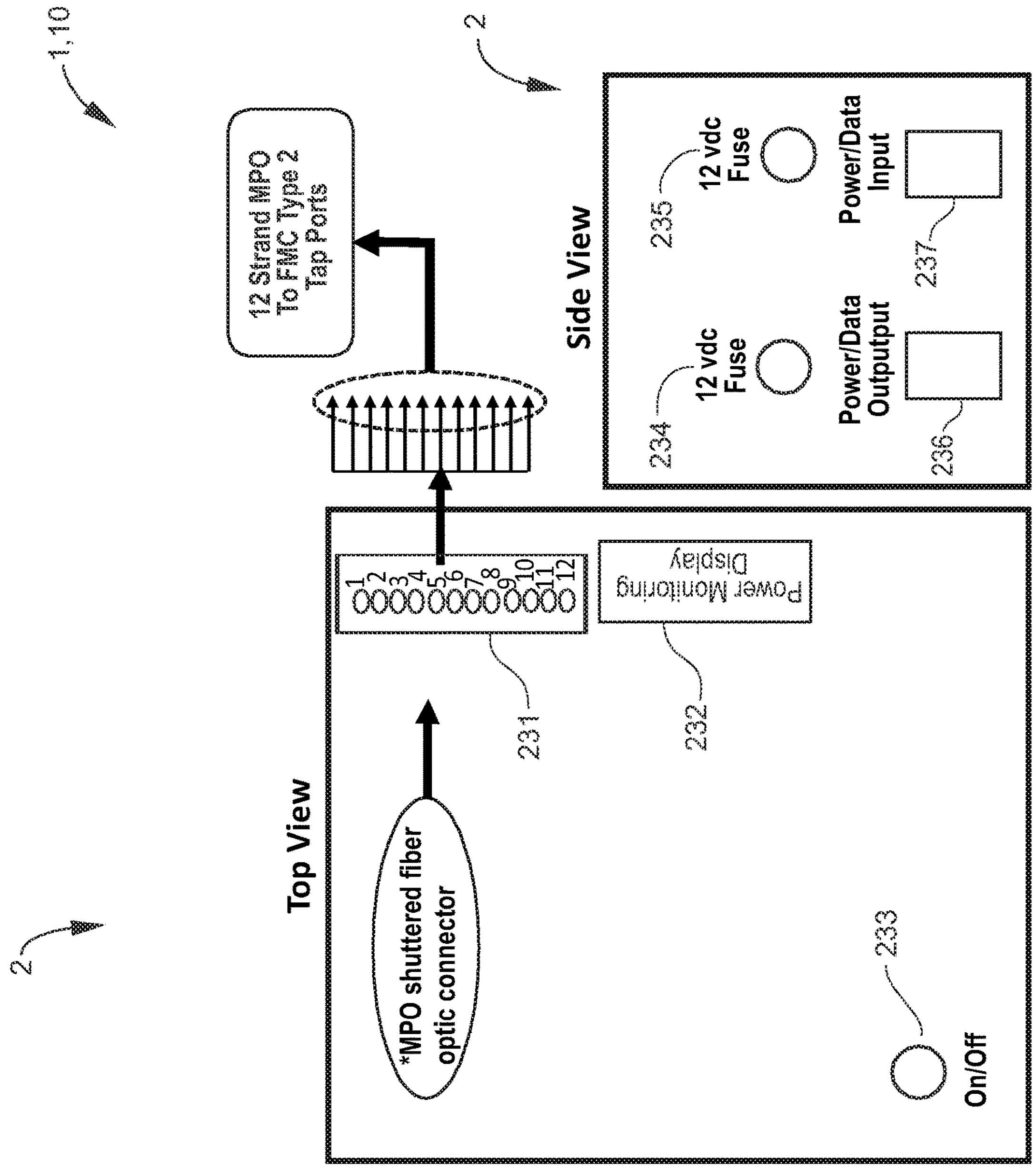
FIG. 23 is a schematic diagram of an Optical Time Domain Reflectometer ("OTDR") module of the first end transmit device according to select embodiments of the instant disclosure.

Referring now specifically to FIG. 23, a schematic diagram of an OTDR module for the first end transmit device according to select embodiments of the instant disclosure is shown. In the top view, MPO shuttered fiber optic connector 231 is shown with power monitoring display 232 and on/off button 233. In the side view, 12 VDC fuse 234, 12 VDC fuse 235, power/data output 236 and power/data input 237 are shown. If the CCM is connected to the Tap ports on the FCM Type-2 (FIGS. 17-19) for 2-way communications & control, a WDM coupler can be added so that the Tap Port can accommodate multiple wavelengths/devices.

Figure 24:
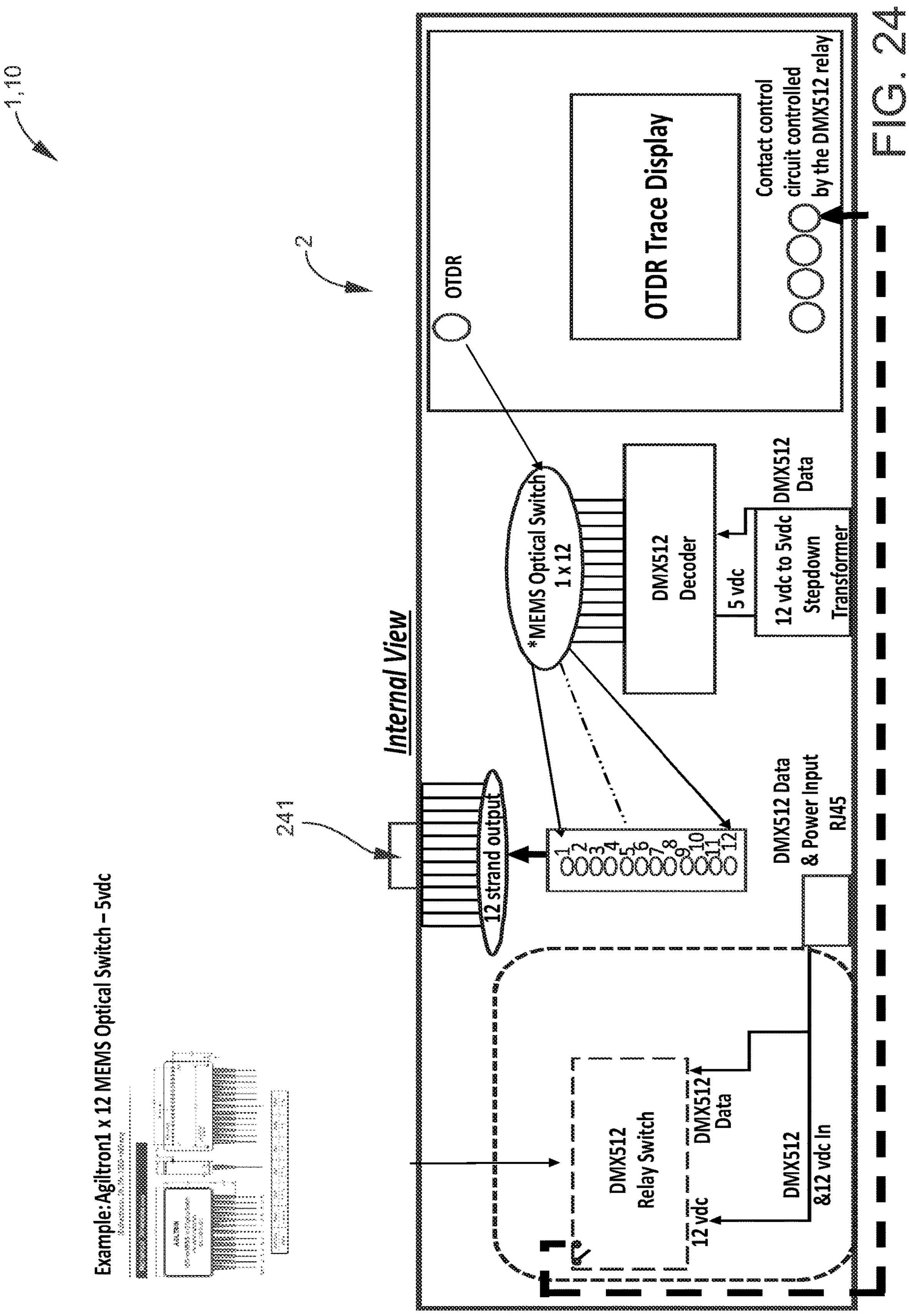
FIG. 24 is another schematic diagram of an OTDR module Optical Time Domain Reflectometer according to select embodiments of the instant disclosure.

Referring now specifically to FIG. 24, another schematic diagram of an OTDR module for the first end transmit device according to select embodiments of the instant disclosure is shown. 12-strand MPO output coupler 241 is shown to be connected to the tap port on the FCM module. The DMX512 decoder and/or the DMX512 relay switch can be used to power the OTDR on & off, control functions remotely, initiate a "start trace" and send the trace to the remote end by using the CCM via the Ethernet port on the MCM. The decoder can switch the individual ports on and off as long as the load does not exceed the maximum power rating of the decoder. The DMX512 relay switch provides dry contact closure functions only. This relay switch is capable of switching multiple devices with varying power requirements. In select embodiments, an optional feature may be that the contact closure feature in the relay switch can be used to control different settings and features that are built into the OTDR. It can also provide multiple independent power requirements (load). An optical switch may be used to change the single output of an OTDR to multiple strands independently/individually and/or remotely.

Figure 25:
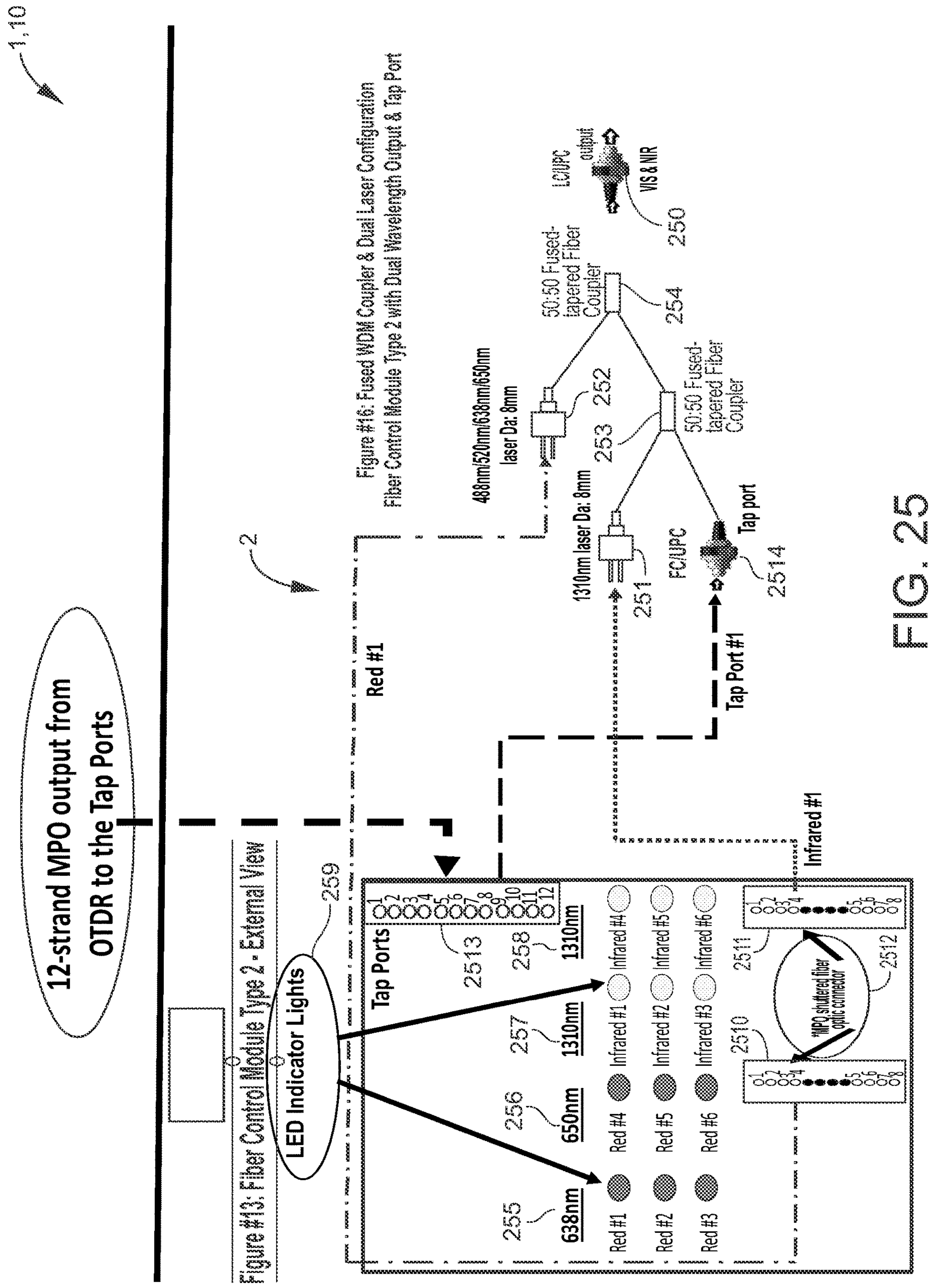
FIG. 25 is another schematic diagram of an OTDR module Optical Time Domain Reflectometer according to select embodiments of the instant disclosure.
Figure 26:
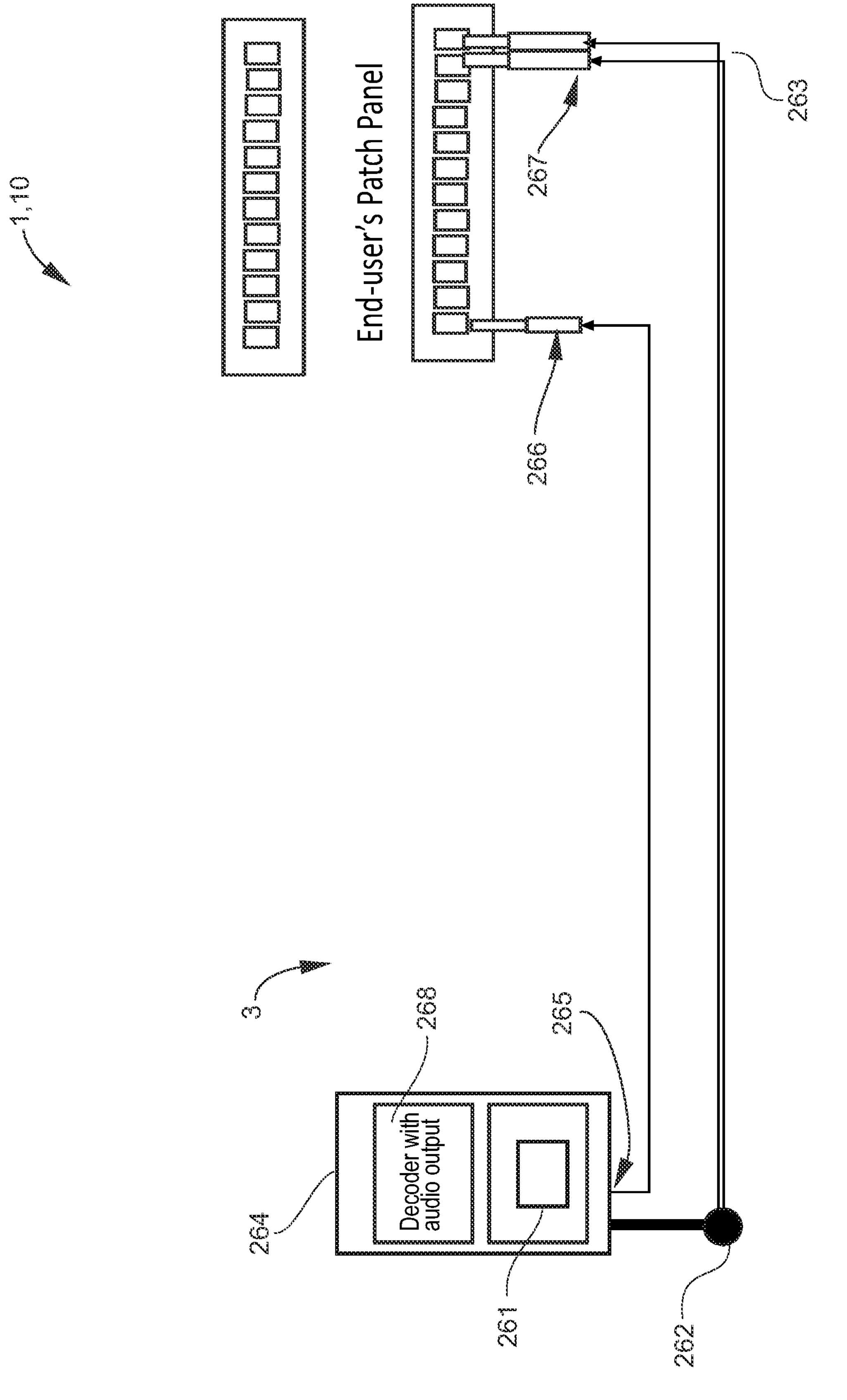
FIG. 26 is a schematic diagram of a receiver module (type 1; RX-type 1) for the second end receive device according to select embodiments of the instant disclosure.

Referring now specifically to FIG. 25, another schematic diagram of an OTDR module for the first end transmit device according to select embodiments of the instant disclosure is shown. Laser connector 251 may include a 1310 nm laser DA: 8 mm. Laser connector 252 may include a 488 nm/520 nm/638 nm/650 nm laser Da: 8 mm. Fused tapered fiber coupler 253 may be a 50:50 fused tapered fiber coupler and may be connected with laser connector 251 and a second fused tapered fiber coupler 2544. Fused tapered fiber coupler 254 may also be a 50:50 fused tapered fiber coupler and may be connected with fused tapered fiber coupler 253 and the laser connector 252. Output 250 may be a LC/UPC output and/or VIS & NIR output. Tap port 2514 may also be included with FC/UPC and connected with fused tapered fiber coupler 253. 4638 nm indicators 255 for red numbers 1-3, 650 nm indicators 256 for red numbers 4-6, 1310 nm indicators 257 for infrared numbers 1-3, and 1310 nm indicators 258 for infrared numbers 4-6 may include LED indicator lights 259. MPO shuttered fiber-optic connector 2512 may include connectors 12510 and 2511, as shown. Tap ports 2513 may also be provided, as shown. As examples, #1 Red Output may be combined with Infrared #1 and Tap Port #1, and #2 through #12 would be the same. As another example, the output could be selected to be red or infrared, or both, as the output can be synchronized. In this example the Tap Port can be any wavelength between 1200 nm & 1700 nm, including, but not limited to, using 1550 nm for the OTDR Referring now specifically to FIG. 26, a schematic diagram of a module (type 1; RX-type 1) for the second end receive device according to select embodiments of the instant disclosure is shown. Input device 264 may be, but is not limited to, an 8" tablet or other USB input device that can display and audibly announce the output. Decoder 268 may include audio output. Video display 261 may be configured to display actual light being received from the FCM and may decode the data. USB port 265 may be for use with USB otoscope camera 266, a USB to ethernet adapter for remote communications and control, and/or for charging the batteries. Duplex connectivity 262 may be optional for connecting dual USB otoscope cameras 267, which may include 3.9 mm Tips and the desired fiber optic connector attached. Dual camera setup 263 may allow the end-user to identify and verify TX and RX duplex fiber connectivity in high-density applications. This can be done with a USB A/B switch, by using bandpass filters, or in a custom configuration, where it can be viewed in split screen format. As shown, 8" modified tablet 264 may include the USB port 265 connected to 3.9 mm otoscope camera 266 and in order to use an App, the tablet 264 may be rewired so that the video input from the otoscope camera 266 would appear as an internal camera. This can be accomplished by rewiring tablet 264 so that when the front-facing camera is selected, it actually is displaying the video from the external USB camera. This may need to be done because the App takes that video feed and displays it within a viewing display on the App. It processes the incoming light as it flashes in the display and decodes the incoming encrypted binary data, displays the fiber identification data in another part of the App display, and if it matches the preset message, it triggers an audio announcement for the end-user to hear, e.g., 'Fiber-Blue-1'

Figure 27:
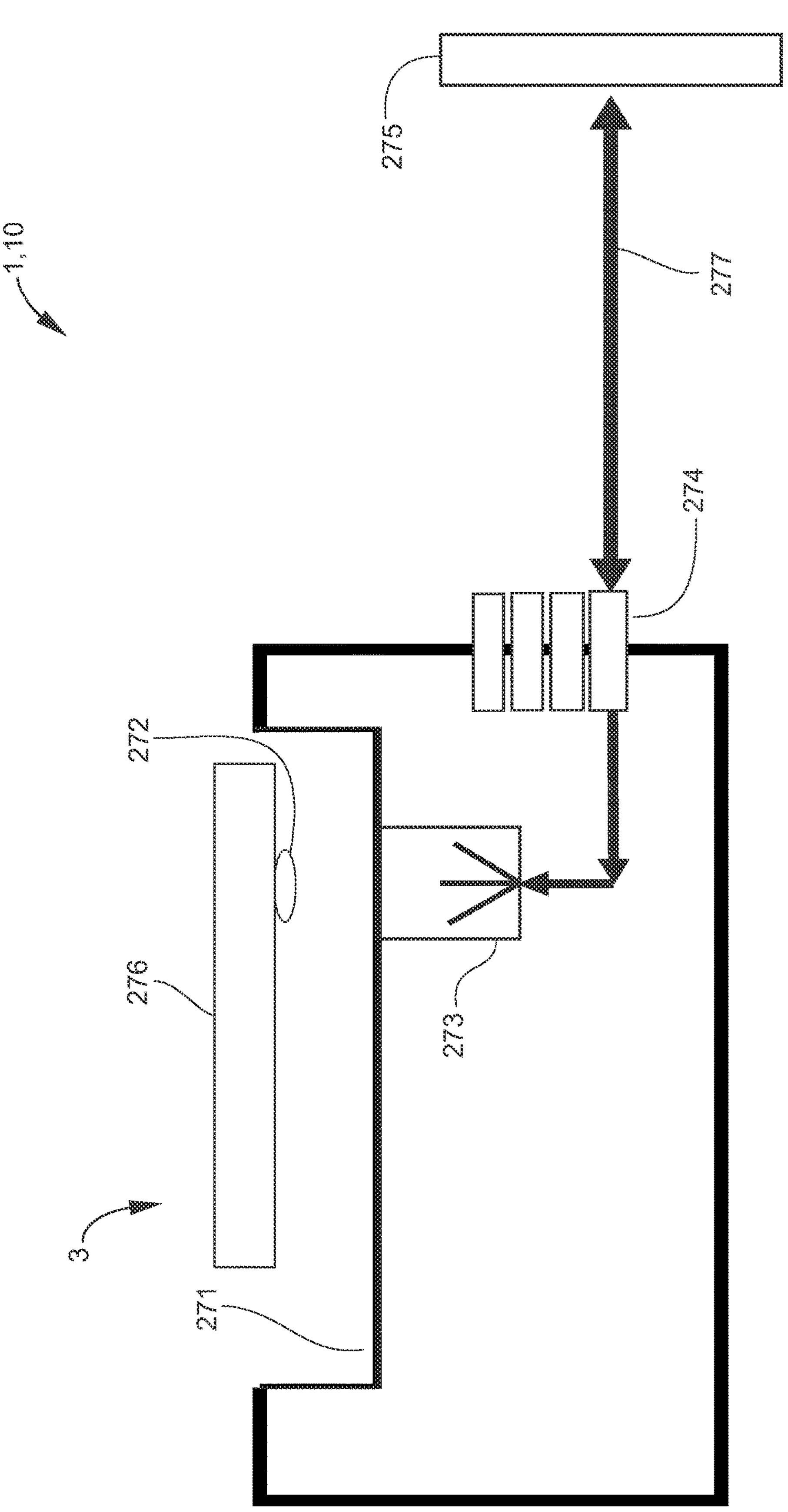
FIG. 27 is a schematic diagram of a receiver module (RX-type 2) for the second end receive device according to select embodiments of the instant disclosure.

Referring now specifically to FIG. 27, a schematic diagram of a receiver module (RX-type 2) for the second end receive device according to select embodiments of the instant disclosure is shown. This may include a remote identifier—RX Type 1—side view and an adjustable smartphone cradle 271 for direct viewing. The end-user's smartphone 276 may include the decoding app or a custom-made device that is included as an all-in-one device. The camera 272 may be from the smartphone 276 or may be another camera/display combination. This may be a custom, indirect viewing method built especially for this application. Light capturing cylinder 273 may be included with or without beam expander. Fiber coupler 274 may be an ST-ST fiber coupler x 4, and can be SC, LC, MPO, etc. Cable 277 may be a large core fiber optic patch cable from the end-user's patch panel 275 to the identifier. Non-contact (primary) or direct contact may be optional at far end location. An optional new addition may be included of installing a large core flexible light pipe direct from the fiber coupler 274 to the light capturing cylinder 273.

Figure 28:
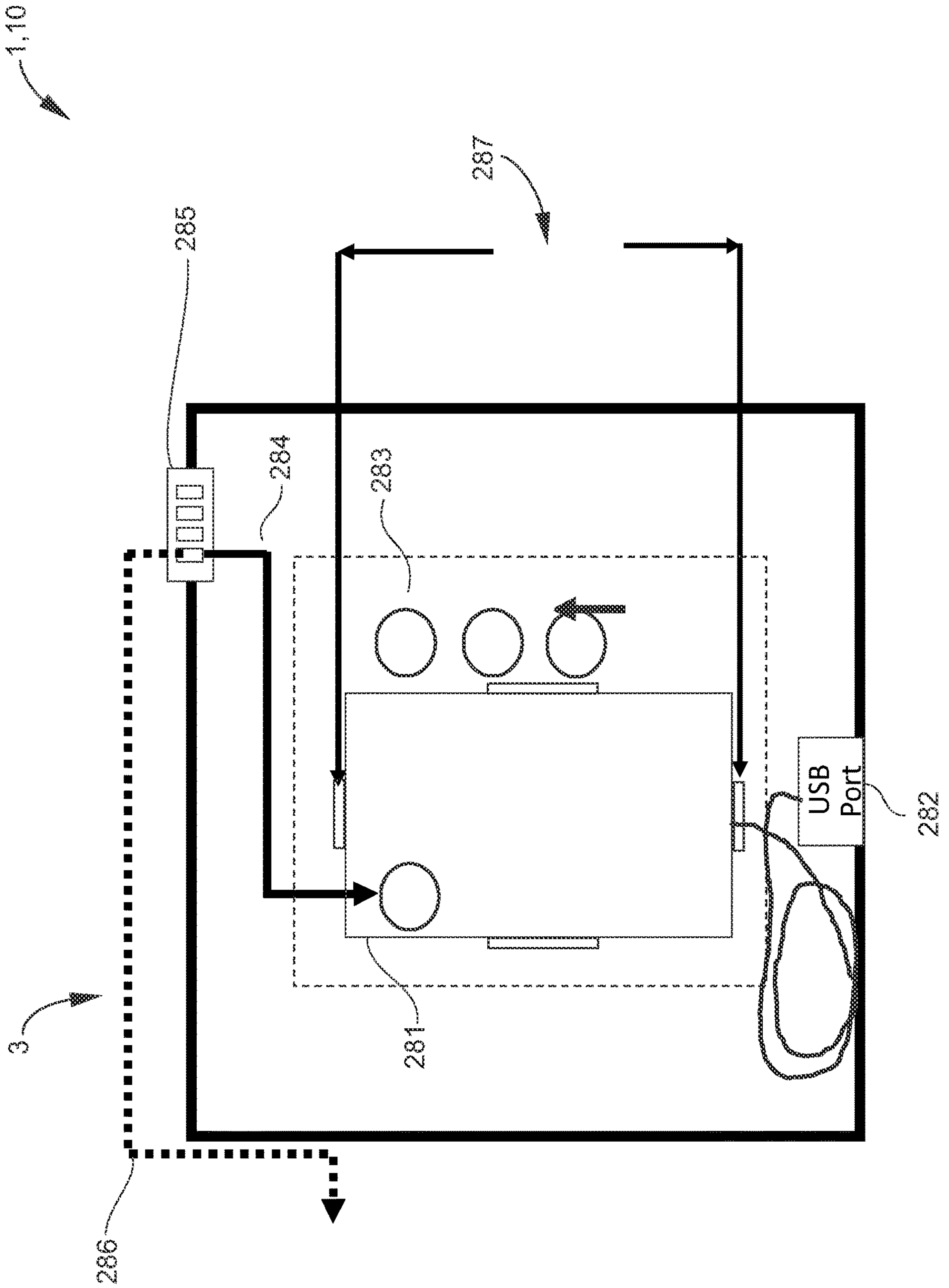
FIG. 28 is a schematic diagram of the receiver module (RX-type 2) for the second end receive device of FIG. 27 showing details.

Referring now specifically to FIG. 28, a schematic diagram of the receiver module (RX-type 2) for the second end receive device of FIG. 27 showing additional details is shown with the remote identifier—RX-Type 2, top view shown with the adjustable smartphone cradle for direct viewing. Light capturing cylinder may be with or without a beam expander and may be configured for the smartphone 281. USB port 282 may be an external port that can be used for power input to charge, USB camera input for video, and USB to Ethernet. Selectable knockouts 283 may be for use with a variety of smartphone camera configurations. Selectable knockouts 238 may be for use with a variety of smartphone camera configurations. Adjust the flexible light pipe and light cylinder as needed. The light pipe may extend the light from the ST coupler 285 on the bottom or top of the device for charging and USB video feed. Fiber coupler 285 may be, but is not limited to, an ST-ST fiber coupler x 4, and it can be SC, LC, MPO, etc. Adjustment 284 may be to adjust the flexible light pipe and light cylinder as needed between knockout and incoming fiber coupler 285. Adjustments 287 may be spring loaded, horizontal adjustments per knockout, and may lock into fixed position. Adjustments 287 may slide into place vertically, but may also lock into place vertically. Cable 286 may be a large core fiber optic patch cable from the end-user's patch panel to the identifier.

Figure 29:
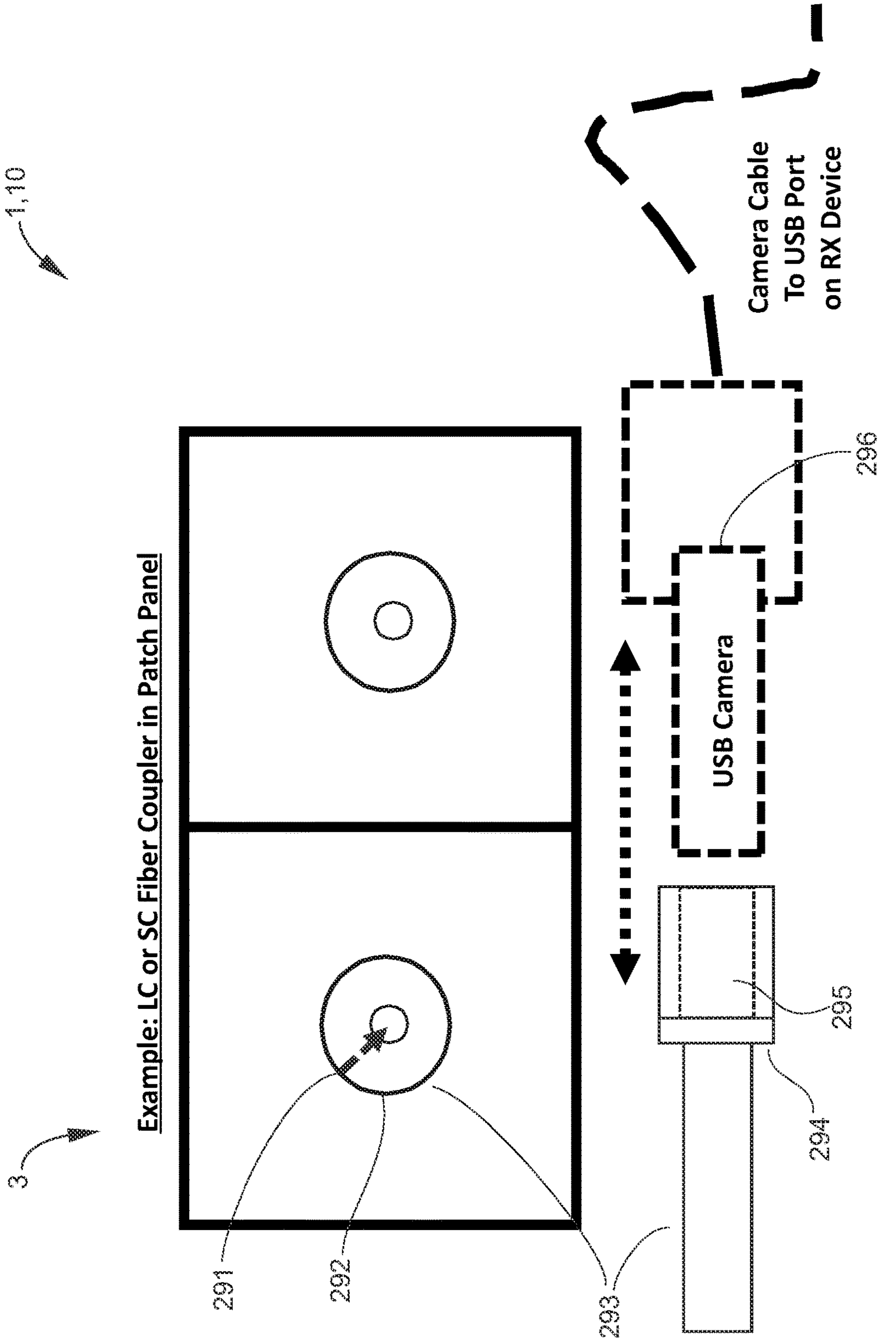
FIG. 29 is a schematic diagram of a custom dust cap for the second end receive device according to select embodiments of the instant disclosure for VIS and NIR identification and decoding.

Referring now specifically to FIG. 29, a schematic diagram of a custom dust cap 293 for the second end receive device according to select embodiments of the instant disclosure for VIS and NIR identification and decoding is shown. Fiber strand core 291 may be in the center of the fiber coupler 292. The fiber coupler 292 may show the entire connector ferrule inserted in the fiber coupler 292. Custom dust cap 293 may cover the ferrule in the fiber coupler 292. Clear cap 294 may allow all light to pass through. Opening 295 may be a 3.9 mm opening to receive the USB otoscope camera 296. The otoscope USB camera 296 may be inserted in custom dust cap 293.

Figure 30:
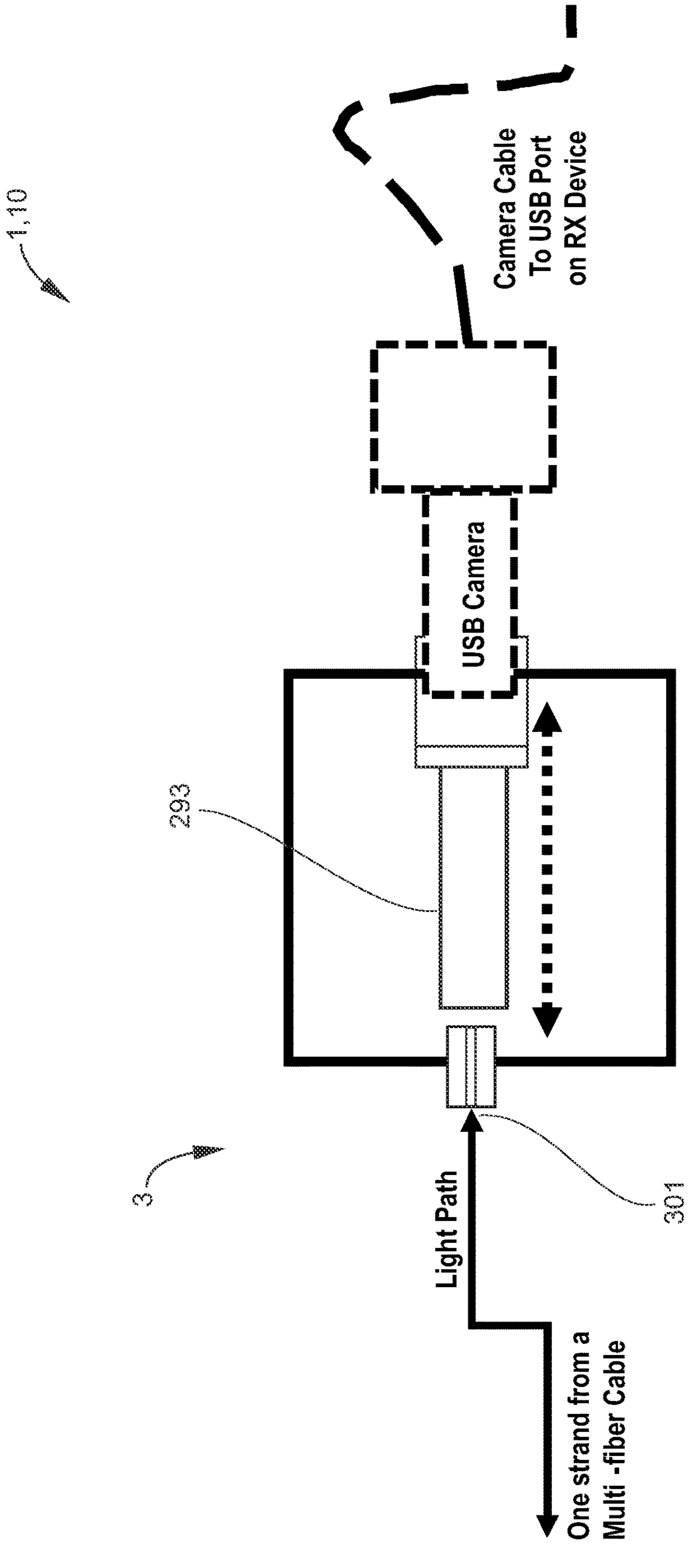
FIG. 30 is a schematic diagram of the custom dust cap for the second end receive device from FIG. 29.

Referring now specifically to FIG. 30, a schematic diagram of the custom dust cap 293 for the second end receive device from FIG. 29 is shown. As shown, fiber strand core 301 may be in the center of the fiber coupler. In select embodiments, a small (<4 mm) NIR bandpass filter may be added to the center of the dust cap to make it visible and able to decode through the dust cap.

Figure 31:
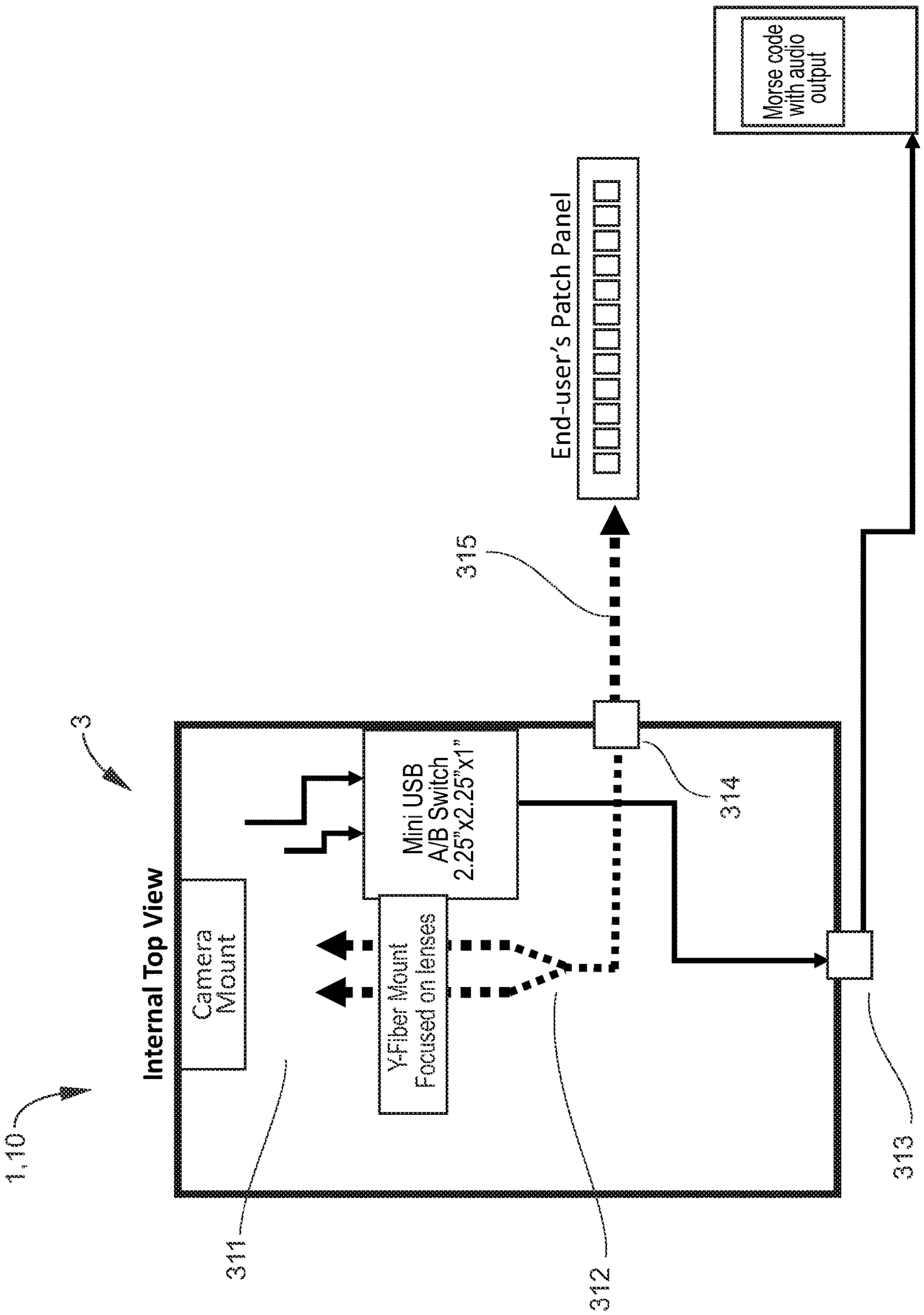
FIG. 31 is a schematic diagram of a received unit (RX type 3) for the second end receive device according to select embodiments of the instant disclosure.

Referring now specifically to FIG. 31, a schematic diagram of a received unit (RX type 3) for the second end receive device according to select embodiments of the instant disclosure is shown. Webcam 311 may be an ELP dual lens webcam with 1.75"w×1.3"h×1.5"d with appropriate lenses. Camera A may include a VIS Spectrum and Camera B may include an NIR Spectrum. Cord 312 may be a custom "Y" large core fiber patch cord (VIS & IR) with one end single to panel and the other end split into "Y" to each camera. Cord 312 may pass 400 nm (VIS) to 2000 nm (NIR). ST connectors may be included on all ends of cord 312. USB connector 313 may be custom to tablet or other device that words with the Morse Code App. ST coupler 314 may be for patch cable or pass through the enclosure. Patch cord 315 may be a simplex ST to LC patch cord. Y-type optical fiber (SMA905 1-2 VIS-IR SIH 1+1 0.22 low OH 400-2200 nm fiber optic reflective quartz LIBS ELINK). This can be configured with a 'Y' patch cable or a duplex patch cable between cameras and two ports at the patch panel with single or dual light source on each port. The tablet or other display may be combined in a single enclosure with the USB cameras. With this two camera system, when visible color reaches its limit, you can change the A/B switch to the infrared camera and you'll get the same fiber ID info. They are both being transmitted on every strand in the FMC Type 2 configuration. The red may only go 6 km, but the NIR will 10 km+. Ideal for multimode fiber at short range and/or single mode fiber for long range—perfect for dual use. In select embodiments, visible camera may have a filter blocking NIR and/or infrared blocks VIS.

Figure 32:
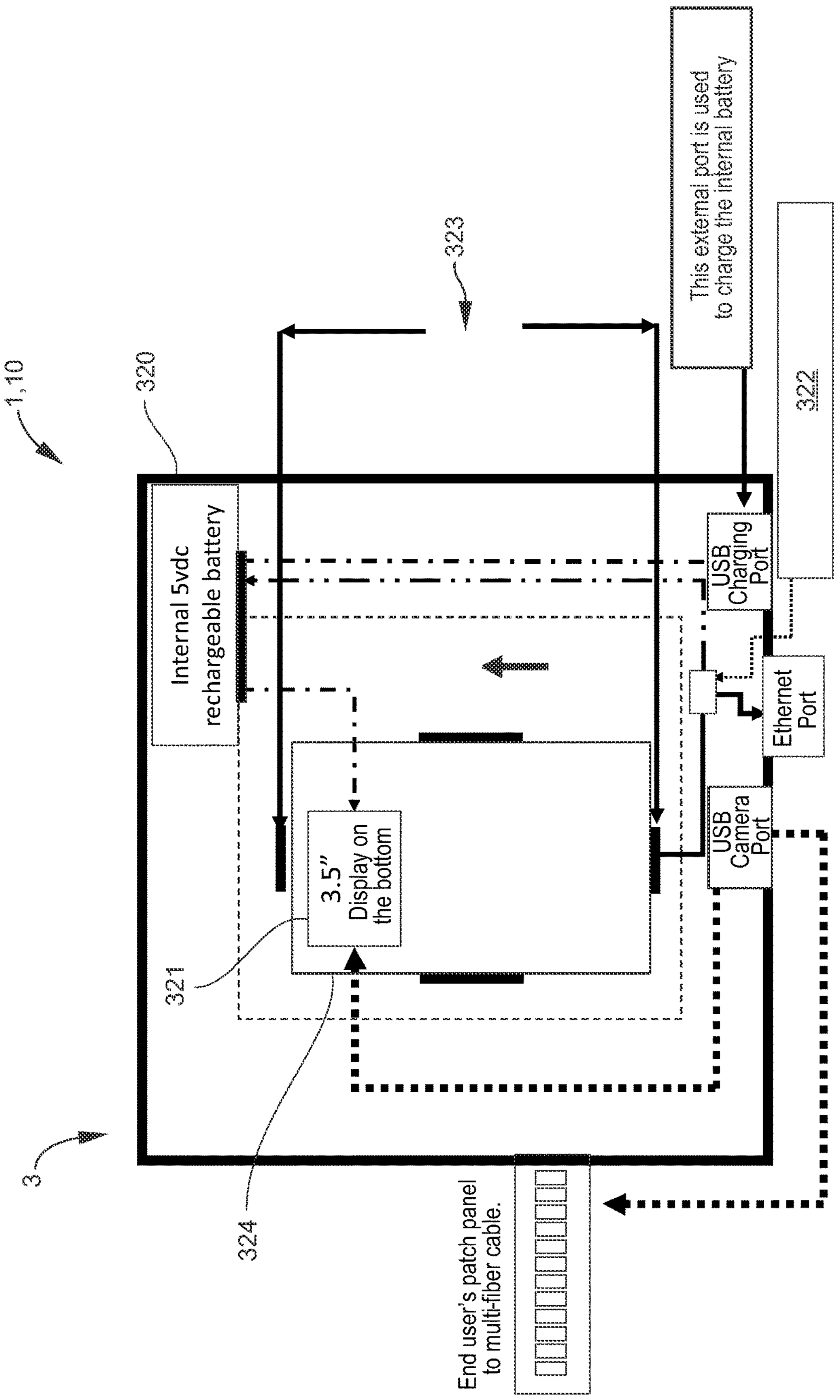
FIG. 32 is a schematic diagram of a receive unit (RX-type 4) for the second end receive device according to select embodiments of the instant disclosure.

Referring now specifically to FIG. 32, a schematic diagram of a receive unit (RX-type 4) for the second end receive device according to select embodiments of the instant disclosure is shown with a remote identifier—RX- Type 4, showing a top view with adjustable smartphone cradle 320 with built-in USB display for indirect viewing. Display 321 may be a small 3.5" display and can be mounted inside the enclosure. Display 321 may be connected a USB otoscope camera. The non-contact USB otoscope camera may capture VIS & NIR light and it may appear on the built in display 321. Smartphone 324 may sit above the 3.5" display 321 and use its rear facing camera to decode incoming Morse code. Converter 322 may be a USB-C to Ethernet+Charge adapter to media converter for 2-way communication. Adjustments 323 may be spring loaded, horizontal adjustments per knockout and may lock into fixed position. Adjustments 323 may slide into place vertically, but may also lock into place vertically.

Figure 33:
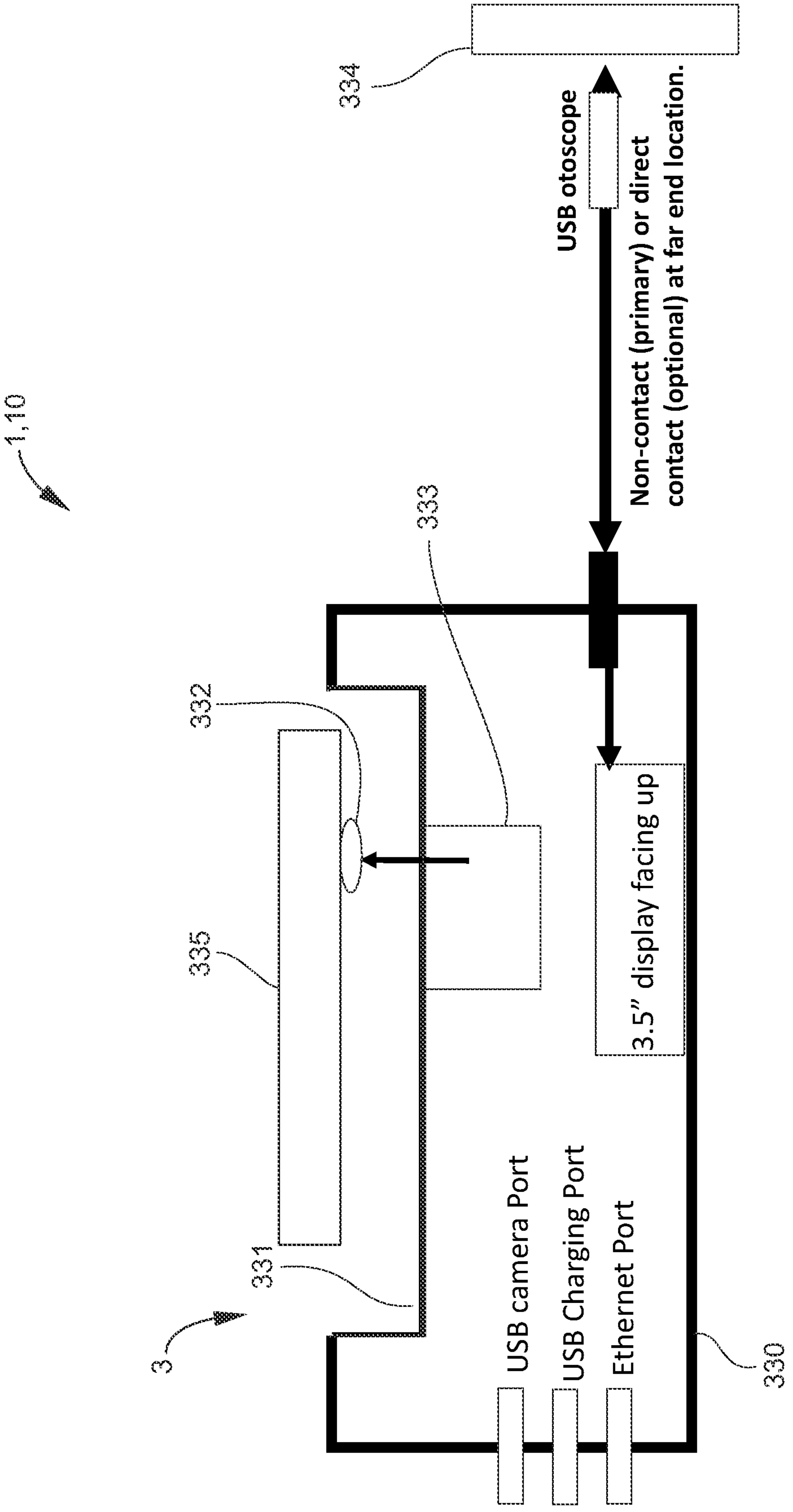
FIG. 33 is another schematic diagram of the receive unit (RX-type 4) for the second end receive device from FIG. 31.

Referring now specifically to FIG. 33, another schematic diagram of the receive unit (RX-type 4) for the second end receive device from FIG. 31 is shown with a remote identifier—RX-Type 4, showing a side view with adjustable smartphone cradle 330 for direct viewing. Smartphone 335 may be the end-user's smartphone and can include the decoding App, or custom made part line of products. Smartphone camera 332 or other camera/display combination may be included. Viewing cylinder 333 may be an opening between the display with camera 332 positioned above. Viewing cylinder 333 may be adjustable/swappable to capture the desired amount of flash. End-user's patch panel 334 may be at far end location connected with the USB otoscope.

Figure 34:
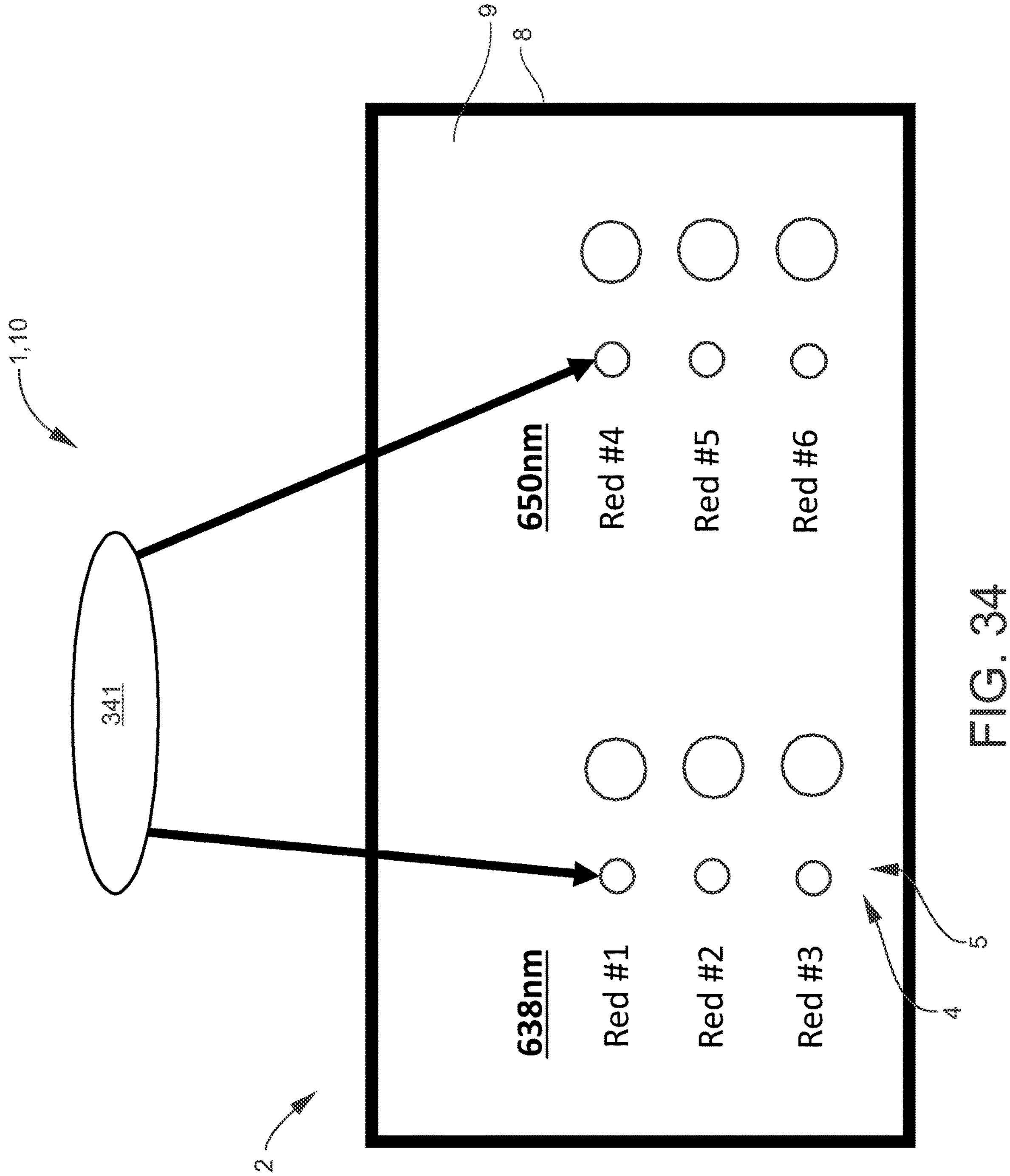
FIG. 34 is a schematic diagram of a side of a 6-port unit first end transmit device according to select embodiments of the instant disclosure.

Referring now specifically to FIG. 34, a schematic diagram of the side of a 6-port unit first end transmit device 2 is shown according to select embodiments of the instant disclosure. LED indicator lights 341 are shown for each port 4 with optical light sources 5.

Figure 35:
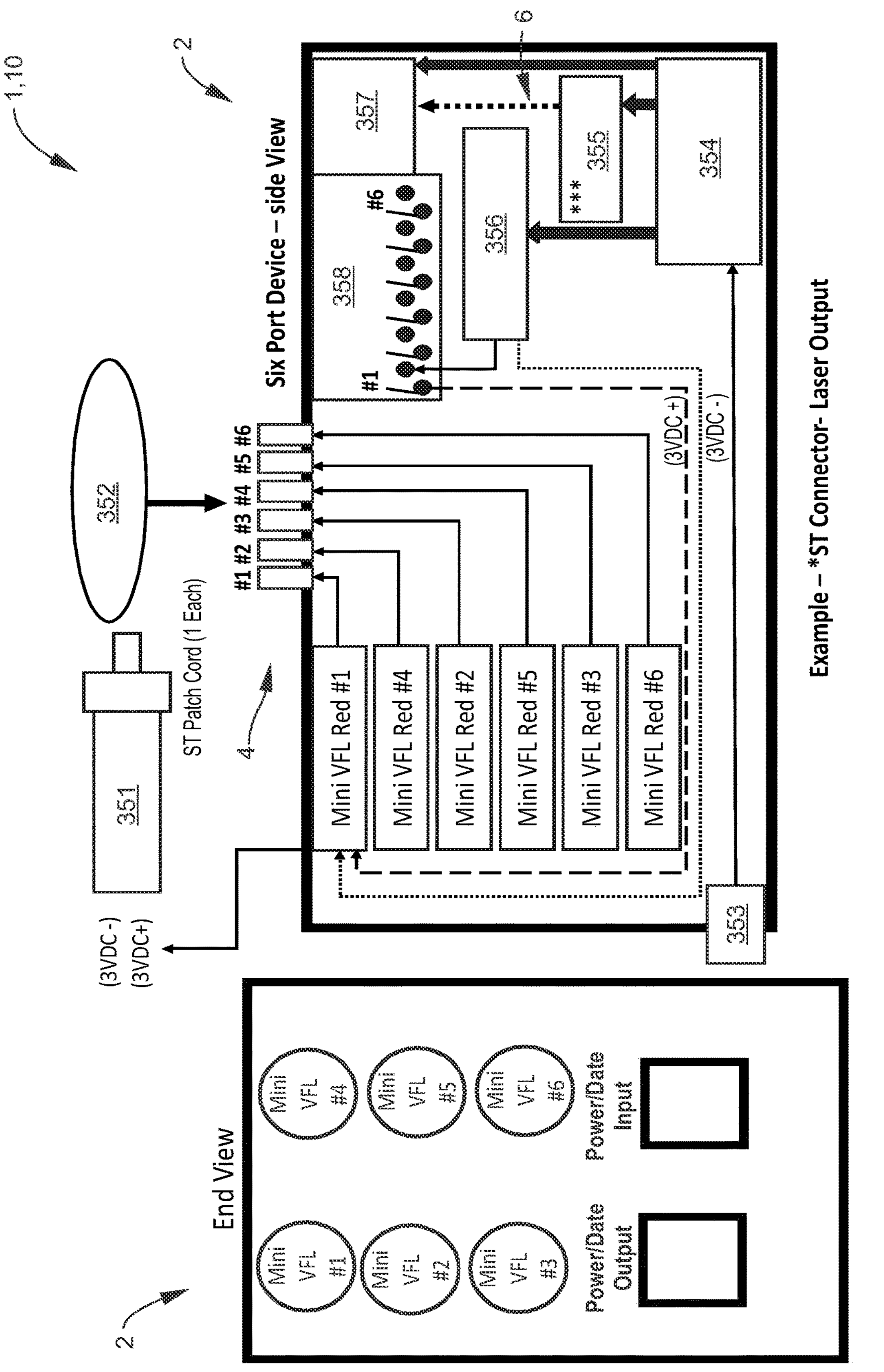
FIG. 35 is a schematic diagram with a side view and an end view of a 6-port unit first end transmit device according to select embodiments of the instant disclosure with an ST connector with laser output.

Referring now specifically to FIG. 35, a side view and an end view of a 6-port unit first end transmit device 2 is shown according to select embodiments of the instant disclosure with an ST connector and coupler 352 with laser output. Hard wire 351 is shown as an option for use with no batteries. 12 vdc input 353 is shown connected to 12 vdc rechargeable batter 354. DMX512 controller 355 is connected thereto with DMX512 six port relay 357 with 12 VDC input. Six port DMX 512 relay dry contacts 358 are connected therebetween with 12 VDC to 3 VDC step down transformer 356.

As shown in the Figures and discussed above, the present disclosure may be directed to an apparatus and method used for the identification, mapping and troubleshooting of multi-fiber cables. Applying a unique port signature at one end of a multi-fiber cable and locating the corresponding port signature at the $2^{nd}$ end of a multi-fiber cable is a critical part of being able to certify a new fiber installation, as well as audit, map, qualification testing of a new fiber installation, troubleshooting an existing fiber optic cable plant, and/or certification, which may require more in depth testing, like with multiple wavelengths and/or bidirectional testing.

In many communication systems, bundles of optical fibers extend significant distances between two points. In many buildings, these bundles of fibers terminate in a wiring closet. In a typical wiring closet, there may be hundreds of optical fibers. Upon leaving the wiring closet, these fibers diverge along different paths, extending through ceilings and walls to various other termination points in different parts of the building. In some cases, fibers that begin in a wiring closet extend to neighboring buildings. In many cases, the fibers appear identical to each other. Accordingly, it is often difficult for maintenance personnel to determine which of the many in a closet is the one that extends to a particular location. To address this difficulty, one typically shines a light through individual fibers and visually inspects the other ends of the fibers. Occasionally, a few optical fibers will break, or otherwise lose continuity. Proper maintenance of such communication systems typically includes identifying broken fibers. One way to identify broken fibers is to shine a light at a first end and look at a second end to see if a light exits out the other end. However, this procedure is carried out one fiber at a time and is therefore time consuming.

U.S. Pat. Nos. 8,823,925 and 8,467,041 disclose the transmission of a combination of visible colors and unique port signatures and the inspection of light, condition of said optical fibers, identifying a discontinuity, and mapping each of said second ends to a corresponding first end. The instant disclosure of a system and method for qualification, testing and/or mapping multi-strand fiber optic cables may be an improvement over U.S. Pat. Nos. 8,823,925 and 8,467,041. The additional features that the instant disclosure may improve upon may be discussed below.

Visual Fault Locators, or VFLs, are still the most common method to trace, identify, map, troubleshoot and document fiber optic infrastructure. While these VFLs are supposed to comply with laser safety standards, many of them are not very well regulated and often exceed max safety standards. It is common practice to look into the far end of the fiber with the naked eye to see which strand has the 650 nm red VFL on it. This practice presents a significant risk for eye damage as technicians will often times purchase VFLs that are rated as class 1 safe, but when tested, are many times the legal limit. Many technicians will purchase high-powered VFLs from 3rd party suppliers because they are able to see damaged fibers in splice trays at a longer distance, etc. Other fiber identifiers on the market require a mated connection in order to receive the identifier. Excessive mating cycles can degrade the quality of the end-user's connectors and increase the possibility of contaminating the end face of the connector with debris. This method eliminates these risks due to the non-contact capabilities. However, as mentioned above, this is also a time-consuming process often requiring more than one person and multiple VFLs: one on continuous red and the other on flashing red. If you get the wrong buffer tube or a faulty fiber you can spend a lot of personnel time, and potentially costly downtime trying to identify the correct strands between point A and point B. This could be between data centers, racks, utility poles, manholes, dark and cluttered MDF & IDF closets, etc. With the disclosed multi-fiber and multi-colored approach, this problem may be solved and time reduced spent by personnel on these tasks, as well as downtime for the traffic on the link. The disclosed system and method may allow one to augment their eyesight and speed up the transmission of information. The speed and the amount of information that can be transmitted is 3-4 times higher using the encrypted Morse code. When activated, the voice translation of the visible text feature of this device, a technician will not have to rely on looking at a lighted display. Once the encrypted text is received and confirmed by the receiving unit, the receiving unit audibly speaks that information, which can include building, wiring closet, cable number, buffer tube, strand number, the like, etc. A predetermined character may be substituted with a spoken word or phrase. In other embodiments, the controller can be configured to substitute a Morse code character with a preset value via a drop-down menu, e.g., Bldg #, Cable #, Buffer tube and strand numbers. In other embodiments, the controller can be configured to convert voice to text. The controller may have 3 or 4 buttons that will allow a technician to substitute a predetermined character with another word or phrase. By holding down the voice input button the end-user can speak into the device and record the desired message to be decoded at the far end.

Installation practices, procedures and methods have changed drastically as more and more fiber optic cables are installed and the cost has gone down drastically over the past decades. Many end-users are installing extra capacity due to the high cost of adding new cables and conduits in the future or leasing additional conduit infrastructure. It is common practice to pull 144 or 288 strands and leave many of them dark for future use. It is also common practice to fusion splice multiple strands in campus-type environments from one building to another or through multiple MDF and IDF closets for critical services, e.g., fire, security, A/V, police, etc. Fusion splices also eliminate most of the signal loss that you would get from using standard connectors and couplings. The disclosed system and method may eliminate the guess work associated with pulling X number of strands from cable Y in building Z and splicing or patching through multiple locations. One color can be used on each buffer tube or strand of fiber and a single technician can set up at a central location and quickly identify the multiple strands to be used in each location. If a fiber to be spliced does not have a connector on it, a mechanical connector with a cam lock can temporarily be installed on the cleaved strand in a minute or two, which will allow the 2-way communications and control link to be established and functions such as changing an identification signal on a strand to a solid or flashing VFL red on any given port, switching from VIS to NIR wavelengths, and turning the controller output off with the ability to re-enable the controller at any time can be achieved. Once the fiber has been identified, the technician can move to the next location and be certain they are maintaining continuity with the correct fibers along the path using the disclosed non-contact method. In situations where multiple cables and strands have been severed, the disclosed visible and audible method may speed up the restoration of service.

Fiber documentation is critical to a stable and secure network, and it is often the most challenging part of a cable plant to map out and maintain accurate records. The process of repeatedly plugging and unplugging a test fiber into the fiber optic ports to track down a fiber can introduce debris at that connection and possibly damage the connectors over time as required by other fiber identifier eliminates that concern as only the transmit end must be plugged in. In many cases, where a clear or light-colored dust cap has been installed, and the light being received is bright enough, the fiber optic strand may be identified without removing the dust cap. This would apply to the VIS spectrum. In select embodiments, system 1 and/or method 10 may allow the end-user to visibly detect and decode NIR light by using custom dust caps that have a built-in narrow bandpass filter (<4 mm). This would eliminate any debris contamination risks. This dust cap feature may be a highly desirable feature, especially in data center environments where there are high-density patch panels, large amount of air cooling being circulated and stirring up dust. It is also difficult or impossible to get your eyes in a position to see a VFL shining through a fiber connector in a high-density environment, which is not advisable for safety reasons. There is also a risk of disconnecting or damaging existing fiber connections. It may now be possible to fit 144 or 288 fiber terminations in one rack unit of space, which is roughly 19"w×1.75"H. It is much more feasible to get a 3.9 mm scope camera (or two) into that space to identify a fiber strand and verify continuity and polarity. Other identifiers rely on a clamp on transmitter and a second clamp-on receive unit. These can help identify a live fiber, provided you can find locations where the duplex circuit has an opening somewhere that will allow you to clamp onto a single strand, which would often require internal access to the patch panel due to the high-density duplex fiber environment. This increases the risk of accidental disconnects and costly downtime.

System 1 and/or method 10 may be configured to transmit visible and infrared information individually and/or simultaneously. This capability increases the distance limitations that are inherent to the capabilities of the shorter, visible wavelengths. The colors may be red, green, and blue and using laser diodes the light will travel to the useful limits of high-speed multimode fiber @550 meters. The colors will travel further than that over single mode fiber. Once you have reached the limit of the visible colors a band pass filter can be added to the tip of the camera to block all non-infrared wavelengths and the infrared will still audibly report as blue fiber 1, when wired to the same contacts as the color, blue fiber 1. This may allow a technician to disregard distance limitations to the legal limit of infrared lasers. If the camera that is used does not filter out the infrared spectrum, then a bandpass filter blocking the infrared spectrum can be used as needed. It may also allow the end-user to number the fiber strands sequentially up to the desired number, e.g., 1-48, etc., and shorten transmission/decoding time.

The disclosed transmit device may be controlled by using the DMX512 protocol typically used in lighting shows and can handle 512 individual lights per universe in standalone or active programming mode. In standalone mode, the lasers may be programmed in multiple configurations using momentary contact switches on the face of the transmitting device one at a time. This may allow for sequential, random, alternating, and other combinations such as speed in letters per minute. The end-user can operate this at speeds slow enough to visually recognize the color and count with the simplicity of Morse code numbering. This may allow the use of only the transmitting device should the receiving device fail to operate due to a low battery or other condition. Since this device can be configured to transmit both visible and infrared light simultaneously, the infrared wavelength can also be used as a power source by entering "steady-on" mode for the port(s) and obtaining a reference point of the signal level with a power meter. The power meter can be end-user supplied or built into the second end device as an optional feature. This may provide the end-user with the ability to set a customizable pass/fail alarm based on distance and other signal loss due to mated connectors and splices. This feature may allow the end-user the ability to see any high-loss anomalies in a multi-fiber bundle by comparing them to other along the same path.

DMX512 decoders also work with 2-way Ethernet protocols such as ART-net and RDM (remote device management) and others. This can be used to control the transmit device once one operational fiber strand has been identified by using a fiber to twisted-pair media converter attached to the DMX512 compatible controller.

In other embodiments the transmitting device can be modular in design. A 12-port version can simply be daisy-chained to one or more DMX512 decoders using a single controller. This may allow the end-user to start off with a low-cost, entry-level unit and grow incrementally to the quantity and desired feature set that they desire. Other receive unit capabilities may use large core non-contact patch cords to extend the light from the end-user's cable plant to a handheld device that may allow the incoming signal to be decoded, as mentioned in other embodiments.

This may significantly speed up the auditing process of dark fibers in a cable plant. Accurate documentation is a critical piece of a reliable and cost-effective cable plant.

A feature of the present disclosure may be its ability to utilize the functionality as described in U.S. Pat. Nos. 8,823,925 and 8,467,041, which detail the transmission of a combination of visible colors and unique port signatures and the inspection of light, condition of said optical fibers (plastic or glass fibers), identifying a discontinuity, and mapping each of said second ends to a corresponding first end. The use of the disclosed scope-style camera may enhance the visual capabilities by being able to extend the "vision" to include locations where the human eye would have difficulty accessing due to limited space, as well as eliminate any potential hazard of being exposed to lasers that may exceed safe limits due to poor quality control during the manufacturing process or defective power limiting controls built into the laser's circuitry.

Another feature of the present disclosure may be, in addition to the ability to visibly count the port signatures, as permitted by U.S. Pat. Nos. 8,823,925 and 8,467,041, when set on a low speed transmission setting, the new features built into the disclosed DMX512 controller may enable the end-user to speed up the transmission from the first end transmit device and the camera and associated software at the second end receive device will be able to decode the Morse code message faster than the human eye is capable of doing. With the addition of encryption and substituting a long pre-defined phrase programmed into both ends with a single character, e.g., the letter 'E' is s simple dot in Morse code, this non-contact method of applying a specific color and port signature at the first end may allow for a much faster method of decoding. The disclosed system and method may not require physical contact ("physical contact" as defined by the Fiber Optic Association) with the end-user's cable plant and is capable of deciphering the code at the fiber optic connector adapter in a patch panel may protect the existing fiber optic connector from being contaminated by foreign debris, which can cause errors or permanent damage of the connector. Non-contact applies to mating with the end-user's fiber optic connectors, not the fiber optic connector mating adapter. Repeated connecting and disconnecting of mated fibers can also result in permanent damage of the connector. The addition of a tap port at the first end transmit device will allow the end-used to connect their preferred power source into the device that is already connected on the first end and once the fiber optic strand has been identified and/or repaired, the end-user can use this port to measure the total loss in the circuit without having to disconnect the first end and reconnect the power source. In a similar manner, the end-user can plug in their preferred OTDR to the tap port at the first end transmit device and produce a trace and loss on that circuit without having to disconnect and reconnect. This method may allow the end-user to perform multiple tasks with a single connection to their installed fiber optic infrastructure. This method would be used to identify and document new or existing infrastructure, disaster recovery applications where a fiber optic strand, or multiple strands in a multi-fiber cable were severed at a splice point or mid-span on a utility pole or in a manhole, handhole or other situations. A connector would not be needed to identify a strand of fiber as this is a non-contact identifier/visual fault locator (VFL).

Another feature of the disclosed system and method may be its ability to audibly announce the text information that it received from the first end transmit device and to identify the individual fiber optic strand in a multi-fiber cable. Most installers or troubleshooters use a single red VFL or one that is flashing and the other is in non-flashing mode. This exposes them to potential laser hazards and relies on the ability to get your eyes in position to see those lights. The disclosed system and method may use colors and port signature, and with the addition of a small USB otoscope connected to the 7" tablet the end-user can avoid potential eye damage.

In another embodiment of the present disclosure, the disclosed system and method may allow use of the DM512 protocol and the ability to enable 2-way communications. Once a single fiber strand has been identified, the end-user can connect a twisted-pair to fiber media converter and take control of the first end transmit device. This may allow a single technician the ability to change the transmit signal from port signature mode on a specific fiber optic strand to VFL mode to troubleshoot a defective strand, and once it has been repaired, the technician will be able to measure the received power level for pass/fail compliance. When connected to and programmed by other DMX512 compatible protocols such as ART-net (Art-Net is a royalty-free communications protocol for transmitting the DMX512-A lighting control protocol and Remote Device management (RDM) protocol over the User Datagram Protocol (UDP) of the Internet protocol suite—https://en.wikipedia.org/wiki/Art-Net#:~:text=Art%2DNet%20is% 20a%20royalty, of%20the%20Internet%20protocol%20suite); and/or RDM (RDM or Remote Device Management is a protocol that sits on top of the DMX512 and allows bi-directional communication between a lighting or system controller and attached RDM compliant fixtures over a standard DMX data cable. DMX is an one direction protocol—from the controller to the lighting fixture—see https://ovationlights.com/industry/what-is-rdm-protocol/#:~:text=RDM (Remote%20Device%20Management)%20is, controller%20to%20the%20lighting%20fixture).

In sum, the disclosed system and method for qualification, testing and/or mapping multi-strand fiber-optic cables is an improvement over U.S. Pat. Nos. 8,823,925 and 8,467,041. The disclosed system and method for qualification, testing and/or mapping multi-strand fiber-optic cables improves the safety of the technician who currently relies on looking for a laser at the far end of a fiber optic cable. In many instances VFL laser light cannot be seen in certain types of fiber optic patch panels, e.g., densely populated panels that make it impossible to see all terminations, and wall-mount patch panels that have fiber terminations parallel to the wall, etc. The disclosed system and method for qualification, testing and/or mapping multi-strand fiber-optic cables provides a non-contact method that eliminates the possibility of contaminating the end face of the connectors in the end-user's fiber optic cable plant. Dirty connectors account for many of the connectivity problems encountered due to the small size of the core (9 um-50 um)

The disclosed system and method for qualification, testing and/or mapping multi-strand fiber-optic cables may use existing DMX512 protocol (DMX512 is a standard for digital communication networks that are commonly used to control lighting and effects), or various other methods that could possibly achieve the same outcome by transmitting at a rate of between 1 & 10 Hz.

The disclosed system and method for qualification, testing and/or mapping multi-strand fiber-optic cables may use Morse code, including, but not limited to, encrypted Morse code which substitutes Morse code symbols for words, e.g., it can transmit the letter "A", which can translate to the word "Fiber" at the far end. So, in a sense, it may not really be Morse code. Morse code specifications rely on a dot being a certain length (say 5 ms) and a dash being three times the duration of a dot (15 ms) and spacing between letters or words being 7 times the length of a dot (35 ms). The disclosed system and method could easily transmit some other variation of this and with the proper software at the receiving end, the disclosed system and method could use a new form of Morse code, or another form of binary data transmission, as it could transmit any desired encoded messages at a rate of between 1 & 10 Hz. The disclosed system and method for qualification, testing and/or mapping multi-strand fiber-optic cables may utilize already developed Morse code Apps or software configured for decoding Morse code with a smart phone, like those found on the Google Play Store. The Morse code App may include features, like: Encryption, alarm on certain strings and announce the alarm with a verbal, audible response. In other select embodiments, the disclosed system and method for qualification, testing and/or mapping multi-strand fiber-optic cables may develop their own software or App.

System 1 and/or method 10 for qualification, testing and/or mapping multi-strand fiber-optic cables may use cameras at the receive side to detect infrared light. In addition to using smartphone cameras, the disclosed system and method may use otoscope cameras connected to a custom display as one method. In select embodiments, the disclosed system and method may extend the light from the fiber optic patch panel over a non-contact large diameter fiber cable and extend the light from the patch panel into the disclosed cradle-style smartphone enclosure that is designed to adapt to the camera location on multiple smartphones, or another similar device could be manufactured that accomplishes the same thing.

As described and shown herein, system 1 and/or method 10 for qualification, testing and/or mapping multi-strand fiber-optic cables may provide improvements over the prior art, including, but not limited to: improvements in eye safety; providing a non-contact system and method for qualification, testing and/or mapping multi-strand fiber-optic cables; providing far end receive units—multiple types; providing 2-way communications and control; providing audible output (customizable input); providing DMX control; providing the use of Morse code; the like, and/or combinations thereof.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A system for qualification, testing or mapping multi-strand fiber-optic cables comprising:

a first end transmit device, the first end transmit device including:

at least one fiber port, each of the fiber ports are configured to engage a connector for an individual optical fiber of a multi-strand fiber-optic cable;

at least one optical light source, each of the optical light sources are configured to emit an optical light in one of the fiber ports;

a controller configured to control the optical light sources, the controller being configured to emit coded light patterns through each of the fiber ports via the optical light emitted from each of the optical light sources;

wherein, the first end transmit device is configured to emit the coded light patterns into each of the fiber ports corresponding to a unique port signature of each of the fiber ports; and a second end receive device, the second end receive device including a camera, the camera of the second end receive device is configured to view and decode the coded light patterns from each of the individual optical fibers of the multi-strand fiber-optic cable to identify the unique port signature from each of the fiber ports;

wherein the first end transmit device further including a housing having a face, where the fiber ports are face ports disposed on said face, each of said face ports is configured to engage the connector for the individual optical fiber or a connector including multiple, individual optical fibers; and wherein the first end transmit device further including individual optical tap ports that correspond to each of the face ports, the individual optical tap ports are configured for use with external optical components including an optical power source used together with an optical power meter at a second end.

2. The system for qualification, testing or mapping multi-strand fiber-optic cables of claim 1, wherein the system is designed and configured to be used for non-contact identification, mapping and troubleshooting of the multi-strand fiber-optic cable.

3. The system for qualification, testing or mapping multi-strand fiber-optic cables of claim 1, wherein the system is designed and configured to apply the unique port signature to each of the fiber ports at a first end of the multi-strand fiber-optic cable, and locating a corresponding port signature at a second end of the multi-strand fiber-optic cable, thereby allowing an end-user to certify or perform qualification testing of a new fiber installation, or audit, map or troubleshoot an existing fiber optic cable plant.

4. The system for qualification, testing or mapping multi-strand fiber-optic cables of claim 1, wherein the first end transmit device including LED lights mounted on the face configured to flash according to a corresponding laser port configured to assure that the first end transmit device is functioning properly as well as providing a means to calibrate the second end receive device.

5. The system for qualification, testing or mapping multi-strand fiber-optic cables of claim 1, wherein the optical light sources of the first end transmit device are coupled to the individual optical tap ports and the face ports.

6. The system for qualification, testing or mapping multi-strand fiber-optic cables of claim 5, wherein the first end transmit device including fiber-optic splitters and WDM couplers that will direct the optical light sources to or from each of the face ports and the individual optical tap ports; and wherein once a fiber has been identified, mapped, or repaired, an infrared power source being transmitted by the first end transmit device is configured to change to steady-on mode and, in conjunction with an optional second end power meter to determine an acceptable pass or fail dB loss of the fiber.

7. The system for qualification, testing or mapping multi-strand fiber-optic cables of claim 1, wherein the optical light sources are configured to emit light in either a visible light spectrum, an infrared light spectrum, or a combination thereof.

8. The system for qualification, testing or mapping multi-strand fiber-optic cables of claim 7, wherein the optical light sources are LED optical light sources or laser type optical light sources.

9. The system for qualification, testing or mapping multi-strand fiber-optic cables of claim 1, wherein the first end transmit device further including an input power port connected to an internal rechargeable battery system for use in areas with or without accessible power.

10. The system for qualification, testing or mapping multi-strand fiber-optic cables of claim 1, wherein the controller of the first end transmit device including a DMX512 lighting controller and decoder using the DMX512 protocol and operating in a pre-programmed standalone mode or an active user-controlled input mode; and wherein, the controller has built-in electrical contacts configured for wired connectivity and manual control of lighting sequences via push button style switches located on the first end transmit device for standalone control.

11. The system for qualification, testing or mapping multi-strand fiber-optic cables of claim 1, wherein the controller of the first end transmit device is programmed with Morse code signaling, basic and/or encrypted, and capable of using alternative characters in order to speed up transmission, wherein the coded light patterns emitted from the optical light sources are coded in the Morse code signaling;

wherein, the controller is configured to substitute a Morse code character with a preset value via a drop-down menu.

12. The system for qualification, testing or mapping multi-strand fiber-optic cables of claim 11, wherein the camera of the second end receive device is configured to serve as a visual aid for viewing the visible light of the coded light patterns and detect the unique port signature being sent in the form of the Morse code signaling from the first end transmit device and decode the unique port signature of each of the fiber ports that was sent into as unencrypted, original text and display the unencrypted, original text on the second end receive device.

13. The system for qualification, testing or mapping multi-strand fiber-optic cables of claim 12, wherein:

the second end receive device is configured to convert a decrypted text message into an audibly announced word or phrase that duplicates the displayed message as sent from the first end transmit device;

the second end receive device including a display configured to visually display the unique port signature of each of the individual optical fibers of the multi-strand fiber-optic cable; or a combination thereof.

14. The system for qualification, testing or mapping multi-strand fiber-optic cables of claim 13, wherein the second end receive device including a touch- screen tablet or a smartphone with an external USB or WiFi otoscope or endoscope style camera attached as the camera.

15. The system for qualification, testing or mapping multi-strand fiber-optic cables of claim 14, wherein the second end receive device including:

a modified tablet configured to allow a feed from the external USB or WiFi otoscope or endoscope style camera to be recognized by the second end receive device as a native internal camera, wherein the display of the tablet uses built-in front or rear cameras, wherein the modified tablet is configured to allow the external USB or WiFi otoscope or endoscope style camera to display in the same manner as the built-in cameras;

a passive fiber connection and an infrared sensor card as a reflective component and configured to be viewed in visible or infrared by the camera; or a combination thereof.

16. A system for qualification, testing or mapping multi-strand fiber-optic cables comprising:

a first end transmit device, the first end transmit device including:

at least one fiber port, each of the fiber ports are configured to engage a connector for an individual optical fiber of a multi-strand fiber-optic cable;

at least one optical light source, each of the optical light sources are configured to emit an optical light in one of the fiber ports, the optical light sources are configured to emit light in either a visible light spectrum, an infrared light spectrum, or a combination thereof, wherein the optical light sources are LED optical light sources or laser type optical light sources;

a controller configured to control the optical light sources, the controller being configured to emit coded light patterns through each of the fiber ports via the optical light emitted from each of the optical light sources, the controller of the first end transmit device including a DMX512 lighting controller and decoder using the DMX512 protocol and operating in a pre-programmed standalone mode or an active user-controlled input mode;

the controller has built-in electrical contacts configured for wired connectivity and manual control of lighting sequences via push button style switches located on the first end transmit device for standalone control;

a housing having a face, where the fiber ports are face ports disposed on said face, each of said face ports is configured to engage the connector for the individual optical fiber or a connector including multiple, individual optical fibers;

LED lights mounted on the face configured to flash according to the corresponding laser port configured to assure that the first end transmit device is functioning properly as well as providing a means to calibrate the second end receive device;

individual optical tap ports that correspond to each of the face ports, the individual optical tap ports are configured for use with external optical components including an optical power source used together with an optical power meter at a second end;

wherein the optical light sources of the first end transmit device are coupled to the individual optical tap ports and the face ports;

fiber-optic splitters and WDM couplers that will direct the optical light sources to or from each of the face ports and the individual optical tap ports;

an input power port connected to an internal rechargeable battery system for use in areas with or without accessible power;

wherein, the first end transmit device is configured to emit coded light patterns into each of the fiber ports corresponding to a unique port signature of each of the fiber ports;

wherein the controller of the first end transmit device is programmed with Morse code signaling, basic and/or encrypted, and capable of using alternative characters in order to speed up transmission, wherein the coded light patterns emitted from the optical light sources are coded in Morse code a second end receive device, the second end receive device including a camera, the camera of the second end receive device is configured to view and decode the coded light patterns from each of the individual optical fibers of the multi-strand fiber-optic cable to identify the unique port signature from each of the fiber ports;

wherein the camera of the second end receive device is configured to serve as a visual aid for viewing the visible light of the coded light patterns and detect the unique port signature being sent in the form of Morse code from the first end transmit device and decode the unique port signature of each of the fiber ports that was sent into as unencrypted, original text and display the unencrypted, original text on the second end device;

the second end receive device is configured to convert the decrypted text message into an audibly announced word or phrase that duplicates the displayed message as sent from the first end transmit device;

the second end receive device including a display configured to visually display the unique port signature of each of the individual optical fibers of the multi-strand fiber-optic cable;

the second end receive device including a touch-screen tablet or a smartphone with an external USB or WiFi otoscope or endoscope style camera attached as the camera;

wherein the second end receive device including:

a modified tablet configured to allow a feed from the external USB or WiFi otoscope or endoscope style camera to be recognized by the second end receive device as a native internal camera, wherein the display of the tablet uses built-in front or rear cameras, wherein the modified tablet is configured to allow the external USB or WiFi otoscope or endoscope style camera to display in the same manner as the built-in cameras;

a passive fiber connection and an infrared sensor card as a reflective component and configured to be viewed in visible or infrared by the camera;

wherein the system is designed and configured to be used for non-contact identification, mapping and troubleshooting of the multi-strand fiber-optic cable;

wherein the system is designed and configured to apply the unique port signature to each of the fiber ports at a first end of the multi-strand fiber-optic cable, and locating a corresponding port signature at a second end of the multi-strand fiber-optic cable, thereby allowing an end-user to certify or perform qualification testing of a new fiber installation, or audit, map or troubleshoot an existing fiber optic cable plant; and wherein once a fiber has been identified, mapped, or repaired, an infrared power source being transmitted by the first end transmit device is configured to change to steady-on mode and, in conjunction with an optional second end power meter to determine an acceptable pass or fail dB loss of the fiber.

17. A system for qualification, testing or mapping multi-strand fiber-optic cables comprising:

a first end transmit device, the first end transmit device including:

at least one fiber port, each of the fiber ports are configured to engage a connector for an individual optical fiber of a multi-strand fiber-optic cable;

at least one optical light source, each of the optical light sources are configured to emit an optical light in one of the fiber ports;

a controller configured to control the optical light sources, the controller being configured to emit coded light patterns through each of the fiber ports via the optical light emitted from each of the optical light sources;

wherein, the first end transmit device is configured to emit the coded light patterns into each of the fiber ports corresponding to a unique port signature of each of the fiber ports;

a second end receive device, the second end receive device including a camera, the camera of the second end receive device is configured to view and decode the coded light patterns from each of the individual optical fibers of the multi-strand fiber-optic cable to identify the unique port signature from each of the fiber ports;

wherein the controller of the first end transmit device is programmed with Morse code signaling, basic and/or encrypted, and capable of using alternative characters in order to speed up transmission, wherein the coded light patterns emitted from the optical light sources are coded in the Morse code signaling;

wherein, the controller is configured to substitute a Morse code character with a preset value via a drop-down menu; and wherein the camera of the second end receive device is configured to serve as a visual aid for viewing the visible light of the coded light patterns and detect the unique port signature being sent in the form of the Morse code signaling from the first end transmit device and decode the unique port signature of each of the fiber ports that was sent into as unencrypted, original text and display the unencrypted, original text on the second end receive device.

* * * * *